Feb. 24, 1953  O. E. STAPLES  2,629,291
MACHINE TOOL
Filed June 26, 1947  13 Sheets-Sheet 1

INVENTOR.
OTIS E. STAPLES
BY
Kwis, Hudson, Boughton & Williams
ATTORNEYS

Feb. 24, 1953     O. E. STAPLES     2,629,291
MACHINE TOOL
Filed June 26, 1947     13 Sheets-Sheet 2

INVENTOR.
OTIS E. STAPLES
BY Kwis, Hudson, Boughton & Williams
FIG. 2     ATTORNEYS

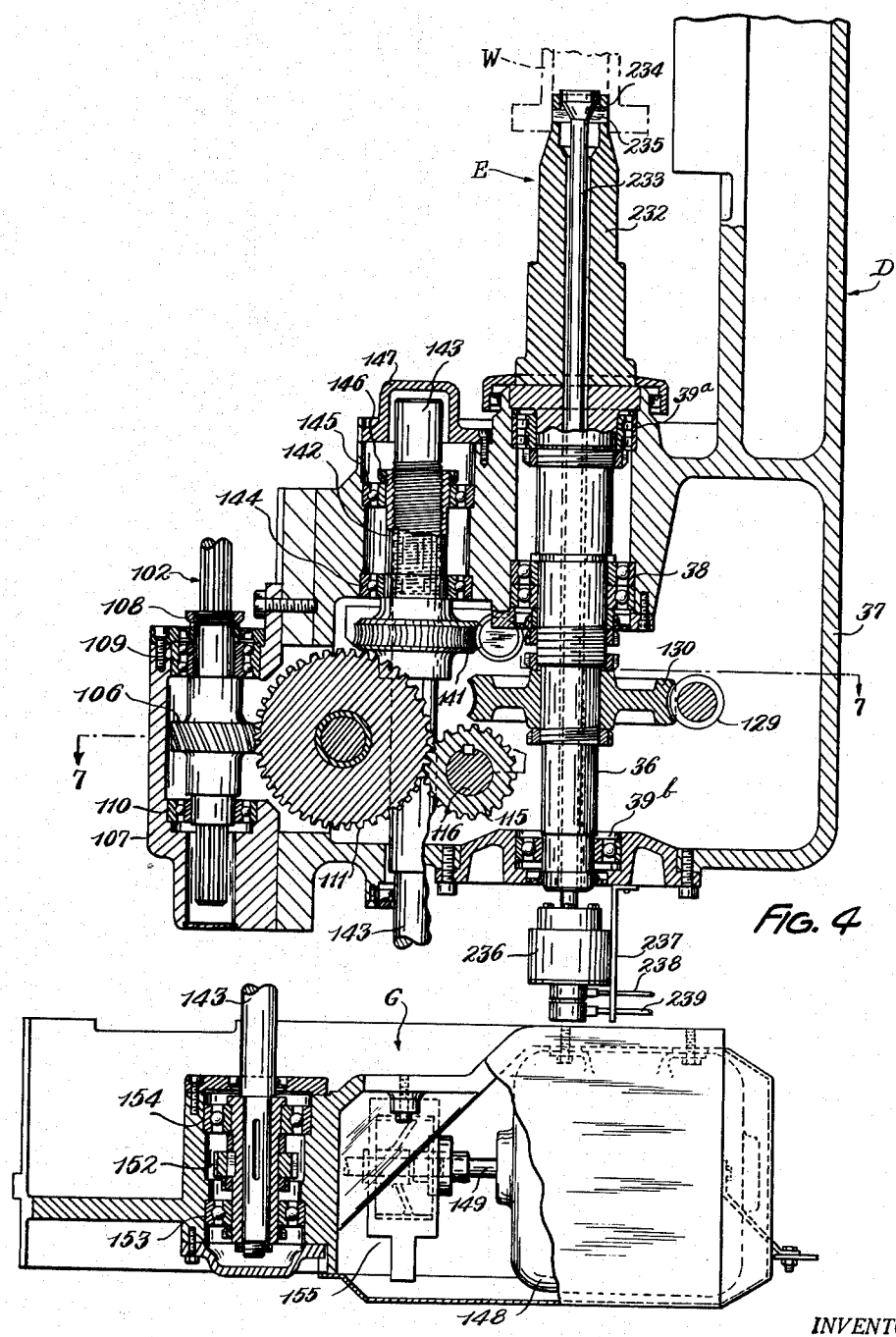

Feb. 24, 1953     O. E. STAPLES     2,629,291
MACHINE TOOL

Filed June 26, 1947     13 Sheets-Sheet 5

INVENTOR.
OTIS E. STAPLES
BY
Kwis, Hudson, Boughton & Williams
ATTORNEYS

Feb. 24, 1953 — O. E. STAPLES — 2,629,291
MACHINE TOOL
Filed June 26, 1947 — 13 Sheets-Sheet 6

INVENTOR.
OTIS E. STAPLES
BY Kwis, Hudson
Boughton & Williams
ATTORNEYS

Feb. 24, 1953  O. E. STAPLES  2,629,291
MACHINE TOOL
Filed June 26, 1947  13 Sheets-Sheet 7

INVENTOR.
OTIS E. STAPLES
BY
Kwis, Hudson, Boughton & Williams
ATTORNEYS

Feb. 24, 1953 O. E. STAPLES 2,629,291
MACHINE TOOL
Filed June 26, 1947 13 Sheets-Sheet 8

INVENTOR.
OTIS E. STAPLES
BY
Kwis, Hudson, Boughton & Williams
ATTORNEYS

INVENTOR.
OTIS E. STAPLES

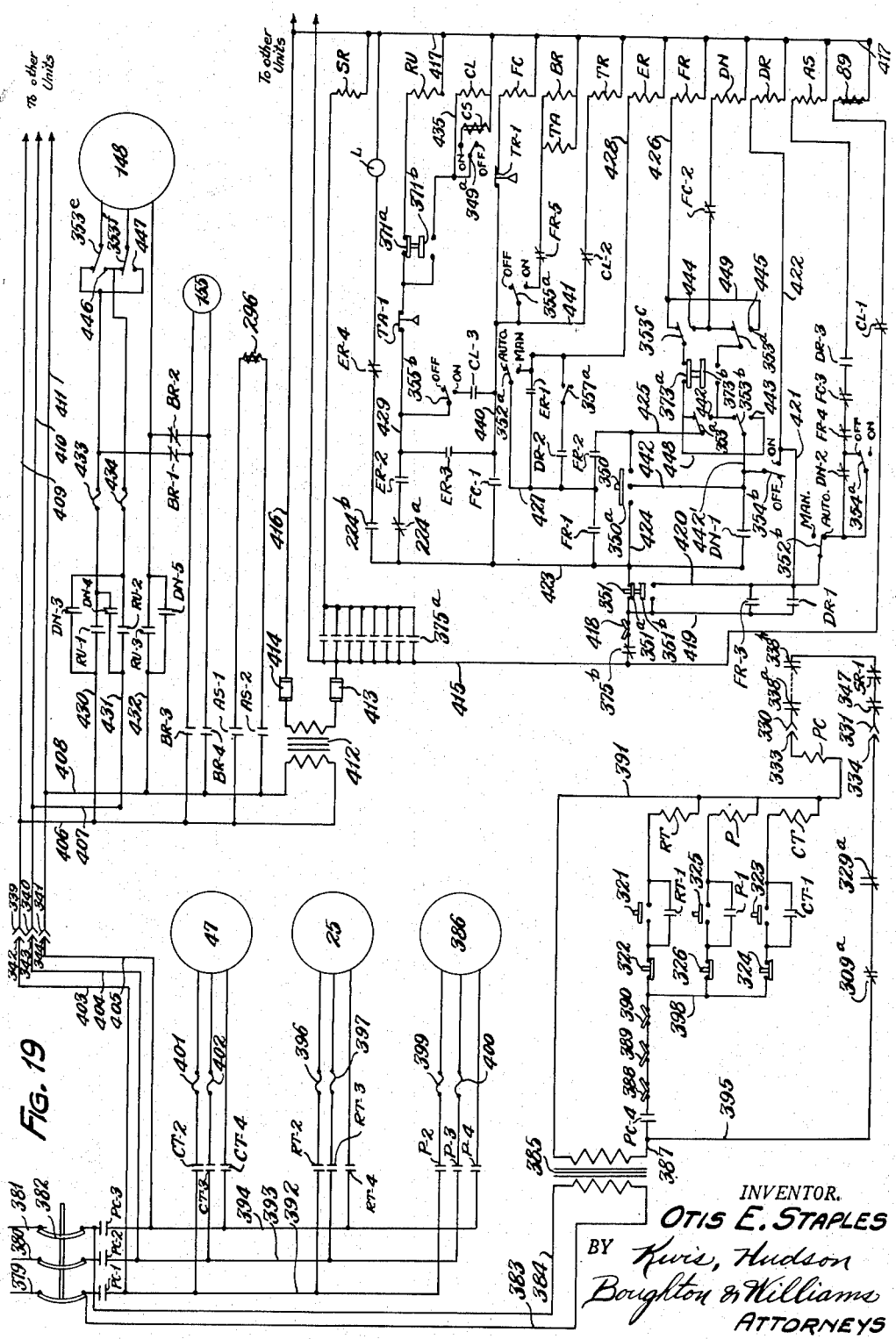

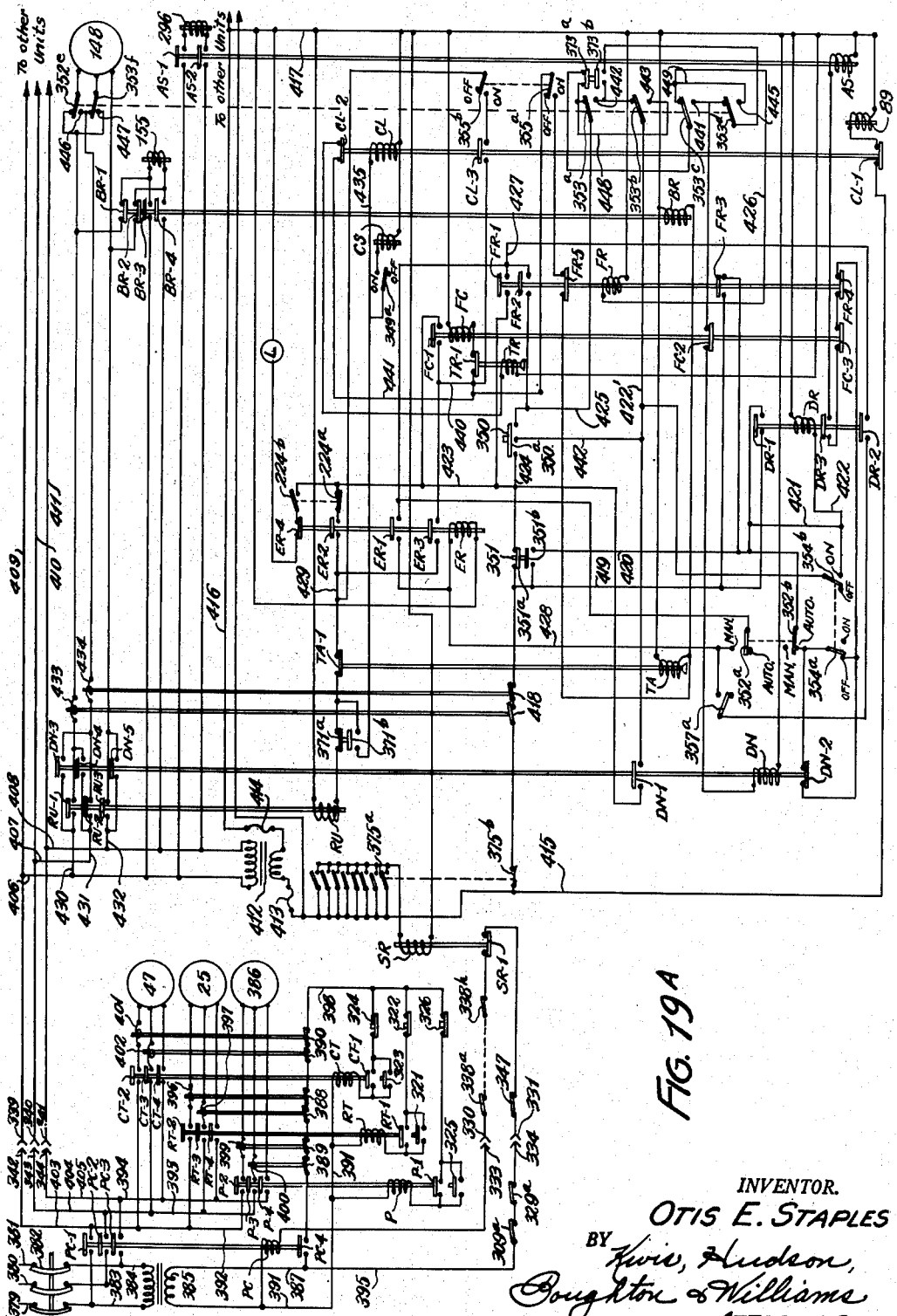

INVENTOR.
OTIS E. STAPLES
BY
ATTORNEYS

Patented Feb. 24, 1953

2,629,291

UNITED STATES PATENT OFFICE 2,629,291

MACHINE TOOL

Otis E. Staples, Euclid, Ohio, assignor to The Cleveland Hobbing Machine Company, Euclid, Ohio, a corporation of Ohio Application June 26, 1947, Serial No. 757,256

51 Claims. (Cl. 90—4)

The present invention relates to machine tools and more particularly to rotary gear cutting or hobbing machines of the turret type.

An object of the present invention is the provision of an improved hobbing machine of the turret type which operates in a more efficient and improved manner than prior art machines.

Another object of the invention is the provision of an improved machine tool of the rotary turret type comprising a plurality of tool spindles each cooperating with a separate work support to form a plurality of operational units for effecting a hobbing or other machining operations, each unit being provided with improved electrical controls whereby each unit may be operated independently of the others or in timed relationship therewith.

A further object of the invention is the provision of an improved machine tool, comprising relatively movable tool and work supports and means for producing rotation of the work support in timed relationship with the rotation of the tool, in which the means for effecting rotation of the work support acts on the opposite side of the axis of the work support from the position occupied by the tool, thereby producing a balanced drive of the work support.

A still further object of the invention is to provide an improved machine tool of the rotary turret type having a plurality of relatively movable tool spindles and work supports, in which the work supporting means comprise fluid operated mechanism for positioning and holding the work during a machining operation.

Another object of the invention is to provide an improved machine tool of the rotary turret type, having a plurality of relatively movable tool and work spindles forming a plurality of operational units, with a common source of power for operating all of said spindles and with a clutch for each unit interposed between the common source of power and the spindles of each unit, each unit further comprising fluid pressure actuated means for selectively operating the clutch of the unit.

Still another object of the invention is to provide an improved machine tool of the type mentioned in the two next preceding objects and in which the fluid operated means for holding the work and operating the clutches are automatically actuated during the working cycle of the machine.

It is also an object of the invention to provide an improved hobbing machine of the rotary turret type, having a plurality of hobs and cooperating work supports which are movable transversely of the axes of the hobs, with means for continuously moving of the hobs axially a small amount during the hobbing operation, the last-mentioned means further comprising mechanism to terminate operation of a hob and its associated work support when the hob has reached one extreme position thereof.

An additional object of the invention is to provide an improved hobbing machine with novel electrical controls whereby the machine can be readily adapted to operate in accordance with either the conventional or "climb" methods of hobbing and with or without automatic "clean up" of the work following a hobbing operation.

The invention further resides in certain novel features, details of construction, and combinations and arrangements of parts, and further objects and advantages thereof will be apparent to those skilled in the art to which the invention pertains from the following description of the present preferred embodiment and one modification thereof, described with reference to the accompanying drawings in which similar reference characters represent corresponding parts throughout the several views and in which:

Fig. 4 is a vertical sectional view through the lower portion of the work head illustrated in Fig. 2, the view being taken substantially on the lines 4—4 of Figs. 2 and 7;

Fig. 5 is a side view, partly in section and partly in elevation, of the rapid traverse mechanism for a single unit of the machine, the view being taken substantially on the line 55 of Fig. 6;

Fig. 19 is a simplified wiring diagram of a portion of the electrical circuit for the machine illustrated in Figs. 1-17, the diagram being of the "cross-the-line" type employing the symbols conventionally utilized by the machine tool industry;

Fig. 19A is a schematic representation of the same electric circuit as illustrated in Fig. 19 but drawn in a different style;

The invention is illustrated as embodied in a rotatable turret type hobbing machine somewhat similar to that illustrated in U. S. Patent No. 2,292,260 and hence only those parts of the machine are here illustrated and described which are necessary to convey a complete understanding of the invention to those skilled in the art.

Figure 1:
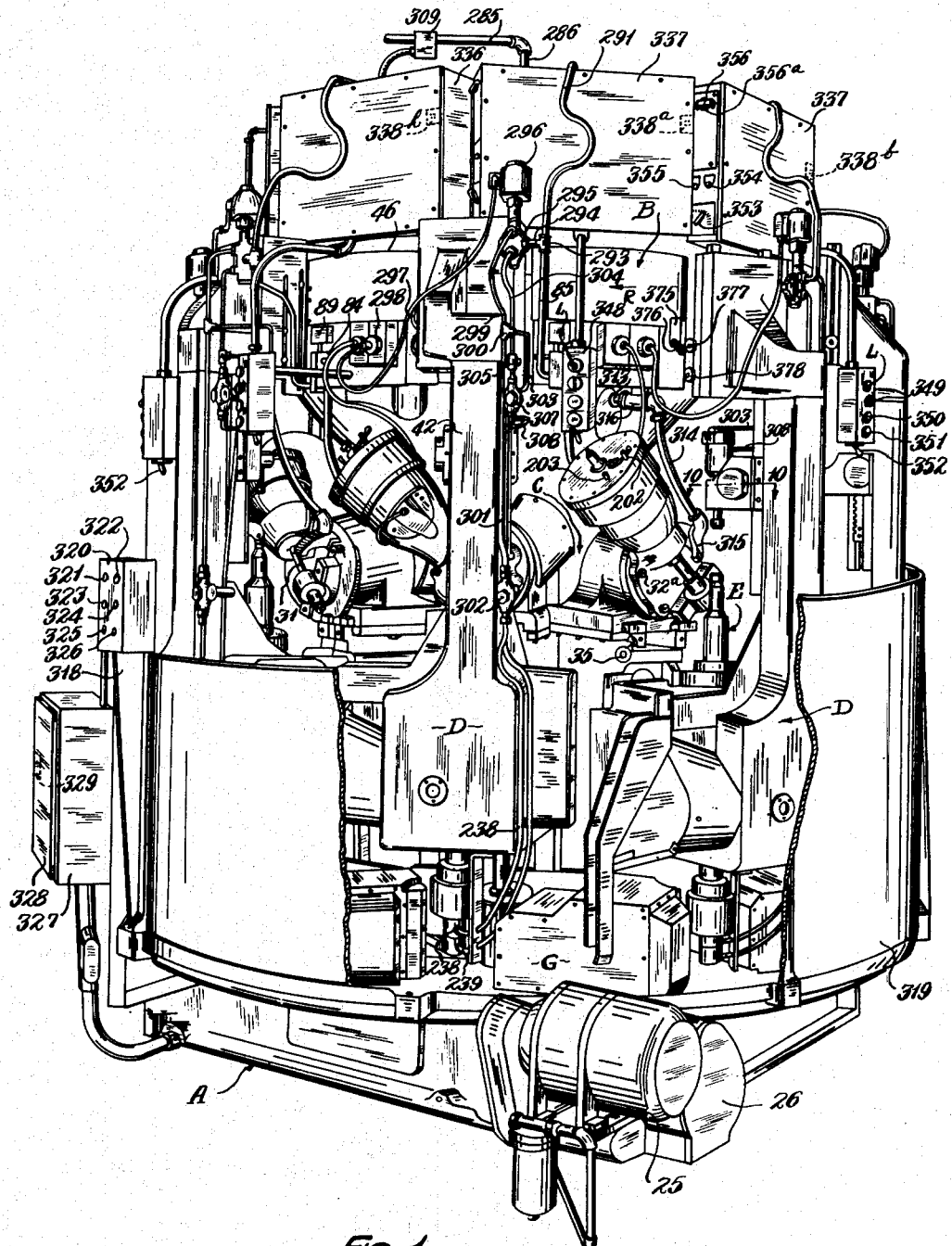
Fig. 1 is a perspective view of a rotatable turret type hobbing machine embodying the present preferred form of the invention, certain portions being broken away and others omitted for the purpose of clarity.

The general nature of the machine is illustrated in Fig. 1 and may be briefly characterized as follows:

The machine is supported by a stationary frame A on which a turret B is mounted for rotation in the direction indicated by the arrow R. At spaced points about the turret are mounted a plurality of identical tool or hob heads C and adjacent each tool head the turret carries a work head D, the latter being slidably supported for vertical movement relative to the corresponding tool head. Each tool head is provided with mechanism for supporting and rotating a hob or other tool, the tool being adapted to be rotated about an axis extending transversely of the vertical movement of the adjacent work head. In addition, each tool head C includes mechanism for producing a relatively slow axial movement of the hob or other tool while the latter is rotating. Each work head includes a means E for supporting and rotating a workpiece about a substantially vertical axis, and mechanism F for producing a feeding movement of the work head vertically during a cutting operation. This rotation of the workpiece and the feeding movement thereof is in timed relationship to the rotation of the hob or other tool. The machine also includes a rapid traverse mechanism G for each work head to move the latter at a rapid rate to bring the work into cutting relationship with the hob or other tool and to return the work head to its initial position after the cutting operation has been completed. Each tool or hob head, work head, work gripping means and rapid traverse mechanism which are associated together form an operational or hobbing unit and are, at times, so referred to in the subsequent description and the subjoined claims.

In operating the machine, the turret thereof is rotated so that the tool and work heads successively pass a definite position known as the loading station where workpieces may be inserted and removed, the hobbing or other machining operation being effected as the turret continues to rotate and is completed by the time a given work head has returned to the loading station. As will hereinafter appear, the machine is capable of performing a hobbing or other machining operation either while the work heads are moving vertically upward or downward by virtue of operation of suitable electric switches, and the operation of any unit may be interrupted without interfering with the operation of the other units of the machine. The manner in which each of the above mentioned operations is effected, and other features of the machine will hereinafter become apparent from the following detailed description.

Figure 2:
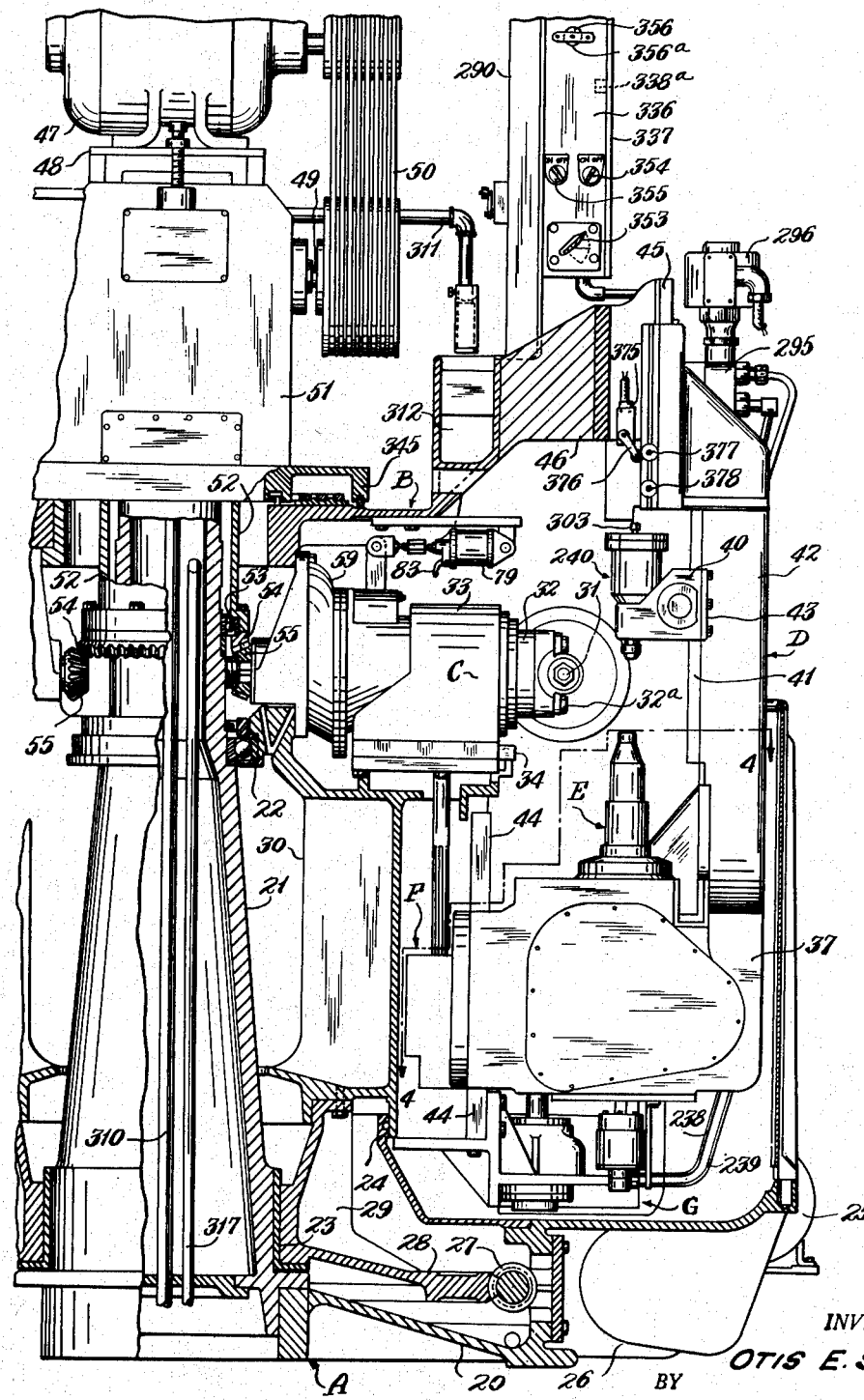
Fig. 2 is a fragmentary view of the machine shown in Fig. 1, the view being partly in section and partly in elevation with the section being taken approximately on the centerline of the machine and with the illustrated tool or hob head turned to a horizontal position.

Referring now to Figs. 1 and 2, it will be seen that the frame A comprises a base 20 and a central, vertically extending column 21 uniting with the base and forming the main support for the machine. The turret B is rotatably supported upon the column and base by bearings 22, 23, and 24. Rotation of the turret B is effected by means of a motor 25 which operates through a suitable reduction gearing 26 to rotate a worm 27 and thereby drive the worm wheel 28, which is of large diameter and may be integral with or attached to a flange member 29. The member 29 is secured by bolts, or other suitable means, to the lower part of a vertically extending annular member 30, which forms the main frame of the turret B.

Figure 3:
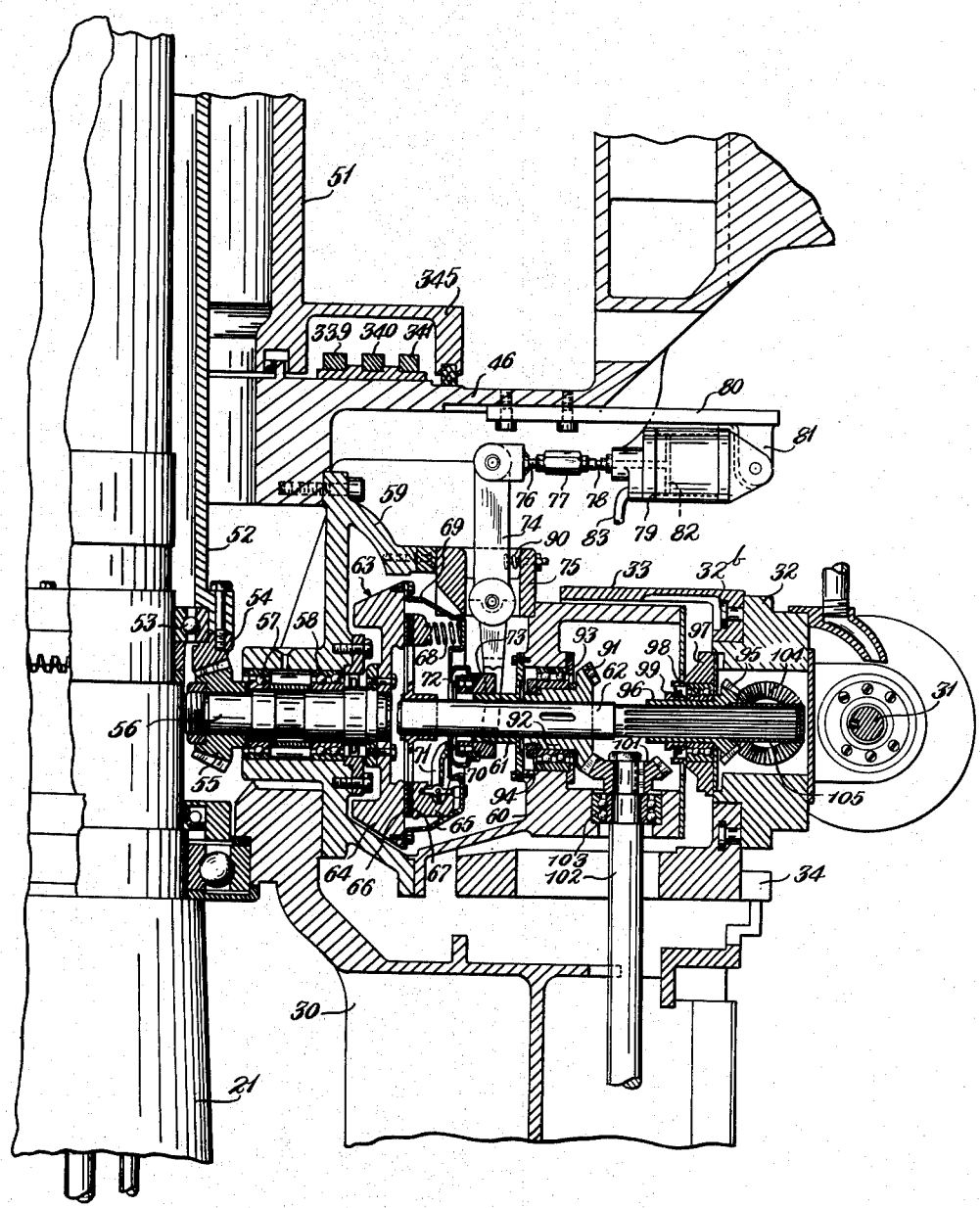
Fig. 3 is an enlarged view of a portion of Fig. 2 with additional parts broken away to reveal the drive for the tool or hob and the drive for feeding and rotating the work support of one unit of the machine.

Each of the tool heads C comprises a tool or hob spindle 31 rotatably supported upon a spindle member 32, which is in turn carried by a slidable head member 33 (see also Fig. 3). Each spindle member 32 is adjustable, relative to its head member 33 about an axis normal to the axis of the hob spindle 31 and is secured to the head member 33 in any adjusted position by bolts 32a, the heads of which engage within circular T-shaped openings 32b in the front face of the member 33. The head members 33 are slidably supported by horizontal ways 34 on the turret member 30 and the head members are adjustable therealong, radially of the axis about which the turret rotates, by means of screws 35 which engage a portion of the head members and are threaded into tapped holes in the turret member 30.

Each of the work heads D is provided with a work holding and rotating means E which includes a work spindle 36 (see Fig. 4) rotatably supported in the lower portion 37 of the work head by antifriction bearings 38, 39a and 39b. The upper end of each spindle is provided with a chuck and each work head is further provided with a tail slide 40, slidably supported by ways 41 on the vertical portion 42 of the work head D, the several slides 40 each being held in any adjusted position on the ways by suitable clamping means 43 which are illustrated as comprising conventional clamping plates and bolts. The head members D are slidably supported on vertical ways 44, provided on the turret member 30, and on vertical ways 45, provided on a cap member 46 which is integral with or secured to the top of the turret member 30 in any suitable manner. The work head members D are moved vertically along the ways 44 and 45 by mechanism to be hereinafter described.

The tool and work spindles 31 and 36, respectively, are rotated in predetermined timed relationship by a motor 47, hereinafter referred to as the "cut" motor, which is supported upon an adjustable platform 48 on top of the column 21. This motor is operatively connected to a shaft 49 through a flexible drive 50, the shaft 49 being connected by suitable gearing mechanism, contained within the housing 51 forming a part of the column 21, to a sleeve 52 which is rotatably supported by bearings 53 on the vertical column 21. A bevel gear 54 is attached to the lower end of the sleeve 52, by means of bolts or the like, and the gear 54 meshes with a plurality of spaced bevel pinions 55, there being one bevel pinion 55 for each hobbing unit. Each pinion 55 is keyed to a short shaft 56 (see Fig. 3) which is rotatably supported by bearings 57 and 58 in the rear portion of a two-part housing 59 attached to the member 30 and cap portion 46 of the turret B adjacent the edges of an opening therethrough. The drives for the various hobbing units from the gear 54 through the gears 55 are duplicates and, therefore, only one will be described in detail.

As shown in Fig. 3, the forward portion of the housing 59 extends into the hollow interior of the head member 33 and this portion of the housing is provided with an internal shoulder or flange 60 to the rear of which is connected a collar member 61. A shaft 62 is journalled in the collar member 61 and extends forwardly and rearwardly therebeyond, this shaft being selectively, operatively connected with the shaft 56 by means of a friction plate clutch 63. This clutch is of conventional design and comprises a driving member 64, connected to the shaft 56, and a driven member 65 which is connected to the shaft 62. The cooperating faces of the members 64 and 65 are provided with friction material 66 and 67, respectively, and are normally forced into engagement by a plurality of spaced compression coil springs 68 exerting force between the rear of the driven member 65 and a housing member 69 connected with the driving member.

The rear face of the driven member 65 is provided with a plurality of integral bosses, only one of which is shown, in each of which is mounted an axially extending rod 70. Pivoted to each rod 70 is a radially extending actuating lever 71 which is urged to the illustrated position by the springs 68 since the lower portion of each lever engages a cam surface in a recess provided in each of the integral bosses on the rear of the driven member. This action may be assisted, if desired, by providing each lever 71 with a supplemental spring, not shown. The upper portions of the levers 71 extend adjacent the shaft 62 and are adapted to be rocked in a counter-clockwise direction by an annular member 72 which is rotatably supported upon a sleeve 73 slidably supported upon the collar 61. The sleeve 73 is straddled by the bifurcated lower end of an actuating member or lever 74, the forward faces of the bifurcated portion bearing against a cooperating surface on the sleeve 73. The lever 74 is pivoted intermediate its ends to bracket member 75 which is mounted in an opening in the forward portion of the housing 59.

The upper end of lever 74 is pivotally connected to a rod 76 which has an adjustable connection 77 with a piston rod 78. The piston rod 78 extends into a cylinder 79 which is supported upon the cap member 46 of the turret by means of a plate 80 having a depending bracket 81. The inner end of the piston rod 78 is provided with a piston 82 which is adapted to be actuated to the right, as shown in Fig. 3, by fluid pressure admitted to the rear end of the cylinder through a flexible pipe or hose 83, the forward portion of the cylinder being provided with an exhaust port, not shown, communicating the area in front of the piston with the atmosphere.

Figure 17:
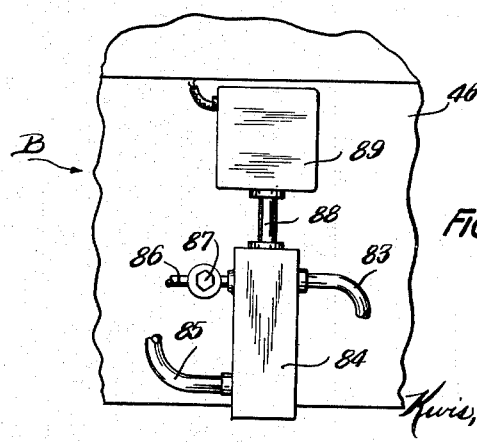
Fig. 17 is a fragmentary front elevational view of one of the fluid pressure control means for controlling actuation of the clutch illustrated in Figs. 2 and 3.

The flow of fluid under pressure to the cylinder 79 is controlled by a two-way valve 84 (see Figs. 1 and 17) mounted upon the cap member 46 of the turret B. As shown in Fig. 17, the pipe or hose 83 is connected to this valve 84 which is also provided with a fluid pressure supply pipe or hose 85 and an exhaust port 86, the latter having an adjustable orifice, such as a needle valve or the like, controlled by an adjusting screw 87. The movable member of the valve is connected by an actuating member or rod 88 to the armature of an electrically operated solenoid 89, the valve being so formed that when the solenoid is energized communication is established between the fluid supply pipe or hose 85 and the pipe or hose 83 thus supplying fluid pressure to the cylinder 79. Consequently, the piston 82 is forced to the right, as viewed in Fig. 3, rocking the lever 74 clockwise. This causes the sleeve 73 and annular member 72 to move axially to the left rocking the levers 71, and the lower ends of the latter force the driven member 65 to the right, against the action of the springs 68, disengaging the clutch.

When the solenoid 89 is deenergized the movable member of the valve 84 is actuated to interrupt the communication between pipes or hoses 85 and 83 and to establish communication between the pipe or hose 83 and the exhaust port 86. Hence the springs 68 of the clutch act through the driven member 65, levers 71, annular member 72 and sleeve 73 to rock the lever 74 in a counter-clockwise direction, this action being assisted by a compression spring 90 mounted upon the bracket 75 and bearing against the lever 74 above its pivot. The counter-clockwise movement of the lever 74 moves the piston 82 to the left, as viewed in Fig. 3, thus discharging the fluid in the cylinder 79 through the pipe or hose 83, valve 84 and the exhaust port 86. The adjustable orifice in the port 86 controls the rate of discharge of the fluid and hence the rate of engagement of the driven member 65 of the clutch with the driving member 64, under the action of the springs 68, thus preventing grabbing. The manner in which the solenoid 89 is energized and deenergized during the working cycle of the machine to effect operation of the clutch 63 will be hereinafter described.

A bevel gear 91, provided with an integral sleeve 92, is keyed to the shaft 62 intermediate the ends of the latter. The sleeve 92 is journalled by bearings 93 in the shoulder 60 of forward portion of the housing 59, the sleeve 92, and hence the gear 91, being held against axial displacement by a nut 94 threaded upon a reduced end of the sleeve and engaging the adjacent end of the inner race for the bearings 93.

The outer end of the shaft 62 is splined and provided with a bevel gear 95 which is slidably keyed to the shaft. The gear 95 is provided with an integral sleeve portion 96 which is rotatably supported in a member 97 by bearings 98, the gear being held against longitudinal displacement relative to its bearings by a nut 99 threaded upon the sleeve portion 96 and the member 97 being attached to the spindle member 32. The outer face of the gear 95 is preferably provided with a cylindrical member which surrounds the outer end of shaft 62 to protect the latter.

The bevel gear 91 meshes with a bevel gear 101 connected with the upper end of a vertical shaft 102, the latter being journalled by bearings 103 in an opening in the lower side of the forward portion of the housing 59. This shaft 102 forms a part of the work spindle rotating and feeding mechanism, which will be subsequently described in detail. The gear 95 is in mesh with another bevel gear 104 mounted upon a shaft 105 and forming a part of the drive for rotating and axially moving the tool or hob spindle 31. It will be apparent therefore, that when the clutch 63 is engaged, the shaft 62 will be rotated by the cut motor 47 through the gears 54, 55, shaft 56, and clutch 63 thus driving the shaft 102 for rotating and feeding the work spindle, as hereinafter described, the shaft 105 also being rotated for rotating and axially moving the tool spindle. Conversely, disengagement of the clutch 63 interrupts rotation of the shaft 62 simultaneously stopping the mechanisms driven thereby.

As shown in Fig. 4, the lower end of shaft 102 is splined and passes through a helical gear 106 which is keyed to the splined portion of the shaft 102 to be rotated thereby, the splining permitting the gear to be slid axially along the shaft. The gear 106 is positioned within a housing 107, attached to the lower portion 37 of the work head D, the gear being prevented from axial displacement relative to the housing by means of a nut and washer assembly 108 which engages one side of the inner race for the antifriction bearings 109 in which the shaft 102 is journalled, the other side of the inner race of these bearings being in engagement with a shoulder formed by a sleeve-like portion of the gear 106. The lower end of the shaft 102 extends into a bore of the housing 107 and is journalled by antifriction bearings 110, which are positioned between a cylindrical sleeve extension of the gear 106 and the enlarged upper end of the aforementioned bore in the housing 107.

Figures 7, 13, 14:
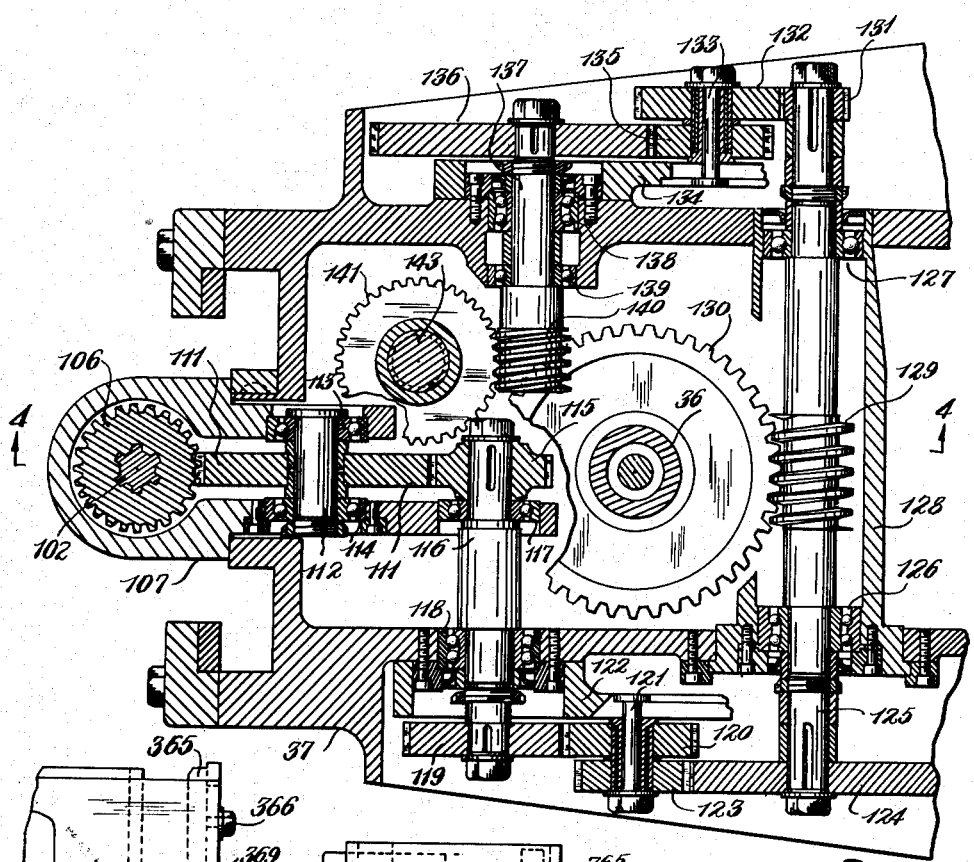
Fig. 7 is a sectional view through the lower portion of the work head, the view being taken substantially on the irregular section indicating line 7—7 of Fig. 4, with certain parts broken away to more clearly illustrate the gearing connections.
Fig. 13 is a fragmentary front elevational view of the top portion of one of the work heads of the machine illustrated in Fig. 1 showing certain of the switches operated by movement of the work head.
Fig. 14 is a fragmentary side view of the top portion of one of the work heads of the machine, the view being partly in elevation and partly in section and representing the right-hand side of Fig. 13.

The helical gear 106 meshes with another helical gear 111 mounted upon a stub shaft 112, the latter being journalled in a portion of the housing 107 by means of antifriction bearings 113, 114 (see Fig. 7). The gear 111 is also in mesh with a helical gear 115 which is keyed to one end of a shaft 116, the latter being rotatably supported by antifriction bearings 117, 118 in the housing 107 and in the portion 37 of the work head, respectively. The other end of the shaft 116 carries a spur gear 119 for rotation therewith, and the gear 119 meshes with a spur gear 120 rotatably mounted upon a stub shaft 121, the latter being supported by a bracket 122 connected with the portion 37 of the work head. The shaft 121 is also provided with a spur gear 123, connected to rotate with the spur gear 120, and the gear 123 meshes with a spur gear 124 keyed to one end of a worm shaft 125, the latter being journalled by suitable antifriction bearings 126 and 127 in a sleeve-like support 128 mounted in the portion 37 of the work head D. Intermediate its ends, and within the interior of the portion 37 of the work head, the shaft 125 carries a worm 129 which meshes with a worm wheel 130 secured to the work spindle 36. Therefore, when the clutch 63 is engaged, the motor 47 will effect rotation of shaft 102 thereby rotating the work spindle 36 through the gears 106, 111, 115, 119, 120, 123, 124, worm 129 and worm wheel 130.

The end of the worm shaft 125, opposite to the end on which is attached the gear 124, is provided with a pinion 131 which meshes with a gear 132 rotatably mounted upon a stub shaft 133, the latter being supported by a bracket 134 connected to portion 37 of the work head. The shaft 133 also supports a gear 135 which is mounted to rotate with the gear 132. The gear 135 meshes with a gear 136 which is keyed to a shaft 137, this shaft being journalled by antifriction bearings 138 and 139 in the portion 37 of the work head D. The inner end of the shaft 137 is provided with a worm 140, which drives a worm wheel 141 forming a part of a feed nut 142. As shown in Fig. 4, the feed nut 142 comprises a cylindrical sleeve-like extension of the worm wheel 141 and is internally threaded to cooperate with the threads on a feed screw or shaft 143. The sleeve-like portion of the feed nut is journalled in a suitable bore-like opening within the portion 37 of the work head member by anti-friction bearings 144 and 145, the nut being held against axial displacement relative to its bearings by means of a nut 146 in a well known manner. The bore in which the feed nut and screw are located may be closed by a suitable cap 147 to prevent the entrance of dirt, chips or the like.

The construction is such that when the clutch 63 is engaged, the motor 47 will drive the shaft 102 thereby rotating the worm shaft 125, in the manner previously described, and this rotation of the shaft 125 operates through the gears 131, 132, 135, 136, worm 140, and worm wheel 141, forming a part of the feed nut 142, to cause the latter to rotate relative to the feed screw or shaft 143. Since the feed nut 142 is supported against axial movement, this rotation causes the said nut, and hence the entire work head, to move vertically as the nut threads along the screw or shaft 143. As previously mentioned, the lower end of the shaft 102 is splined so that the gear 106 may move therealong during this operation. Moreover, the rotation of the work spindle 36 and the vertical movement thereof, are in predetermined timed relationship and may be simultaneously started and stopped by the operation of the single clutch 63. This vertical movement of the work head and work spindle is that which is commonly known as a "feeding movement" and is effected at a relatively slow rate while the hob or other tool supported upon the spindle 31 performs a cutting or hobbing operation upon the work carried by the work spindle 36.

Figure 6:
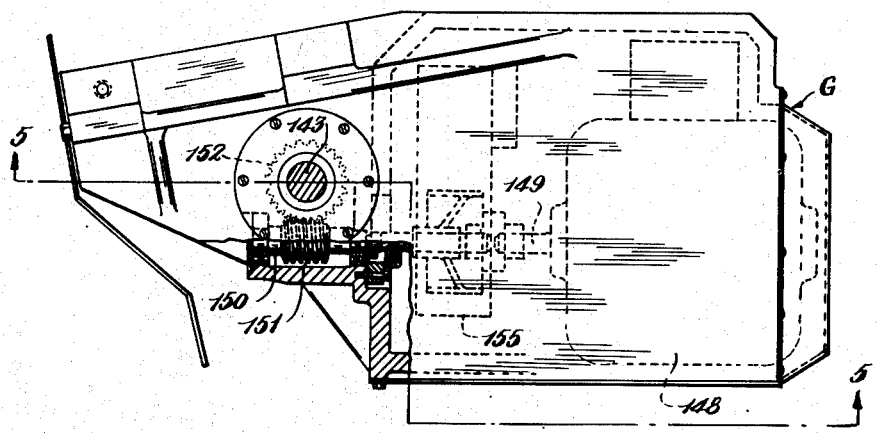
Fig. 6 is a top view of the rapid traverse mechanism illustrated in Fig. 5 with portions broken away to more clearly reveal the construction.

Each work head D may be rapidly moved in a vertical direction by means of a separate rapid traverse mechanism G (see Figs. 5 and 6) which includes a motor 148, the shaft 149 of which is connected to a worm shaft 150 upon which is mounted a worm 151. The worm 151 cooperates with a worm wheel 152 connected for rotation with the lower end of the feed screw or shaft 143, the lower end of the latter being supported by suitable antifriction bearings 153 and 154 in the housing for the rapid traverse mechanism G. Hence, when the motor 148 is rotated, the feed screw 143 is rotated relative to the feed nut 142, thereby causing vertical movement of the work head D at a relatively rapid rate, hereinafter referred to as rapid traverse. The motor 148 is preferably reversible and its shaft 149, or the worm shaft 150 connected thereto, is provided with an electrically operated brake 155 which is spring actuated to normally engage the shaft for preventing rotation of the latter and of the feed screw 143, the brake being provided with an electromagnet which releases the brake when energized. It will be observed that there is a separate rapid traverse motor 148 for each of the work heads carried by the machine so that the rapid traverse movement of each work head is independent of that of all the others. The vertical movement of the work heads is selectively effected at either the feed rate by motor 47, or at the rapid traverse rate by motors 148, as determined by actuation of switches in an electrical circuit hereinafter described.

Figure 8:
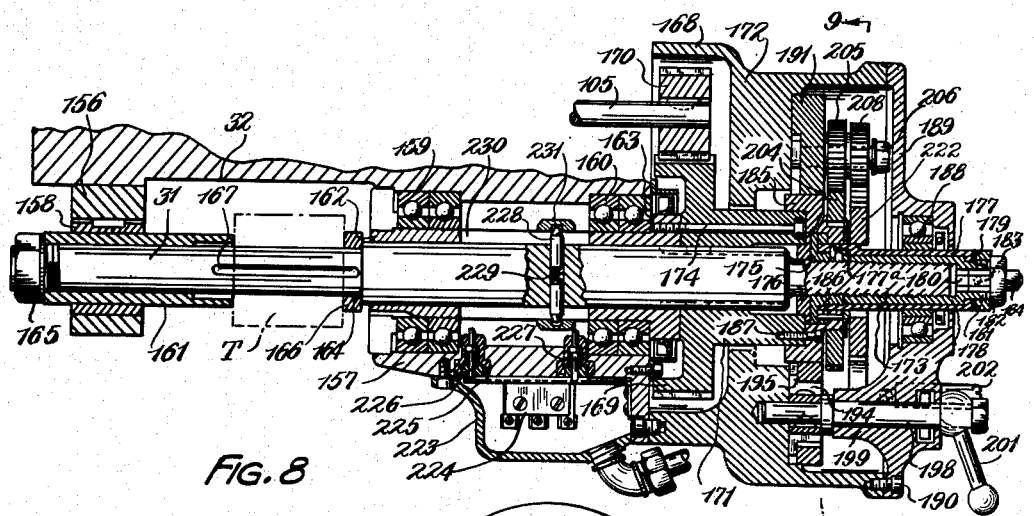
Fig. 8 is a longitudinal sectional view through one of the tool or hob heads with certain members shown in elevation.

Referring now to Fig. 8, it will be seen that the spindle supporting member 32 is provided with an outboard bearing support 156 and an inboard bearing support 157, the latter preferably being integral with the member 32. The bearing support 156 is provided with a non-rotatable sleeve 157 is provided with spaced antifriction bearings 159 and 160, the spindle 31 being journalled in the bearings for rotation and axial sliding by means of sleeves 161 and 162. The sleeve 161 both rotates and slides with the spindle 31 relative to the bushing 158 while the sleeve 162 rotates but is prevented from sliding relative to the bearings 159 and 160 by an integral shoulder 163 and by the mechanism connected thereto which is about to be described. The spindle 31 has a shoulder 164 intermediate its ends for engaging one side face of a hob or other tool T, indicated by dot-dash lines in Fig. 8, the sleeve 161 engaging the other side face of the tool, with the tool and sleeve being held against longitudinal displacement relative to the spindle by means of a nut 165 provided upon the threaded outer end of the spindle 31. In the event the longitudinal extent of the tool T is less than the distance between the inner end of sleeve 161 and the shoulder 164, as is the situation illustrated in Fig. 8, one or more spacing collars or washers 166 may be employed as shown. A keyway 167 is provided in the spindle 31 by means of which the tool is keyed to the spindle to prevent relative rotation therebetween.

Attached to the spindle supporting member 32, and to the bearing support 157, is a housing 168 containing the mechanism for rotating and axially moving the tool or hob spindle 31. This mechanism includes a gear 169, disposed within the housing 168, and slidably keyed or otherwise attached for rotation with the spindle 31 and for axial movement therebetween. This gear, and hence the spindle, are driven by a gear 170 which is fixed upon the outer end of the shaft 105 for rotation with the bevel gear 104 (see Fig. 3) when the clutch 63 connects shaft 62 for rotation by shaft 56. The gear 169 has a cylindrical sleeve-like extension 171, extending through an opening in an inner wall 172 of the housing 168, and the spindle 31 has a threaded portion 173 of reduced diameter extending beyond the outer end of this sleeve extension 171 of the gear 169. Screws 174 extend through the sleeve extension 171 of gear 169 and are threaded into the flange or shoulder 163 of the sleeve 162 thus connecting these members for rotation together.

Threaded upon the inner end of the threaded portion 173 of the tool spindle 31 is a sleeve nut 175 the inner end of which is externally flanged. Between the flange of nut 175 and the adjacent end of the sleeve extension 171 of gear 169 is disposed a spacer 176. The sleeve nut 175 is provided with external threads on which is threaded one end of a sleeve 177, the outer end of which is serrated. A pin 177a is inserted into the sleeve and sleeve nut, after the former has been screwed upon the latter, to prevent relative rotation between these parts when assembled. Within the sleeve 177 is disposed a sleeve nut 178 which threadably engages the threads on the portion 173 of the spindle, the outer end of this sleeve nut having a portion of reduced diameter forming an external shoulder which cooperates with an internal shoulder in the outer end of sleeve 177.

The sleeve nut 178 extends beyond the end of the sleeve 177 and has an annular member 179 keyed thereto, the inner face of the latter being serrated to cooperate with the serrations on the outer end of sleeve 177. The outer end portion of the nut 178 has a polygonally shaped axial opening 180 in which is disposed a correspondingly shaped inner end of a stud 181. This stud extends beyond the sleeve nut 178 and the annular member 179 and is preferably threaded intermediate its ends to receive a lock nut 182 which engages the outer face of the annular member. The stud is retained within the sleeve nut by means of a transversely extending drive pin 183 and the outer end 184 of the stud is polygonally shaped to receive a wrench or similar tool for a purpose hereinafter described.

A cap member 185, having an internal shoulder to which is connected a spacer 186, is slipped over the inner end of the sleeve 177 and is connected to the sleeve extension 171 of gear 169 by one or more screws 187. The spacer 186 in the cap member 185 engages the flange on the sleeve nut 175 thus preventing axial displacement of the latter while permitting relative rotation therebetween. The threaded portion 173 of the tool spindle, sleeve nut 178, and sleeve 177 are rotatably supported by antifriction bearings 188 in a cover plate 189 removably mounted upon the outer end of the housing 168 by means of screws 190.

An annular gear supporting plate 191, having a central opening for rotatably receiving the cap member 185, is disposed within the housing 168 between the wall 172 and the cover plate 189. This gear supporting plate is fastened, as by means of one or more stud bolts 192, to the inner wall 172 in the housing, thereby securing the plate against rotation while permitting its easy removal. The lower portion of the plate 191 has an arcuate opening 193 therethrough within a portion of which is positioned a segmental plate member 194. The outer surface of this segmental plate is substantially coplanar with the outer surface of the plate 191 and has a width slightly less than the width of the opening 193 so as to have a sliding fit therein. The inner surface of the plate 191, adjacent the opening 193 is recessed, as by milling or like operation, and fitted therein is a flanged portion 195 of the segmental plate 194. A compression spring 196 is disposed between one end of the arcuate opening 193 and the adjacent end of the segmental plate 194 and a bolt 197 is threaded into a threaded bore provided in the other end of the segmental plate.

A shaft 198 passes through the arcuate opening 193 adjacent the head of the bolt 197, the inner end of the shaft being journalled in a bore provided in the wall 172 of the housing 168. The outer end of this shaft is journalled in a boss 199 formed integrally with the cover plate 189 for the gear housing 168. Within the confines of the arcuate opening 193 the shaft 198 is provided with a cam 200, herein illustrated as a circular member having a flattened side. This cam engages the head of the bolt 197 and is keyed to the shaft 198 to rotate therewith. The outer end of the shaft 198 is provided with a suitable handle 201 for rocking the shaft and cam to bring the flattened face of the latter into engagement with the head of the bolt 197. When the cam is so positioned, the spring 196 moves the segmental plate 194 in a clockwise direction, as viewed in Fig. 9, for the purpose of disengaging the gearing for axially moving the hob spindle, which is about to be described. When the handle 201 is rocked to position the cam as shown, the spring 196 is compressed and the gearing is engaged. A pair of projecting rods or studs 202 and 203 (see Fig. 1) are provided on the cover plate 189, one on each side of the handle, to limit the movement of the latter and define these two positions of the cam. Wear between the cam and bolt head are compensated for by adjusting the position of the bolt 197 within its threaded bore in the segmental plate 194.

To effect axial movement of the hob or tool spindle 31, an epicyclic gearing, preferably of the planetary type, is employed so that the axial movement of the hob or other tool may be effected by the same mechanism which rotates the tool, but at a very slow rate with respect thereto. This gearing comprises a sun gear 204 which is mounted upon a reduced diameter portion of cap member 185 and keyed or otherwise connected thereto for rotation therewith when the gear 169 is driven. The gear 204 is in mesh with a gear 205 which is one of a pair of planetary gears rotatably supported upon a short shaft or bolt 206, the latter being adjustably connected in a slot 207 in the gear supporting plate 191 to permit proper alignment of the gears. Integral with, or connected to, the gear 205 is a smaller gear 208 which meshes with a gear 209 rotatably supported upon a short shaft or bolt 210 connected in a slot 211 in plate 191. The gear 209 is also in mesh with a gear 212, which is the smaller of two integral gears, supported by means of a short shaft or bolt 213 in a slot 214 provided in the plate 191. The larger gear 215, which is integral with the gear 212, meshes with a gear 216 rotatably supported on a short shaft or bolt 217 which is adjustably mounted in a slot 218 provided in the plate 191. The gear 216 is the larger of an integral pair of gears, the smaller of which, designated 219, meshes with a gear 220 rotatably supported upon a shaft or bolt 221 mounted on the segmental plate 194. The gear 220 also meshes with a second sun gear 222 keyed to the sleeve 177 which, as previously mentioned, surrounds the sleeve nut 178 cooperating with the threaded portion 173 of the hob or tool spindle 31.

The construction just described is such that when the clutch 63 is engaged to provide rotation of the shaft 62, gear 104 and shaft 105, the gear 170 on the latter drives the gear 169 (see Figs. 3 and 8). Rotation of the gear 169 rotates the spindle 31 and consequently the hob or tool T is rotated in timed relationship with the rotation of the work spindle 36 and with the feeding movement of the latter, imparted by shaft 102, since all these elements are driven from the common shaft 62. When the hob or tool spindle 31 is rotated during the cutting or hobbing operation, the said spindle and the tool thereon are also axially moved at a very slow rate by operation of the planetary gearing mechanism just described. That it to say, rotation of the gear 169 rotates the gear 204, since the latter is keyed to the cap member 185 which is in turn connected to the gear 169, and the gear 204 in turn drives gears 205 and 208 (see Figs. 8 and 9). The latter gear drives gear 212 through the idler gear 209 with consequent rotation of the gear 215, since the latter is integral or connected to the gear 212. The gear 215 drives the integral gears 216 and 219, the latter driving the second sun gear 222 through the idler gear 220. Rotation of the gear 222 causes the sleeve 177 to rotate, since these members are keyed together. The serrations on the outer end of the sleeve 177 being held in engagement with the serrations on the annular member 179 by the nut 182, the annular member is also rotated with consequent rotation of the sleeve nut 178 which is keyed with the annular member. The sleeve nut 175 is also rotated since the sleeve 177 is connected thereto by the pin 177a. This rotation of the sleeve nuts 175 and 178 causes the spindle 31 to be slowly advanced in an axial direction by virtue of the cooperation of the internal threads on the nuts with the threaded portion 173 of the spindle, the spindle sliding within sleeve 162 and the sleeve 161 sliding within the bearing 158.

The sleeve nut 175 is provided to take up any play between the sleeve nut 178 and the threaded portion 173 of the spindle. This is effected by loosening the lock nut 182 sufficiently to disengage the serrations on the annular member 179 from the serrations on the end of sleeve 177. A wrench or other tool is then applied to the outer end 184 of the stud 181 and the latter is rotated slightly thus rotating the nut 178 relative to the sleeve 177. The nut 175 remains stationary during this adjustment since it is connected with the sleeve 177 and hence the spindle is held stationary so that the nut 178 is rotated relative to the spindle sufficiently to take up the play therebetween.

After this adjustment is effected the annular member is reengaged with the sleeve 177 and the lock nut 182 tightened thus reestablishing the driving relationship between the sleeve 177 and the sleeve nut 178.

The several gears in the planetary system may have any desired ratios but are preferably so chosen that the axial feed of the hob spindle is relatively slow. In the illustrated embodiment the rate is such as to produce complete axial movement during an interval of one work shift such as eight hours or the like. Hence, the hob or similar tool is so operated that the wear thereupon is substantially uniformly distributed over the entire surface of the hob. When the hob has been advanced its maximum amount in an axial direction, operation of that unit of the machine is automatically interrupted, after its working cycle is completed, in a manner hereinafter described, and the operator is advised thereof by the lighting of an electrical signal light L (see Figs. 1 and 19). This, however, does not interfere with the operation of the other units of the machine and hence the return of the hob to its initial position can be effected when it is convenient.

Figure 9:
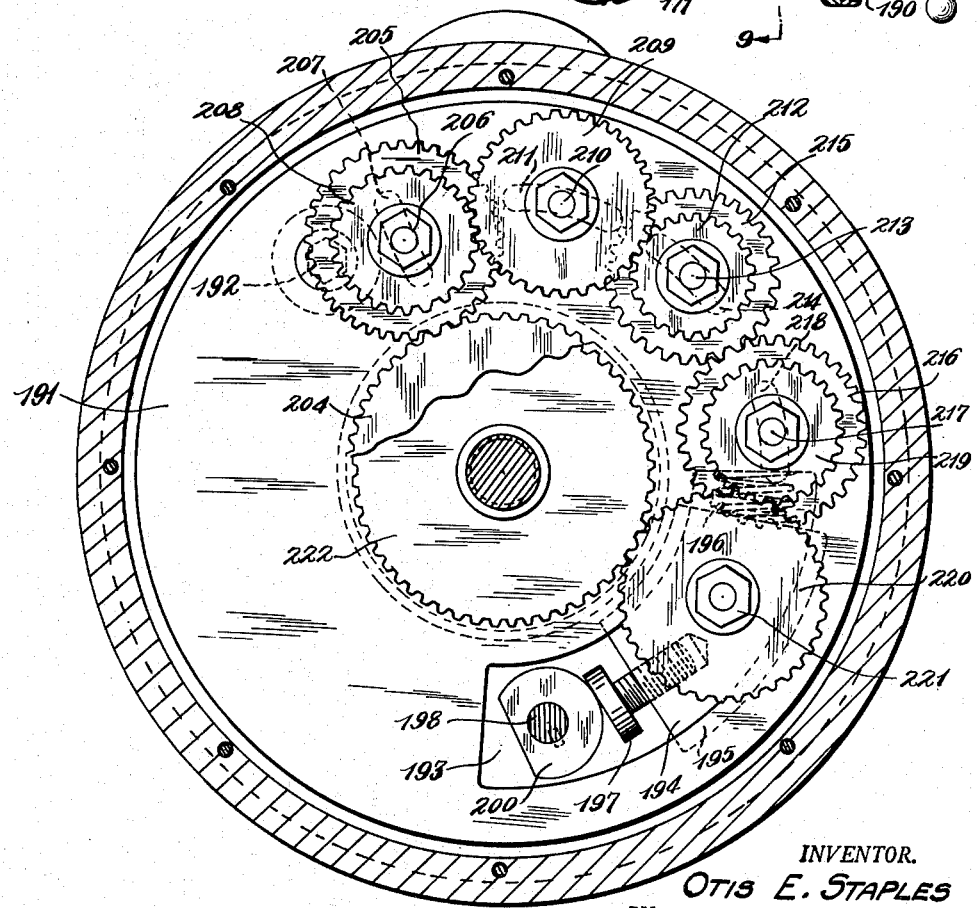
Fig. 9 is a sectional view on the line 9—9 of Fig. 8.

The hob spindle and hob are returned to their initial positions by first rotating the handle 201 to position the flattened portion of the cam 200 in engagement with the head of the bolt 197. The compression spring 196 will then move the segmental plate 194 within the opening 193 an amount sufficient to permit the gear 220 to be disengaged from the gear 219, the gear 220, however, remaining in continuous mesh with the gear 222. This disconnects the planetary gearing from the spindle advancing mechanism, and, by application of a wrench or similar tool to the nut-like portion 184 of stud 181, the latter may be rotated thus threading the portion 173 of spindle 31 through the nuts 175 and 178 and thereby returning the spindle and its hob to their initial positions, which will be evidenced by extinguishing of the signal light L. The hob or tool T is replaced and the wrench or other tool is removed from the nut-like portion 184 of stud 181. The handle 201 is then rotated in a reverse direction to again position the cam 200 with its rounded portion in engagement with the head of bolt 197, as shown in Fig. 9, thus reengaging the gear 220 with the gear 219, the alignment of the gears being maintained by the continuous meshing of the gear 220 with the gear 222 and by the cooperating arcuate shapes of the opening 193 and the sides of the segmental plate 194. The planetary gearing is thus reengaged to again slowly advance the hob when this unit of the machine is once more placed in operation. As previously mentioned, the rods or studs 202 and 203 upon the outer surface of the cover plate 189 limit the movement of the handle 201, thereby insuring proper positioning of the cam 200 in either of its two aforementioned positions.

Extending outwardly from the bearing support 157 of the hob shifting mechanism is a housing 223 for the electrical switch mechanisms, which is actuated by the axial movement of the hob spindle to its extreme positions, for controlling operation of the spindle and of the previously mentioned signal light. Preferably, the switch 224 employed for this purpose is of the type known as a "microswitch" having a double set of contacts, however, two separate "microswitches" each having a single set of contacts may be employed. The switch 224 is provided with an operating bar 225 extending substantially parallel with the outer surface of the bearing support 157 and cooperating with actuating pins 226 and 227 suitably mounted in bores extending through the bearing housing 157 adjacent the inner faces of the bearings 159 and 160, respectively. The tool or hob spindle 31 is provided with a transverse bore in which is disposed a two-piece pin 228, the two portions of which are separated by a compression spring 229. This spring urges the two portions of the pin outwardly of the bore in the spindle so as to extend through an axial slot 230 provided in the sleeve 162. The outer ends of this pin are positioned within a circular groove or recess on the inner face of a switch operating ring 231, the latter being slidably mounted on the outer surface of the sleeve 162 intermediate the bearings 159 and 160.

The construction is such that, when the spindle 31 is at its starting or retracted position, as illustrated in Fig. 8, the switch operating ring 231 engages the actuating pin 227 thereby moving the switch operating bar 225 in a manner which operates the switch 224 to extinguish the signal light L and prepare the electrical circuit, hereinafter described, of that operational unit of the machine for a new operation.

When the spindle 31 has been moved to its extreme advanced position, i. e., to the left as shown in Fig. 8, the switch operating ring 231 engages the actuating pin 226, causing the latter to move outwardly thereby moving the operating bar 225. This operates the switch 224 in a manner to light the signal light L and open a portion of the electrical circuit for the corresponding hobbing unit of the machine to prevent the starting of the unit upon a new machining cycle until the spindle has been returned to its initial position, as above described.

Each of the work heads D of the machine is provided with a fluid operated work holding means E for securing a work-piece to the work spindle. In the illustrated machine, this means comprises an internal chuck 232 secured to the upper end of spindle 36 for rotation therewith. As shown in Fig. 4, the body of this chuck and the spindle 36 are provided with aligned bores through which a chuck actuating rod 233 extends, the upper end of the rod being provided with an enlarged portion having a substantially conical surface 234 slidable within a counterbore provided at the upper end of the chuck. Extending radially outward through the side walls of the upper portion of the chuck are a plurality of work gripping fingers 235, the fingers being slidable radially and having inclined camming surfaces on their inner ends for cooperation with the conical surface 234. The construction is such that, when the rod 233 is moved downwardly within the chuck 232, the fingers 235 are forced radially outwardly to engage the work-piece W and securely hold the latter.

Movement of the rod 233 is effected, in accordance with this invention, by a fluid operated means which comprises a cylinder 236 attached to the lower portion 37 of the work head D by a suitable plate or bracket 237. The lower end of the rod 233 extends within the cylinder 236 and is provided therein with a piston, not shown which is adapted to be moved vertically in either direction by fluid under pressure supplied through pipes or hoses 238 and 239, which are connected to a source of fluid under pressure in a manner hereinafter described. Hence, when fluid pressure is allowed to enter the cylinder 236 through one of the pipes, the rod 233 is lowered thereby actuating the fingers 235 into work-gripping position. Reversing the direction of application of fluid pressure to the pipes 238 and 239, and hence to the cylnder 236, elevates the rod 233 thereby releasing the fingers 235 and freeing the work for ready removal. The internal construction of the fluid operated means, generally designated as a cylinder 236, is substantially like that employed for the tail stock mechanism about to be described.

Referring now to Figs. 2, 10, 11 and 12, it will be seen that the tail stock mechanism for each unit of the machine, generally designated 240, is supported by the tail slide 40 upon the ways 41 of the vertical portion 42 of work head D, the tail slide being provided with clamping plates and screws 43 cooperating with the ways 41 (see Fig. 10) so that the tail slide and the tail stock mechanism may be moved along the ways to a desired position and secured to the ways at that position. The tail slide 40 is provided on its outer end with a bore in which is positioned the lower, reduced diameter portion 241 of a cylinder 242 which forms the main body of the tail stock mechanism. This lower portion 241 of the cylinder is provided with one or more longitudinally extending tapered slots or grooves, such as 243 and 244, at spaced points on that side thereof which is adjacent the work head, and tapered gibs or wedges 245 and 246 are inserted in the tapered grooves 243 and 244, respectively, to cooperate with the bore of the tail slide 40 and thereby clamp the lower portion 241 of the tail stock therein.

The tapered gibs or wedges are actuated by screws 247 and 248 which are threaded into the upper wall of a recess provided in the lower surface of the tail slide 40, these screws each being provided with an enlarged integral collar or washer 249, 250 which fits in a slotted opening in the side of the corresponding gib or wedge 245 and 246. Hence, when the said screws 247 and 248 are threaded inwardly, they carry the wedges or gibs upwardly, as viewed in Fig. 11, thus firmly gripping the portion 241 of the cylinder 242 and retaining the latter in proper position within the tail slide 40. A retainer 251 is provided in the tail slide 40, below the gibs or wedges 245 and 246, to prevent the latter from dropping out of the slide if the screws 247 or 248 should be disengaged from their threaded bores. A suitable collar or washer 252 may be provided between a shoulder on the lower surface of cylinder 242 and the top surface of the slide member 40, if desired, to provide a predetermined spacial relationship between the cylinder and the tool slide.

A piston rod 253 extends from the hollow interior of the cylinder 242 through an aligned bore in the lower portion 241. Adjacent its upper end, the piston rod is provided with a piston plate 254, which is illustrated as being integral with the piston rod and having a sliding fit within the interior of the cylinder 253. Piston packings 255 and 256 are provided upon the upper and lower surfaces of the piston plate, respectively, and retained thereon by rings 257 and 258, respectively, which are connected to the piston plate 254 by screws 259 and 260, respectively. There is thus provided a fluid-tight piston which moves downwardly within the cylinder when fluid under pressure is supplied through an opening 261 in the cover plate 262, exhaust being effected through an opening 263 in the lower side of the cylinder below the piston. The piston is moved upwardly within the cylinder when fluid pressure is supplied through the opening 263, the opening 261 then acting as the exhaust. A sealing means 264 is provided in the bottom of the cylinder 242 and cooperates with the piston rod 253 to prevent the leakage of fluid thereabout.

The lower end of the piston rod 253 is longitudinally bored for a considerable distance, and within this bore is inserted a tail center 265. The upper end of the tail center is recessed and provided with a ball 266 for cooperation with a wear plate 267 provided at the inner end of the bore in the piston rod, the ball 266 and wear plate 267 permitting substantially frictionless rotation of the tail center relative to the piston rod. The tail center 265 is provided with an annular groove 268 with which the reduced diameter, inner end of a set screw 269 cooperates, the head of the screw being flush with or countersunk below the outer surface of the piston rod 253 so as not to interfere with the sliding of the latter within the bore of the cylindrical portion 241. The tail center 265 is also preferably provided with a spiral lubricating groove 270 communicating with aligned lubricating openings in the slide 40 and the portion 241 of the tail stock, an oil cup 271 being screwed into these openings.

It will be apparent, from the construction just described, that when the piston is moved downwardly by the application of fluid pressure to the opening 261, the piston rod 253 moves the tail center 265 into engagement with the upper end of the workpiece W clamped upon the chuck 232. The tail stock will remain in firm engagement with the workpiece throughout the machining operation by virtue of the fluid pressure acting upon the piston, rotation of the tail center with the workpiece being permitted by the rotatable mounting of the tail center in the hollow bore at the lower end of the piston rod. When the machining operation has been completed, the application of fluid pressure to the opening 263 and the use of the opening 261 as the exhaust, moves the piston and piston rod upwardly withdrawing the tail center 265 from engagement with the workpiece so that the latter may be removed, it being remembered that the work-gripping fingers 235 of the chuck are also released at this time.

Figure 10:
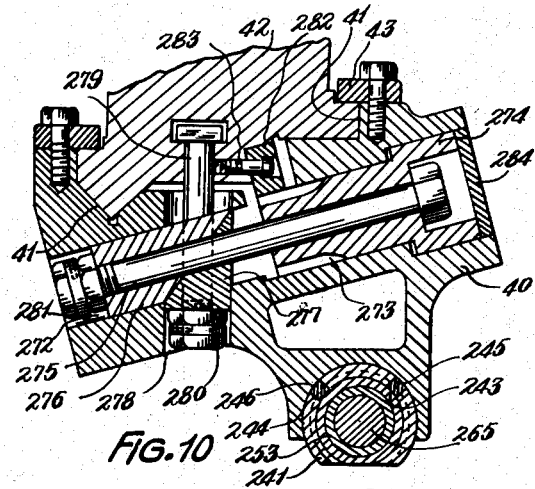
Fig. 10 is a fragmentary sectional view through one of the tailstock supporting means taken substantially on the line 10—10 of Fig. 1.
Figure 11:
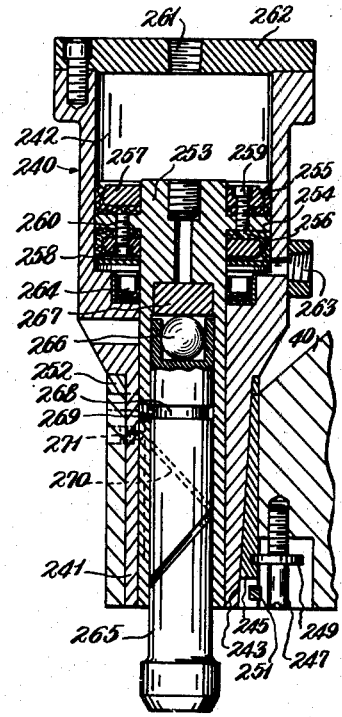
Fig. 11 is a longitudinal sectional view through one of the improved fluid operated tailstock mechanisms and a portion of the tailstock supporting means.
Figure 12:
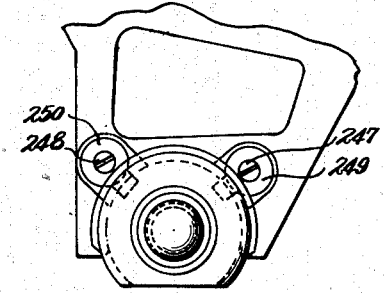
Fig. 12 is a bottom elevational view of one of the tailstock mechanisms, only a portion of the tailstock supporting means illustrated in Fig. 10 being shown.

The tail slide 40 for mounting the fluid pressure operated tail stock may be of substantially solid construction or may be formed as a relatively hollow member constructed similar to those illustrated in U. S. Patents Nos. 2,292,260 and 2,231,866. A mounting of the latter type is here disclosed to reveal how such tail slides may be modified to incorporate the improved tailstock mechanism. As shown in Fig. 10, the tail slide 40 comprises a casting in which are formed suitable ways for cooperation with the vertical ways 41 of the portion 42 of the work head D. The tail slide is further provided with a transversely extending bore 272 within one end of which is positioned a pinion 273 formed upon the inner end of a substantially cylindrical member 274. The member 274 has a central bore through which passes a bolt 275, the outer end of the latter being provided with a substantially cylindrical locking member 276. The locking member 276 has a tapered inner surface cooperating with a correspondingly tapered inner surface on a second cylindrical member 277 which is positioned within a bore 278 extending substantially transversely of the bore 272. A bolt 279, having a headed portion resting in a slotted opening in the vertical portion 42 of the work head D, extends outwardly through the cylindrical member 277 and is provided on its outer end with suitable nuts 280. The outer end of the bolt 275 is likewise provided with nuts 281. It will be seen, therefore, that when the nuts 280 and 281 are tightened, the members 277 and 276 will be locked in engagement and the bolt 279 will clamp these members, and hence the slide 40, to the vertical portion 42 of the work head. This clamping is further assisted by the previously described clamping means 43 which comprise suitable plates and screws cooperating with the vertical ways 41.

The interlocking of the members 276 and 277 position the pinion 273 for cooperation with a vertical rack 282 attached to the vertical portion 42 of the work head by suitable screws 283. By slightly loosening the nuts 280 and the clamping means 43 and by rotating the member 274, the pinion 273 thereon causes the tail slide 40 to move vertically with respect to the work head member 42 by virtue of the cooperation between the pinion 273 and the teeth of the rack 282. When the tail slide has reached the desired position the clamping means may be retightened to retain the tail slide in its adjusted position.

In the tail slide mechanisms of the aforementioned patents there was no provision for vertical movement of the tail center relative to the tail slide, and hence a rack and pinion arrangement, similar to that just mentioned, for adjusting the tail slide was necessary to secure the proper engagement of the tail center with the work. Therefore, an operating handle was provided for the member 274. In the improved form of the tail stock, herein disclosed, it is no longer necessary to move the tail slide to effect engagement and release of each workpiece, since the tail center 265 is now moved vertically by fluid pressure to effect engagement with the work and subsequent release therefrom. Hence, the tail slide need only be adjusted once for each size of work and this adjustment need not be made with great exactitude. It follows that the rack 282 and the cooperating pinion mechanism are no longer necessary, adjustment of the slide being effected by simply loosening the clamping means and manually sliding the tail slide upon the ways. Hence, when the tail slide mechanisms of the aforementioned patents are to be converted for use with the improved fluid operated tail stock herein disclosed, the reduced cylindrical portion 241 of the latter is simply inserted within the cylindrical opening provided in the tail slide 40 for the prior art type of tail center, and the operating handle for the rack and pinion mechanism is then replaced by a simple disk or cover plate such as 284, the rack 282 being omitted or left in place as desired since it no longer has any necessary function in the device.

The fluid pressure for operating the clutch, the tail center and the chuck mechanisms may be either hydraulic or pneumatic and may be supplied from any suitable source such as a reservoir and pump mounted in the base of the machine. As shown in the drawings, however, air pressure is utilized and is supplied to the machine from an outside source of supply such as the air line commonly provided in factories for cleaning purposes or the like. The air pressure is conducted from such a supply to the machine at the top thereof through a stationary pipe 285 (see Figs. end of which is connected by a T 293 to the pipe portion 286 substantially in alignment with the vertical axis of the machine and the lower end thereof is journalled in a rotatable air distributing chest 287. This chest is supported above the motor 47 by a spider-like framework 288 having radially extending arms 289 connected with vertically extending frame members 290 which extend upwardly from the turret cap member 46 and are circumferentially spaced thereabout. Hence, the chest 287 rotates with the turret when the rotation motor 25 is energized. The air distributing chest 287 is provided with a plurality of radially extending pipes 291 for conducting the air pressure from the chest to each operational unit of the machine. Since all of the operational units of the machine are identical the air distribution from only one of the pipes 291 will be described.

The pipe 291 of each unit is connected to one end of a flexible conduit or hose 292 the other end of which is connected by a T 293 to the pipe or hose 85, and to a pipe or hose 294. The pipe or hose 85 is the fluid pressure supply line for the valve 84 (see Fig. 17) which controls the operation of the clutch for the unit. The pipe 294 is connected to a solenoid operated two-way valve 295, the solenoid 296 of which is energized by an electrical current flowing in a cable 297 extending to a suitable outlet 298 upon the cap member 46 of the machine. From the valve 295 a pipe or hose 299 extends vertically downward adjacent the vertical portion 42 of the work head D, the lower end of the pipe being connected with a T 300 from which a pipe or hose 301 extends to a pressure regulator 302. From the lower end of the pressure regulator, the previously mentioned pipe or hose 238 extends to the upper connection for the cylinder 236 of the fluid pressure operated chuck. A branch pipe or hose 303 extends from the T 300 to the upper opening 261 of the fluid pressure operated tail stock.

From the lower portion of valve 295, a pipe or hose 304 leads vertically downward adjacent the portion 42 of the work head D, the lower end of this pipe or hose terminating in a T 305 to which is connected a pressure regulator 307 from which a branch pipe or hose 308 leads to the side exhaust opening 263 in the fluid operated tail stock. Also connected to the T 305 is one end of the previously mentioned pipe or hose 239, the other end of which is connected to the cylinder 236 for the fluid operated chuck.

The valve 295 is so constructed that when the solenoid 296 is deenergized the valve is positioned to cause fluid pressure from the pipe 291 to communicate with the pipe 299, the pipe 304 being vented to the atmosphere through the valve. When the solenoid 296 is energized the valve 295 is operated to apply fluid pressure to the pipe 304, the pipe 299 being then vented to the atmosphere. It follows, therefore, that when the solenoid is deenergized the valve 295 causes fluid pressure to be applied through the pipes 299, 301, and 238 to the cylinder 236 causing the rod 233 of the chuck 232 to actuate the latter for firmly engaging the workpiece W. Fluid pressure is also supplied through the pipe 303 causing the piston of the tail stock mechanism to be moved downwardly to engage the tail center 265 with the workpiece. Fluid pressure will be maintained in these lines throughout a cutting or hobbing operation, thus holding the parts in their aforementioned positions. When the cutting or hobbing operation is completed, the solenoid 296 is energized, as hereinafter described, actuating the valve 295 to vent the pipes 238, 301, 303 and 299 and to supply fluid pressure through the pipes 304, 239 and 308 thereby releasing the chuck and actuating the tail center 265 in a reverse direction to release the workpiece.

Since the chuck and tail center are held in work gripping positions by air pressure, a failure of the supply of air pressure to the pipe 285 would partially release the work with consequent damage thereto and to the hob T if the latter is operating upon the work. Also, since the clutch is held in its disengaged position by air pressure, a failure of the supply of the latter would allow the clutch to improperly engage. To prevent such conditions from occurring, the pipe 285 is provided with a pressure responsive electrical switch 309 (see Figs. 1, 19 and 19A). This switch is normally closed but if the air pressure drops below a predetermined value the switch opens thus stopping the entire machine as will become apparent from the subsequent description of the electrical circuit for the machine.

The machine is also provided with a coolant system for supplying a cutting or cooling liquid to the hobs or tools during a machining or hobbing operation. The coolant or cutting liquid is supplied from a reservoir within the base of the machine by means of a pump, not shown, and by a conduit 310 and a pipe or pipes 311 to a trough reservoir 312 in the cap member 46 of the rotatable turret (see Fig. 2). Equally spaced pipes 313, one for each unit, conduct the coolant or cutting liquid from the trough 312 to valves 316, and to each of the latter is connected a pipe 314 (see Fig. 1). The lower end of each pipe 314 is provided with a nozzle 315 adjacent the hob or tool spindle of the unit and so directed that the coolant or cutting fluid will flow over the hob or other tool and the work being cut thereby, the liquid being returned to the base of the machine by gravity for cleaning and further circulation. The valve 316, between the pipes 313 and 314 for each unit, is electrically operated and is controlled in a manner, hereinafter described, such that coolant is allowed to flow only when a cutting operation is being performed and is automatically terminated when the cutting operation has been completed. Lubrication for the machine is provided by a circulating system of conventional design, the vertical supply pipe 317 of which extends through the hollow turret (see Fig. 2).

The base 20 of the machine is provided with a vertically extending standard 318 and with a shield or cover 319 for the lower portion of the machine, the said standard being to one side of the loading station which is formed by reducing the height of a portion of the cover 319 (see Fig. 1). Adjacent the top of standard 318 is mounted a switch box 320 for controlling the rotation motor 25, the cut motor 47, and the motor for the coolant pump which is provided in the base of the machine and pumps coolant or cutting fluid through the conduit 310 and pipes 311 to the trough 312. The switch box 320 is provided with a start button 321 and a stop button 322 for the rotation motor 25; start and stop buttons 323 and 324, respectively, for the cut motor 47; and start and stop buttons 325 and 326, respectively, for the motor of the coolant pump. The electrical interconnections of the switches operated by these buttons and their co-operating circuits are schematically represented in Figs. 19 and 19A together with schematic representations of the electrical circuits for one unit of the hobbing machine.

The relays and circuits operated by the start and stop buttons 321 to 326, inclusive, are enclosed in a main control box 327 mounted upon the standard 318. This box is provided with a cover 328 and positioned within the box is a safety switch 329 which is adapted to interrupt the supply of electrical power to the machine when the cover is open, the switch being held in circuit closing position when the cover 328 is closed.

Figure 16:
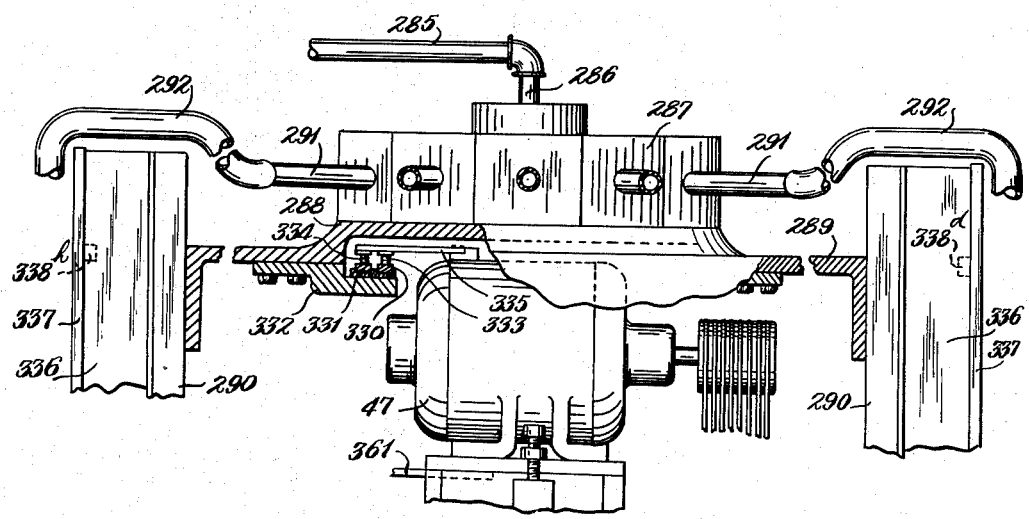
Fig. 16 is a fragmentary view, partly in side elevation and partly in section, illustrating the air distributing means and one set of collector rings mounted at the top of the machine.

Electrical power is conducted to each of the rotating operational units of the machine by two separate sets of collector rings and brushes. As shown in Fig. 16, one of these sets comprises a pair of spaced collector rings 330, 331 mounted upon, but insulated from, a supporting ring member 332 which is bolted to the underside of the spider framework 288, supporting the air chest 287, and hence the collector rings are supported for rotation with the turret B. The collector rings are shielded by a cover which may be an integral part of the spider framework 288 or a separate member connected thereto. Cooperating with the collector rings 330 and 331, respectively, are brushes 333 and 334 which are stationarily supported by an arm or bracket 335 mounted upon the top of the cut motor 47. Wires, which are not shown in Fig. 16, conduct electrical power from the main control box 327 to the brushes 333 and 334 and other wires are connected to the collector rings at spaced points thereabout to conduct the electrical power to separate control cabinets or boxes 336 (see Figs. 1, 2 and 16) of which there is one for each operational unit of the machine.

The control cabinets or boxes 336 are mounted adjacent the top of the turret B upon the vertically extending frame members 296 and each box contains the relays and circuits for controlling the operation of the adjacent hobbing unit.

Each cabinet 336 is provided with a cover 337 and positioned within each cabinet is a safety switch; the switches for the several cabinets being designated 338a, 338b, 338c, 338d, 338e, 338f, 338g, and 338h, respectively, there being eight operational units in the illustrated machine each of which has a control cabinet 336. Each of these switches is adapted to interrupt the supply of electrical power to the machine when the corresponding cabinet cover 337 is open, power being restored only when all of the covers are closed.

Figures 18, 20:
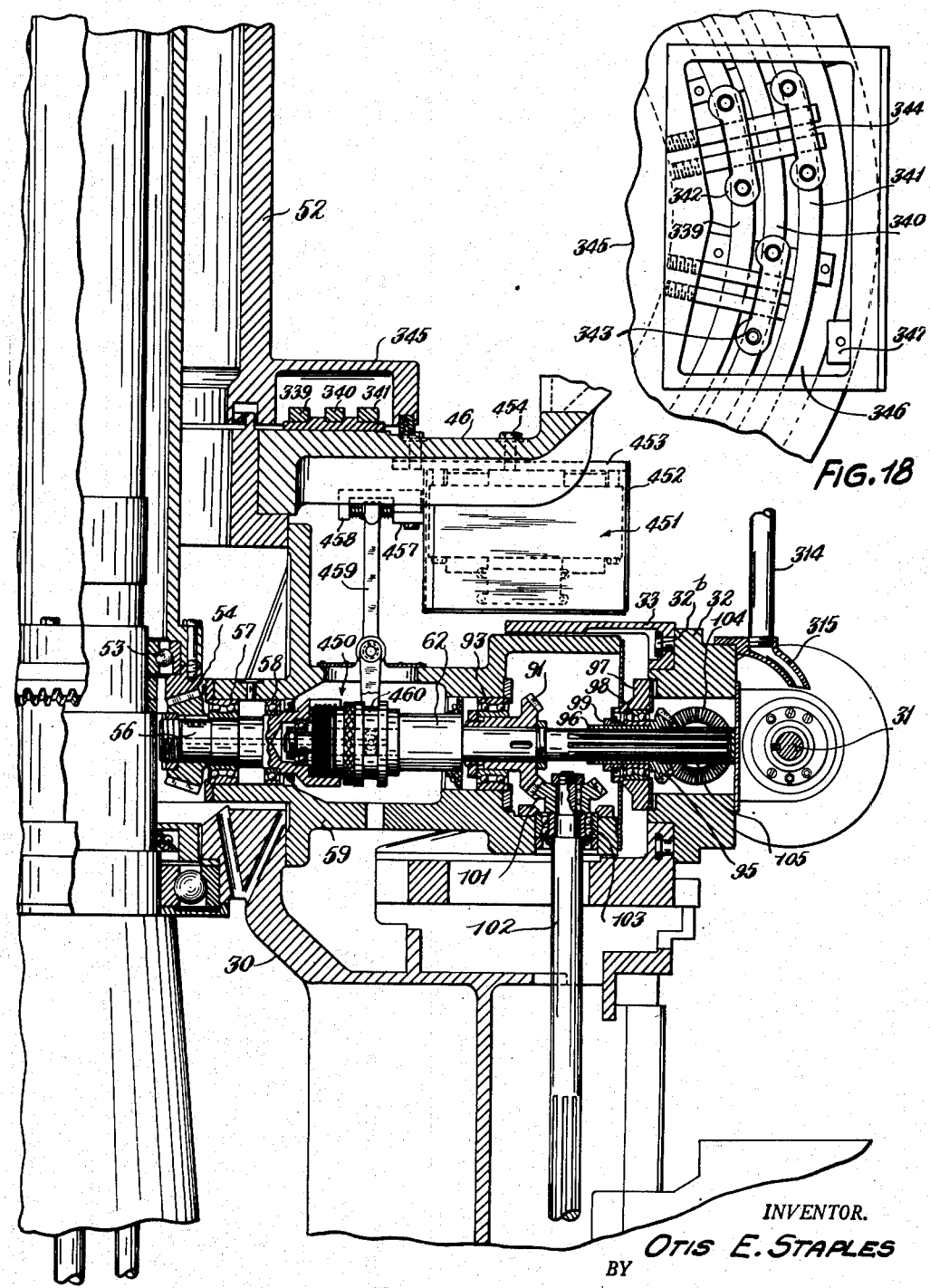
Fig. 18 is a fragmentary top plan view of a portion of the housing for the collector rings illustrated in Figs. 2 and 3, the cover plate for the brushes being removed.
Fig. 20 is a view similar to Fig. 3 but showing a modified form of clutch and clutch actuating means.

The other set of collector rings and brushes, for conducting electrical power to the operational units of the machine, are mounted upon the cap member 46 of the turret. As shown in Figs. 2, 3 and 18, there are three spaced collector rings 339, 340 and 341 insulatedly mounted upon the upper surface of the cap member for rotation therewith. Cooperating with the collector rings 339, 340 and 341, respectively, are stationary brushes 342, 343 and 344 mounted in a housing formed by an annular flange 345 provided upon the lower end of the stationary housing 51. The brushes are accessible through an opening 346 in the flange 345 and this opening is normally closed by a cover plate, not shown. Mounted upon the flange 345 within the opening 346, and positioned to be operated by the cover therefor, is a safety switch 347 which is adapted to interrupt the supply of electrical power to the machine when the cover is open, the switch being held in circuit closing position when the cover is replaced. Hence, if a workman removes the cover for the purpose of inspection or replacement of the brushes he cannot come into contact with a "live" portion of the circuit. The brushes 342, 343 and 344 are connected with a power supply circuit in the main control box 327 and the collector rings 339, 340 and 341 are connected at spaced points thereabout to the circuits in the separate control cabinets 336 for each unit.

Figure 15:
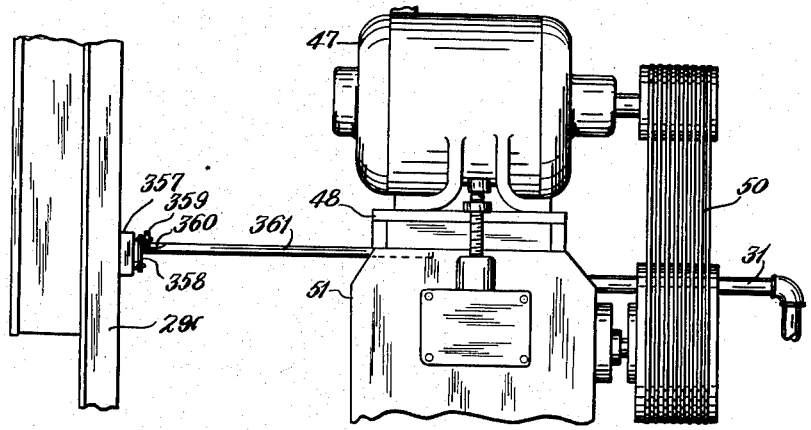
Fig. 15 is a fragmentary side elevational view of a portion of the interior of the machine adjacent the top thereof illustrating the stationary cam for actuating a switch mounted on the back of each unit of the machine.

Depending from each cabinet 336 is a station or unit switch box 348 provided with the previously mentioned light L associated with the hob shifting mechanism, and with switch operators 349, 350 and 351 for controlling the coolant valve and the starting and stopping of the hobbing operation, respectively, for that unit. A toggle switch 352 is mounted at the bottom of the box 348 to selectively condition the unit for either manual or automatic operation as hereinafter described. As shown in Figs. 1 and 2, one side of each of the cabinets 336 is provided with a hobbing selector switch 353, an automatic return switch 354, a feed control switch 355, and an adjustable timer 356, each of which is manually settable for controlling the operation of the hobbing unit as hereinafter described. In addition, a switch 357, one for each unit, is mounted on the rear surface of one of the vertically extending frame members 290 for the corresponding unit (see Fig. 15). These latter switches are of the type which are spring urged to circuit opening position and each is provided with a rocking arm 358 on the outer end of which is positioned a roller 359 extending into the path of a single stationary cam 360. This cam is formed on the outer end of an elongated rod or bar 361, positioned adjacent the loading station for the machine and having its inner end supported upon the top of the machine between the motor support 48 and stationary housing member 51. Hence, as the turret of the machine rotates, the switches 357 are sequentially operated to closed position by the cam 360, the switches moving to open position as soon as the rollers thereof have passed the cam.

Referring now to Figs. 1, 2, 13 and 14 it will be seen that one side of the upper portion of the work head D, adjacent the ways 45 is provided with a plate 362 having spaced vertical slots 363 and 364. A longitudinally extending cam member 365 is adjustably mounted on the inner face of the plate by a bolt or bolts 366 passing through the slot 363, and a pair of spaced projections 367 and 368 are adjustably connected adjacent the top and bottom of the slot 364 by bolts 369 and 370, respectively. Adjacent the plate 362 of each work head the cap member 46 is provided with a switch 371 having a rocking actuating arm 372 extending into the path of the cam 365. A switch 373 is also mounted upon the cap member 46 adjacent the plate 362 and is provided with a rocking operating arm 374 extending into the path of the spaced projections 367 and 368 for operation thereby. The cap member 46 is further provided with an electrical switch 375, one for each hobbing unit, having an operating arm 376 extending into the path of spaced projections 377 and 378 which are adjustably connected to the other side of the top portion of the work head.

The switch operator 349 is a knob, movable between "on" and "off" positions for actuating the movable contact 349a (see Figs. 19 and 19A) to and from circuit closing position, thereby controlling a solenoid CS which operates the coolant supply valve 316. Switch operator 350 is a push button, hereinafter referred to as the "start" button for the unit, adapted to actuate the movable contact 350a into engagement with the stationary contacts of the start switch, the contact 350a moving to open position when the button or operator 350 is released. The switch operator 351 is a push button, hereinafter referred to as the "stop" button for the unit, adapted to move the contact 351a from normally closed engagement with one set of stationary contacts and to simultaneously move the contact 351b into engagement with a second set of stationary contacts, the movable contacts 351a and 351b being returned to their initial positions upon release of the button 351. The toggle switch 352 comprises two movable contacts or blades 352a and 352b for movement to and from circuit closing position, marked "Auto" and "Man" in Figs. 19 and 19A, the blades being maintained by the toggle mechanism in the position to which they have been actuated.

The switch 371 includes two spaced contacts 371a and 371b, the switch being adapted to move its upper contact 371a from a position in engagement with one set of stationary contacts and to simultaneously move its lower contact 371b into engagement with another set of stationary contacts when the switch operating arm 372 moves beyond the cam member 365, the contacts of the switch returning to their positions as shown in Figs. 19 and 19A when the arm 372 again engages and rides upon the cam member. The switch 373 likewise comprises two spaced movable contacts 373a and 373b, the switch being adapted to move its upper contact 373a from a position in engagement with one set of stationary contacts and to simultaneously move its lower contact 373b into engagement with a second set of stationary contacts when the arm 374 engages the projection 368. The movable contacts 373a and 373b remain in this new position until the arm 374 engages the projection 367 at which time the contacts are moved back to their initial position. The switches 375 for each of the work units are each provided with normally open contacts 375a and normally closed contacts 375b, the contacts 375a for all of the switches being connected in parallel and this parallel connection is in turn in series with a safety relay SR; the contacts 375b of this switch being connected in series with one of the main power supply lines for the control circuit of the corresponding unit. The switches 375 are spring urged to maintain their contacts in these positions, each switch being operated to close its contacts 375a and open its contacts 375b when the operating arm 376 strikes either the projection 377 or 378 the movable contacts returning to their original positions when the arm is moved out of engagement with either projection.

The hobbing selector switch 353 is movable between two positions corresponding to the two different methods of hobbing which may be performed by the machine, namely "normal" and "climb." This switch is provided with movable blades 353a, 353b, 353c, 353d, 353e and 353f which move together to change the circuit relationships thereby preparing the machine for operation in accordance with the selected mode of hobbing as hereinafter described. The automatic return switch 354 is provided with two movable contacts or blades 354a and 354b, operable together between "on" and "off" positions. The feed control or selector switch 355 is likewise provided with two contacts or blades 355a and 355b, operable together between "on" and "off" positions. The adjustable timer 356 comprises a conventional time relay TA having a movable contact TA–1 which is actuated at a predetermined time after the relay TA is energized, the length of this time interval being regulated by adjustment of the knob 356a of the timer.

As shown in Figs. 19 and 19A, power is supplied to the hobbing machine from power supply lines 379, 380 and 381 provided with a circuit breaker 382. The power supply lines 379 and 381, on the machine side of the circuit breaker 382, are connected by wires 383 and 384 to the primary of a transformer 385, the secondary of which is connected with a circuit controlled by the previously mentioned start and stop buttons 321 to 326, inclusive, for controlling the operation of the rotation motor 25, the cut motor 47 and a motor 386 for the coolant pump. Thus, one lead 387 of the secondary of the transformer is connected through the normally open contacts PC–4 of a power controller PC, normally closed current overload switches 388, 389 and 390 to one side of the stop switch controlled by the button 322, the other side of this switch being connected to one side of the starting switch controlled by the button 321, the other side of the latter being connected with the rotation moor relay RT. The other side of the rotation motor relay RT is connected to a wire 391 leading to the other side of the secondary for the transformer 385. The relay RT is provided with four sets of normally open contacts RT–1, RT–2, RT–3 and RT–4. The contacts RT–1 are adapted to provide a holding circuit around the start button 321 when the relay is energized. The contacts RT–2, RT–3 and RT–4 are adapted to close an energizing circuit for the rotation motor 25 to the power lines 392, 393 and 394 which are respectively connected to normally open contacts PC–1, PC–2 and PC–3, these contacts in turn being connected with the circuit breaker 382.

The power controller relay PC, which operates the contacts PC–1, PC–2, PC–3 and PC–4, is connected in series with the secondary of the transformer 385 by the wire 391, brush 333, collector rings 330, unit control cabinet normally closed switches 338a to 338h, normally closed contacts SR–1, switch 347, collector ring 331, brush 334, and normally closed contacts 329a and 309a, the circuit being completed by a wire 395 connecting the latter contacts with the lead 387 for the transformer. The contacts 338a to 338h are the switches which are mounted within the control cabinets 336, while the SR–1 contacts are operated by the SR relay, the energization of the latter being controlled by the overtravel limit switches 375 mounted adjacent the upper end of each of the work heads. The switch 347 is that which is operated by the cover plate for the brushes 342, 343 and 344, and contacts 329a are those contained within the switch 329 which is operated by the cover 328 for the main control box 327. The contacts 309a are those which are contained within the pressure responsive switch 309 and are operated by the fluid pressure within the supply pipe 285. Consequently, the PC relay cannot be energized unless all of the cabinet covers have been secured in place, the cover placed over the collector ring brushes, fluid pressure of predetermined value is supplied to the machine, and each of the work heads of the latter is within its predetermined limits of travel. If all of these conditions be satisfied the PC relay is energized thus closing the contacts PC–1, PC–2, PC–3 and PC–4 supplying power to the machine. In the event any of the above mentioned conditions have not been fulfilled the PC relay will be deenergized thus opening its contacts PC–1, PC–2, PC–3 and PC–4 interrupting all power to the machine except that supplied to the primary of the transformer 385.

Assuming that all of the conditions have been met and the PC relay has been energized, the rotation motor 25 is started by depressing the start button 321 thus energizing the relay RT, closing its contacts RT–1, RT–2, RT–3, and RT–4. In the event the rotation motor draws excessive current due to some abnormal condition, one or both of current overload relays 396, 397, provided in two of the power leads for the motor, operate to open the contacts 388 thus deenergizing the RT relay and opening the circuit to the motor 25. During normal operation, however, the rotation motor, once energized, will remain in operation until the stop button 322 is actuated or the PC–1, PC–2, and PC–3 contacts are opened by an abnormal condition in the operation as previously mentioned.

Between the current overload switch 390 and the stop switch controlled by the button 322 is connected a wire 398 to which the stop switch controlled by the button 326, the start switch controlled by the button 325 and the relay P are connected in series, the circuit being completed by the wire 391. The relay P is provided with four sets of normally open contacts P–1, P–2, P–3 and P–4. The contacts P–1 provide a holding circuit around the start switch controlled by the button 325 while the contacts P–2, P–3 and P–4 are adapted to close the circuit from the power lines 392, 393 and 394 to the motor 386 for the coolant pump. Disposed within two of the leads to the coolant motor 386, between the latter and the contacts P–2, P–3, are a pair of current overload relays 399 and 400 which operate to open the current overload switch 389 in the event the motor 386 draws excessive current. It will be seen, therefore, that during normal operation of the machine, the pump for supplying coolant to the trough 312 is energized by operating the push button 325 and remains in operation until the stop button 326 is operated.

In parallel with the circuits for the RT and P relays is a circuit extending in series from the wire 398 through the stop switch controlled by the button 324, the start switch controlled by the button 323, and through the CT relay to the wire 391. The CT relay is provided with four normally open contacts CT–1, CT–2, CT–3 and CT–4 which are closed by energization of the CT relay when the start button 323 is actuated. The CT–1 contacts provide a holding circuit about the start button while the CT–2, CT–3 and CT–4 contacts close a circuit from the wires 392, 393 and 394 to the cut motor 47 for energizing the latter. Disposed within two of the leads for the cut motor are a pair of current overload relays 401 and 402 adapted to open the current overload switch 390 if the motor 47 should draw excessive current due to abnormal operation. During normal operation, however, the cut motor 47 remains in continuous operation, when once energized, until the stop button 324 is operated.

On the machine side of the PC–1, PC–2 and PC–3 contacts wires 403, 404 and 405 are connected with the power lines 392, 393 and 394. The other ends of these wires 403, 404 and 405 are, respectively, connected to the stationary brushes 342, 343 and 344 which, respectively, cooperate with the collector rings 339, 340 and 341 mounted within the housing 345 at the top of the cap member 46. A control circuit for each operational unit of the hobbing machine is connected to the collector rings by wires such as 406, 407 and 408. Only one of these control circuits is illustrated in detail in Fig. 19 since the others are identical and may be connected to the collector rings in parallel with the illustrated circuit by means of wire such as 409, 410 and 411. The connections of the switches associated with each operational unit of the machine and their mode of operation will be readily apparent from a consideration of Figs. 19 and 19A, illustrating the circuit and switches for one of the units, in conjunction with the following detailed description of the operation thereof. The two figures illustrate the same circuit but employ different symbols, Fig. 19 being drawn with the symbols and the circuit representations as conventionally employed in the machine tool industry, while Fig. 19A employs the symbols and representations utilized in many prior patents.

OPERATION OF PREFERRED EMBODIMENT

*Conventional or "normal" hobbing—automatic operation*

When all of the covers for the control cabinets or boxes and the cover for the housing of the collector brushes 342 to 344 are closed, air under pressure is applied to the pipe 285, and all of the work heads are at their lower positions within their predetermined limits of travel, the machine is prepared for conventional or "normal" hobbing by first closing the circuit breaker 382 thereby supplying current through the wires 383 and 384 to the transformer 385. This energizes the PC relay closing its contacts PC-1, PC-2, PC-3 and PC-4. The operator then presses the rotation start button 321 thus energizing the RT relay causing the contacts RT-1, RT-2, RT-3 and RT-4 to close. Contacts RT-1 provide a holding circuit about the start button 321 so that the latter may now be released without deenergizing the relay RT. The contacts RT-2, RT-3 and RT-4 supply three phase electrical power from the power lines 392, 393 and 394 to the rotation motor 25 energizing the latter thus driving the worm 27 and worm wheel 28 causing the turret B to rotate.

The operator next presses the cut motor start button 323 thus energizing the relay CT which closes its contacts CT-1, CT-2, CT-3 and CT-4. The contacts CT-1 provide a holding circuit for the relay CT maintaining the latter energized after the start button 323 is released. The contacts CT-2, CT-3 and CT-4 supply three phase electrical power from the power lines 392, 393 and 394 to the cut motor 47 energizing the latter and thus driving the flexible drive 50, sleeve 52 and bevel gear 54. The bevel gear 54 in turn drives the bevel gears 55 rotating the driving member 64 of the clutch 63 of each unit. These clutches are held in their disengaged positions since the clutch solenoids 89 are energized, as hereinafter described, by the closing of the contacts PC-1, PC-2 and PC-3, thus actuating the valves 84 to supply air pressure to the cylinders 79 thereby moving the driven member 65 of each clutch out of engagement with its driving member.

The operator also presses the start button 325 thus energizing the relay P thereby causing the contacts P-1, P-2, P-3 and P-4 to close. Contacts P-1 provides a holding circuit for the relay P maintaining the latter energized after the start button 325 is released. The contacts P-2, P-3 and P-4 connect the motor 386 for the coolant pump to the three phase power lines 392, 393 and 394. Cutting fluid or coolant is, therefore, pumped from the reservoir in the base of the machine to the trough reservoir 312 in the turret cap member 46. The coolant cannot, however, flow through the nozzles 315 at this time since the valves 316 are closed.

The circuits thus established are normally not disturbed during the operation of the machine but in the event that any of the motors 25, 47 or 386 draw excessive current the operation of all three motors is terminated. Thus, excessive current flow to the motor 25 causes the relay 396 or relay 397 to open the current overload contacts 388; excessive current flow to the motor 386 causes the relay 399 or relay 400 to open the current overload contacts 389; and excessive current flow to the motor 47 causes the relay 401 to open overload contacts 390. Also, opening of any of the covers of the control boxes, opening of the cover for the brushes 342 to 344, failure of the air supply, or over travel of any of the work heads of the machine deenergizes the PC relay thereby stopping the entire machine including the motors 25, 47 and 386. In addition, each of these motors 25, 47 and 386 may be individually stopped, if desired by operating the corresponding stop buttons 321, 323 or 325.

As the turret rotates, the hobbing units successively pass the loading station adjacent the vertical standard 318. As each unit approaches this station the operator sets the hobbing selector switch 353 on the unit control cabinet 336 for "normal" or conventional hobbing, the automatic return switch 354 to the "off" position, and the feed control switch 355 to the "off" position. He also moves the toggle switch 352 to its "Auto," (automatic) position, and turns the coolant control knob 349 to its "on" position.

The previously mentioned closing of the contacts PC-1, PC-2 and PC-3 has supplied electrical current through the wires 403, 404 and 405 to the brushes 342, 343 and 344, and thence to the collector rings 339, 340 and 341 to which are connected the power supply lines 406, 407 and 408 for the unit. Hence, current is supplied through the wires 406 and 408 to the primary of a transformer 412. The secondary of this transformer is connected through fuses 413 and 414 to wires 415 and 416. Current is thus supplied through wire 415 and the normally closed contacts CL-1 to the solenoid 89 for the clutch valve 84, the circuit being completed through a wire 417 connected to the wire 416. Therefore, the valve 84 has been operated to supply air pressure for effecting disengagement of the clutch as previously described. The circuit to the solenoid 296, for the valve 295 controlling the chuck and tail stock, is open at the normally open contacts AS-1 and AS-2 and hence the solenoid 296 is deenergized. Therefore, the valve 295 is positioned to supply air pressure for holding the chuck and tail center in their closed or work engaging positions.

As the unit approaches the loading station, the operator momentarily depresses the stop button 351. This opens the circuit through its contact 351a and closes a circuit through its lower contact 351b. This circuit extends from the wire 415 through the normally closed contacts 375b of the overtravel limit switch 375 for the unit, current overload contact 418, wire 419, the lower contact 351b of the stop switch, wire 420, wire 421, wire 422 and through the coil of a relay DR to the wire 417. Hence, the DR relay is energized closing its normally open contacts DR-1, DR-2 and DR-3. Closing of the contacts DR-1 provides a holding circuit for the DR relay about the stop switch so that the relay remains energized when the stop button 351 is released opening the circuit through its lower contact 351b.

The initial positioning of the toggle switch 352 to its "Auto." position and the automatic return switch 354 to its "off" position now provides a circuit from wire 419 through the now closed contacts DR-1, contact 352b of switch 352, contact 354a of switch 354, normally closed contacts FR-4 and FC-3, and through the now closed contacts DR-3 and the coil of relay AS to the wire 417. Hence, the relay AS is energized closing its contacts AS-1 and AS-2 and thereby supplying current from wires 406 and 408 to the solenoid 296 for the valve 295. The latter is, therefore, operated to supply air pressure to the tail stock and chuck mechanisms in a direction to open or disengage the chuck and retract the tail center. The operator then inserts a workpiece between the chuck and tail center and depresses the start button 350.

Actuation of the start button 350 causes its contact 350a to close a circuit extending from wire 415 through the normally closed contacts 375b of the overtravel limit switch 375, the normally closed contacts 418 of a current limit switch, the upper contact 351a of stop switch 351 to a wire 423 and from the latter through a wire 424, contact 350a, wire 425, contact 353a of the hobbing selector switch 353, contact 373a of switch 373, contact 353c of the hobbing selector switch 353, wire 426, and through the coil of the relay FR to the wire 417. This energizes relay FR closing its normally open conacts FR-1 and FR-2 providing a holding circuit for the relay about the start button 350 so that the relay FR remains energized when the button is released. The contacts FR-3 are also closed for a reason to be explained hereinafter. The contacts FR-4 of the relay are opened thus deenergizing the relay AS causing the latter to open its contacts AS-1 and AS-2 and thereby deenergize the solenoid 296. This deenergization of solenoid 296 allows the valve 295 to move to a position which supplies air under pressure to the chuck and tail stock mechanisms in a manner to cause the chuck to grip the work and the tail center to move into engagement with the upper end of the workpiece. The energization of the relay FR also has effected opening of the normally closed contacts FR-5 for a purpose hereinafter described.

As the turret continues to rotate, the hobbing unit which has just been provided with a workpiece, carries its rotation controlled switch 357 on the back of the vertical support 299 past the stationary cam 360 and the latter engages the roller 359 of the switch momentarily moving its normally open contacts 357a to closed position. This closes a circuit from the wire 423 through the previously closed contacts FR-1, wire 427 and the now closed contacts DR-2 and 357a, wire 428 and through the coil of a relay ER to the wire 417. This energizes the relay ER causing it to close its normally open contacts ER-1, ER-2, and ER-3 and to open its normally closed contacts ER-4. The contacts ER-1 provide a holding circuit about the contacts 357a of switch 357 maintaining the relay ER energized after the turret has moved the switch 357 past the cam 360. Closing of the contacts ER-2 closes a circuit from the wire 423 through the normally closed contacts 224a of the hob shift actuated switch 224, the now closed contacts ER-2, wire 429, the normally closed contact TA-1 of the time delay mechanism and the upper contact 371a of the switch 371, to and through the coil of the RU relay circuit to the wire 417. This energizes the RU relay causing the latter to close its normally open contacts RU-1, RU-2, and RU-3. The closing of these contacts supplies current from the wires 406, 407 and 408 through the wires 430, 431 and 432, the now closed contacts RU-1, RU-2 and RU-3 and the hobbing selector contacts 353e, 353f to the rapid traverse motor 148 for the unit. Interposed in the wires 430 and 431 are current overload relays 433 and 434 which are adapted to open the current overload contacts 418 if the motor 148 should draw excessive current.

The rapid traverse motor 148, which is a reversible three-phase motor, is therefore energized in a direction to move the work head vertically upward through the action of the worm 151, worm wheel 152 and feed shaft 143, the worm shaft 150 being freed for rotation by the supplying of current from the wires 430, 432 through the normally closed contacts BR-1, BR-2 to the electrically operated brake 155 which is thus released. Since the clutch 63 is held in its disengaged position at this time, the feed nut 142 will remain stationary due to the locking action of the worm wheel 141 and the worm 140 so that the rotation of the feed shaft 143 causes the work head to move vertically upward at a relatively rapid rate. This movement of the work head continues until the arm 372 of the switch 371 moves off of the cam 365, the latter being adjusted so that this action occurs when the workpiece is closely adjacent the hob.

The closing of the ER-3 contacts closes a circuit from the wire 429 through the contacts ER-3, wire 440, wire 441, the normally closed contacts CL-2 and the coil of a relay TR to the wire 417. The TR relay is of the time delay type adapted to open its contact TR-1 a few seconds after the relay is energized. Consequently, a short time after the TR relay is energized the contact TR-1 is opened deenergizing the FC relay which was energized by the closing of the ER-3 contacts through a circuit extending from wire 429 through the ER-3 contacts, wire 440 and the TR-1 contact. The TR-1 contact is held open maintaining the FC relay deenergized until the CL relay is energized as hereinafter described. This movement of the arm 372 moves the contacts 371a and 371b from their positions as shown in Figs. 19 and 19A to bring the contact 371b into circuit closing relationship and to open the circuit through the contact 371a. This deenergizes the relay RU thereby opening the contacts RU-1, RU-2, and RU-3 so that the rapid traverse motor 148 and the solenoid for the brake 155 are deenergized. Consequently, the brake is applied to the worm shaft 150 preventing any residual rotation thereof and thus terminating the relative rapid movement of the work head simultaneous with the deenergization of the motor 148.

The contact 371b of the switch 371 now closes a circuit from the wire 429 through the contact 349a of the coolant switch, which was initially positioned to its closed or "on" position, and through the solenoid CS, for opening the coolant valve 316, to the wire 417. A circuit is also completed from the wire 429 through the contact 371b and a wire 435 to and through the coil of a relay CL to the wire 417. Energization of the CL relay opens its normally closed contacts CL-1 and CL-2 and closes its normally open contacts CL-3. Opening of the contact CL-1 deenergizes the solenoid 89 whereby actuating the valve 84 in a manner to terminate the supply of air under pressure to the clutch operating cylinder 79 and also establishing communication with the cylinder through the valve to the exhaust port 86. Consequently, the springs of the clutch now act to engage the driving and driven members thereof, this action being retarded, however, by the fact that the exhaust of air from the cylinder 79 is regulated by the adjustable orifice controlled by the screw 87. Hence, the driving and driven members of the clutch are engaged at a suitable rate to prevent grabbing. The cut motor 47 now drives the shaft 102 through gears 54, 55, shaft 56, clutch 63, shaft 62 and the gears 91 and 101. Also the shaft 105 is rotated by the gear 104 which meshes with gear 95 splined to the shaft 62.

The rotation of the shaft 102, acting through the gearing mechanism contained in the lower portion 37 of the work head D, rotates the worm 129 and worm wheel 139 thereby rotating the work spindle 36 and the workpiece W supported thereon by the chuck 232 and tail center 265. In addition, the rotation of the shaft 102, acting through the gearing in the lower portion of the work head D, rotates the worm 140 and worm wheel 141 thus causing the nut 142 to rotate about the feed screw 143 which is now held from rotation by the engagement of the brake 155 with the worm shaft 150. The rotation of the nut 142 therefore causes the work head to move vertically at a relatively slow feeding rate carrying the workpiece into cutting engagement with the hob which is now rotating, the hob being driven by the shaft 105 through the gears 170 and 169. Consequently, the workpiece is hobbed as it is moved past the hob T at the relatively slow feeding rate. In addition to its rotation, the hob T is also axially moved at a very slow rate by operation of the planetary gearing connected therewith. During this hobbing operation, coolant is supplied to the hob and workpiece through the nozzle 315 since the valve 316 has been opened by the previously mentioned energization of the CS solenoid which controls the valve 316.

The opening of the CL-2 contacts by the energization of the CL relay deenergizes the TR relay causing the TR-1 contact to close the circuit through the relay FC thus energizing the latter. The energization of the FC relays causes it to close its normally open contacts FC-1 and open its normally closed contacts FC-2 and FC-3. The vertical feeding movement and the rotation of the workpiece together with the rotation of the hob now continue until the work head has moved upwardly its predetermined distance, as determined by the adjusted position of the projection 368. When this distance has been traversed, the arm 374 of the switch 373 engages the projection 368 moving the contacts of the switch 373 from the position shown in Figs. 19 and 19A to bring the lower contact 373b thereof into circuit closing position and to open the circuit through the upper contact 373a. This breaks the circuit for the relay FR deenergizing the latter thus opening its contacts FR-1 and FR-2 in its holding circuit, opening its contacts FR-3, closing its contact FR-4 in the circuit of relay AS, and closing its contacts FR-5.

Opening of the contacts FR-1 breaks the holding circuit for the relay FR and also deenergizes the relay ER causing the latter to open its contacts ER-1, ER-2, ER-3 and close it contacts ER-4. Opening of the contacts ER-1 removes the bridging circuit about the contacts DR-2 and 357a, while opening of the contacts ER-2 and ER-3 opens the circuit to the solenoid CS for the coolant valve 316 and the circuit for the CL relay. Deenergization of the CS solenoid causes the valve 316 to close terminating the supply of coolant to the work and hob while deenergization of the CL relay closes the contacts CL-1 and CL-2. Closing of the contacts CL-1 reenergizes the solenoid 89 operating the valve 84 to supply air under pressure to the cylinder 79 thus disengaging the clutch 63 so that the feeding movement of the work and the rotation thereof and of the hob are terminated. The workpiece is not immediately released however since the circuit to the AS relay is now open at the FC-3 contacts due to the energization of the FC relay under control of the contact TR-1 of the time relay TR. The deenergization of the CL relay, however, again closed the CL-2 contacts, thus reenergizing the TR relay which operates a few seconds later to open its TR-1 contact thus deenergizing the FC relay. Deenergization of the FC relay opens its contacts FC-1, closes its contacts FC-2 and its contacts FC-3. Closing of the contacts FC-3 now provides a circuit therethrough and through the DR-3 contacts, which remain closed under the continued energization of the DR relay, for energizing the AS relay. This causes the AS-1 and AS-2 contacts to close thereby energizing the solenoid 296 which in turn operates the valve 295 to supply air pressure to the chuck and tail stock mechanisms in a direction to cause the chuck to be released and the tail center to move from engagement with the workpiece thus releasing the latter. This time delay of the release of the workpiece is provided to insure that the clutch has entirely disengaged prior to the release of the workpiece.

The operation of the machine is so timed that hobbing units are sequentially returned to the starting or loading station by the time the hobbing operation of the unit is completed and its chuck and tail center are released. As each unit reaches the starting or loading station, the operator removes the work and again presses the start button 350 moving the contact 350a into circuit closing position. A circuit is therefore closed from the wire 423 through the contact 350a, wires 442 and 442', movable contact 353b of the hobbing selector switch, the contact 373b of the switch 373 which is now in its lower or circuit closing position, contact 353d of the hobbing selector switch 353, the normally closed contacts FC-2 and through the coil of a relay DN to the wire 417 thus energizing the relay DN. The FC-2 contacts are provided to prevent energization of the DN relay until after the TR relay has operated to open its TR-1 contact and thus deenergize the relay FC, thereby providing a time delay to insure complete disengagement of the clutch 63 prior to energization of the rapid traverse motor 148 for moving the work head back to its initial position.

The energization of the DN relay closes its normally open contacts DN-1, DN-3, DN-4 and DN-5 and opens its normally closed contacts DN-2. The contacts DN-1 provide a holding circuit for the relay DN about the start switch so that when the button 350 thereof is released the relay remains energized. Closing the contacts DN-3, DN-4 and DN-5 supply current to the motor 148 in a direction to cause the latter to rotate in the opposite direction from that in which it rotated when energized through the RU-1, RU-2 and RU-3 contacts. This is effected by so connecting the contacts DN-3 and DN-4 that they reverse the motor leads 430 and 431. The current supplied by the leads 430 and 432 also flows as before through the normally closed contacts BR-1, BR-2 energizing the solenoid of the brake 155 thus releasing the latter. Hence, the rapid traverse motor 148 rotates and drives the worm 151 and worm wheel 152 in the reverse direction to that in which they were actuated during the rapid traverse upward of the work head. Consequently, the work head is now moved downwardly at a rapid rate and during this downward movement, the cam 365 engages the arm 372 effecting resetting of the switch 371 to the position illustrated in Figs. 19 and 19A.

When the work head D has reached its lower position the projection 367 engages the arm 374 moving the contacts of the switch 373 back to their initial position as illustrated in Figs. 19 and 19A thus opening the circuit through the contact 373b. This breaks the circuit for the relay DN deenergizing the latter and opening its contacts DN-1, DN-3, DN-4 and DN-5 and closing its contacts DN-2. Opening the contacts DN-1 breaks the holding circuit for the DN relay while opening of the contacts DN-3, DN-4 and DN-5 deenergizes the rapid traverse motor 148 and the solenoid for the brake 155 so that the motor is stopped and the brake applied thus terminating the movement of the work head. The closing of the DN-2 relay does not perform any function at this time but is employed for a purpose hereinafter described.

This rapid traverse back to the initial position is completed while the work head unit is still passing the loading station and the cycle may be repeated by inserting a new workpiece and momentarily depressing the start button 350. This will again close the circuit through the contacts 373a of the switch 373 to energize the FR relay, the circuit operating as before described and therefore the description thereof need not be repeated except to note that the energization of the FR relay opens its contacts FR-4 thus deenergizing relays AS, opening the contacts AS-1, AS-2 of the latter. This deenergizes the solenoid 296 for the valve 295, thus again allowing air pressure to operate the chuck and tail stock mechanisms to grip the new workpiece, the chuck and tail stock mechanisms having been held in their open positions during the rapid traverse downwardly of the work head. This operation of inserting and removing workpieces and momentarily depressing the start button is performed for each work head as it moves past the loading station so that the operator has simply to press a single button for each unit and to load and unload the work during the normal operation of the machine, the initial actuation of the stop button being necessary only when the unit is first placed in operation, since the DR relay, when once energized by operation of the stop button, remains energized throughout subsequent operations.

In the event it is desired to stop a unit during its operation, the stop button 351 is momentarily depressed thus opening the circuit through the contact 351a thereby deenergizing all of the relays and solenoids for the unit except the AS relay and the clutch solenoid 89 which control the work gripping means and the clutch respectively. Consequently, when the stop switch is actuated during an operation of the unit, air pressure is supplied to the cylinder 79 and to the cylinders for the chuck and tail stock mechanisms to hold the clutch 63, disengaged and to release the chuck and tail stock. Since the DN and RU relays will also be deenergized, all movement of the work head is terminated and the workpiece is released.

In the event the work head travels either above or below its predetermined limits the corresponding projection 378 or 377, respectively, will operate the arm 376 of the switch 375 moving the contact 375a of the latter to close the circuit therethrough which is in series with the SR relay. The SR relay is thus energized and opens its SR-1 contacts which are in series with the power contact or relay PC. The PC relay is therefore deenergized opening its contacts PC-1, PC-2, PC-3 and PC-4 which consequently remove all power from the machine thereby terminating the operation of all units and also of the rotation motor 25, cut motor 47 and coolant pump motor 386. The contacts 375a for all of the overtravel limits switches 375 are connected in parallel so that if any one of the work heads travels above or below its predetermined limits the SR relay is energized as above described. There is preferably only one SR relay for all the units of the machine, the control circuits for the other units being connected to extensions of the wires 415 and 416.

The switch 375 of each unit is also provided with a set of normally closed contacts 375b in series with the main energization path for the relays and switches of each unit so that operation of the switch 375 opens the contacts 375b as an additional safety precaution. Also, as previously mentioned, the supply leads 430 and 431 for the rapid traverse motor 148 are provided with current overload relays 433 and 434 which operate to open the contacts 418 in the current supply path for the relays of the unit in the event the motor 148 draws excessive current.

During the normal operation of the hobbing machine the hob of each unit is slowly advanced in an axial direction by the mechanism illustrated in Figs. 8 and 9 to uniformly distribute the wear on the hob along its entire length. When the hob has reached its extreme forward position, corresponding to the time when it should be replaced or reground, the switch operating ring 231 engages the actuating pin 226 closing the contacts 224b of the switch 224 and opening the contacts 224a thereof. Closing of the contacts 224b will close a circuit from a wire 423 through the normally closed contacts ER-4 and the light L of the unit to the wire 417 thus lighting the light and indicating that the hob has reached its extreme position. However, the ER-4 contacts are held open except when the work head is moved downwardly after the hobbing operation has been completed or when the work head is in its starting position. Therefore, the light is not energized if the work head be moved upward in rapid traverse or is effecting hobbing but is energized when the work head is moving vertically downward or is at its starting position.

Opening of the contacts 224a prevents energization of the RU, FC and CL relays. This means that if a new cycle is attempted to be started, after the hob has shifted its entire length and lighted the light L, the cycle cannot actually begin since the rapid traverse motor will not be energized. However, if the hob be in the process of cutting or hobbing when it has reached its predetermined limit, opening the contacts 224a, the hob will continue to perform its complete operation upon the workpiece because the FC-1 contacts are now closed and provide a holding circuit for the CL relay through the ER-3 contacts. This results from the fact that the energization of the ER relay at the beginning of the cycle has closed the ER-2 and ER-3 contacts and that the energization of the CL relay has opened the CL-2 contacts. Hence, the TR relay is deenergized so that the contact TR-1 is in circuit closing position and the FC relay has therefore been energized through the closed contacts ER-2 and ER-3. The energization of the FC relay closes its FC-1 contacts providing a holding circuit therefor and also providing a circuit for continuing energization of the CL relay. It follows therefore that the contacts 224a of the switch 224 will prevent the beginning of a new work cycle of the hob unit but will not interfere with the completion of a work cycle already begun.

This action of the switch 224 in preventing the start of a new cycle for the hobbing unit when the hob thereof has moved to its extreme advance position does not interfere with the operation of the other units of the machine. The unit thus placed out of operation may be restored to operating relationship by returning the spindle 31 to its extreme retracted position by disengaging the planetary gearing through operation of the handle 231 and rotating the stud 181 by a wrench or other tool placed upon an end 184 thereof. When the spindle has thus been returned to its initial position, the ring 231 thereon engages the pin 227 thus operating the switch to close its contacts 224a and open its contacts 224b, this being indicated by the extinguishing of the light L. The unit may then be again placed in operation by actuating the start button 350.

The contacts FR-3 are provided in parallel across the contacts DR-1 to enable the operation of the unit to be picked up after a current failure by actuating the start button 350. These contacts are necessary since a current failure will have deenergized the relay DR, opening its holding contact DR-1. In order that the unit may be started by simply actuating the start button 350, it is necessary that a means be provided for again energizing the DR relay by this actuation of the start button. In the circuit shown this is possible because actuation of the start button energizes the FR relay closing the contacts FR-3 thereby providing an energizing circuit for the relay DR, the energization of which again closes the contacts DR-1 reestablishing the holding circuit for the DR relay.

*Conventional or "normal" hobbing with "clean-up"—automatic operation*

In certain instances it is desirable to maintain the workpiece and hob in rotation but without feeding of the workpiece at the end of the hobbing or cutting operation to provide for "clean-up." This is readily effected in the machine by setting the feed control switch 355 to the "on" position, the setting of the other switches remaining the same as previously described. This setting of the control switch moves the contacts 355a and 355b into circuit closing relationship. The hobbing unit is then placed in operation and functions as above described until the work head has reached its uppermost position where the projection 368 engages the arm 374 of the switch 373 moving the latter to place its lower movable contact 373b in circuit closing position. While the ER relay is deenergized by this operation of the switch 373, the clutch 63 is not now disengaged as before since a holding circuit therefor has been provided through the FC-1 contacts, wire 440, contacts CL-3, contact 355b of the feed control switch 355, wire 429, contact TA-1, contact 371b of the switch 371 which has been moved into circuit closing condition by the movement of the work head, and through the wire 435 through the CL relay to the wire 417. Likewise, the CS solenoid for operating the coolant valve 316 also remains energized, it being remembered that the contact 349a has been placed in the "on" position by operation of the control knob 349. Therefore, when the work head has reached its upper position, moving the switch 373 to open the circuit through contact 373a, the CL relay remains energized.

The opening of the circuit through the contact 373a, however, deenergizes the relay FR thus closing its contacts FR-5 and this provides a circuit from the wire 423 through the now closed contacts FC-1, wire 440, contact 355a, contacts FR-5 and the coils of the relays TA and BR, in parallel, to the wire 417. Energization of the BR relay opens its normally closed contacts BR-1 and BR-2 and closes its normally open contacts BR-3 and BR-4. Consequently, the solenoid for the brake 155 is energized through the contacts BR-3 and BR-4 releasing the brake and thus allowing the worm 150, the worm wheel 152 and the feed screw 143 free to rotate. The clutch 63 has remained in engagement since the contacts CL-1 are open holding the solenoid 89 deenergized so that air pressure is not supplied to the cylinder 79 of the clutch, the latter being in communication with the exhaust port 86. The continued rotation of the worm 140 and the nut 142 by means of the shaft 102 will, however, no longer cause feeding movement of the work head because the feed screw 143 is now free to turn so that there is no relative movement between it and the nut. Consequently, the work head stands still while the work continues to rotate being driven by the worm 129 and the worm wheel 130 operated by the shaft 102. Likewise, the hob remains in continuous rotation since the drive thereto has not been interrupted at the clutch 63.

The relay TA is a part of the adjustable timer 356 which has been set to provide a predetermined "dwell" before the relay TA is effective to operate its movable contact TA-1. After this "dwell" has elapsed the TA-1 contact will be moved opening the circuit to the relay CL and the coolant solenoid CS thus deenergizing these relays. Deenergization of the CL relay closes its contacts CL-1 thereby energizing the solenoid 89 for operating the valve 84 to supply air under pressure to the clutch 63 for disengaging the latter. Therefore, the rotation of the work and hob are terminated. The deenergization of the CL relay also closes its CL-2 contacts thereby energizing the relay TR which operates a short time later to open the TR-1 contact with consequent deenergization of the FC relay. The deenergization of the FC relay opens its contacts FC-1, thus deenergizing the TA and BR relays. Deenergization of the BR relay opens the contacts BR-3 and BR-4 and closes the contacts BR-1 and BR-2 so that the brake 155 is again applied to the worm shaft 150 connected with the rapid traverse motor. Deenergization of the FC relay also closes its FC-3 contacts thus energizing the AS relay and the latter therefore closes its AS-1 and AS-2 contacts to energize the solenoid 296. The solenoid 296 therefore operates the valve 295 supplying air pressure to the chuck and tail stock mechanism for releasing the work.

The operator then removes the work and again presses the start button 350 thus closing the circuit to the DN relay through the contact 373b and the FC-2 contacts as previously described. The FC-2 contacts insure that the DN relay cannot be energized by means of the start button until after the time interval provided by the TR relay to insure that the clutch has had time to completely release before the rapid traverse motor is energized through operation of the DN relay. When the DN relay has been energized as described, the work head moves rapidly back to its starting position as previously described, the cycle being completed and reinitiated in the same manner as before.

*Conventional or "normal" hobbing with automatic return-automatic operation*

When it is desired to have the work head returned to its initial or starting position after termination of the hobbing operation without again actuating the start button 350, the automatic return switch 354 on the cabinet 336 of the unit is set at its "on" position. This moves the movable contact 354a of the switch 354 into circuit opening position and contact 354b into circuit closing position, the circuit otherwise remaining as illustrated in Figs. 19 and 19A. The operation of the unit is started as before by depressing the start button 350 the operation continuing as above described until the work head reaches its uppermost position at which time the switch 373 is moved to open the circuit through its contact 373a and close the circuit through its contact 373b. The workpiece is, however, not released from the chuck and the tail stock mechanisms at this time since the DN-2 contacts are now operative in the AS relay circuit. Hence, as soon as the FC relay is deenergized by opening of the circuit through the TR-1 contact, a circuit is immediately closed through the DR-1 contacts, wire 421, contact 354b of the automatic return switch, wire 442', contact 353b of the hobbing selector switch, contact 373b of switch 373, contact 353d of the hobbing selector switch and the now closed contacts FC-2 and the coil of the DN relay to the wire 417. This energizes the DN relay so that the contacts DN-2 are opened substantially simultaneously with the closing of the contacts FC-3 in the circuit for the AS relay. Hence, the circuit to the AS relay is not closed for any appreciable length of time with the result that the valve 295 is not operated to supply air pressure for releasing the chuck and tail stock mechanisms.

The energization of the DN relay closes its contacts DN-3, DN-4 and DN-5 so that the work head is rapidly traversed back to its original position without the necessity of again operating the start button. When the work head reaches its starting position, the switch 373b is actuated by the projection 367 moving the contacts 373a and 373b to their positions illustrated in Figs. 19 and 19A. This deenergizes the DN relay thus deenergizing the rapid traverse motor 148 and closing the DN-2 contacts thereby completing the circuit for energizing the AS relay. The latter now closes its AS-1 and AS-2 contacts energizing the solenoid 296 which in turn actuates its valve 295 for supplying air pressure to the chuck and tail stock so that the workpiece is released. A new workpiece may be placed in the unit and the cycle started by again pressing the start button.

The provision of the contacts FC-2 in the circuit of the relay DN is an important feature because it insures that the rapid traverse downwardly of the work head cannot occur until after sufficient time has elapsed to effect complete disengagement of the clutch. This time interval is provided, as above described, by the TR relay, the contact TR-1 of which controls the FC relay preventing the closing of the FC-2 contacts until a few seconds after the CL relay has been deenergized.

It will be observed that in this mode of operation the work head moves downwardly at the rapid traverse rate with the work retained in clutched relationship and is therefore carried back through the hob.

*Conventional or "normal" hobbing with "clean-up" and automatic return—automatic operation*

A "dwell" may be provided in the work head movement at the end of the cutting operation to effect "clean-up" in conjunction with automatic return by setting both the automatic return switch 354 and the feed control switch 355 to their "on" positions prior to starting of the cycle. The operation is then the same as described for "normal" automatic operation with "clean-up" except that instead of operating the start button 350 to return the work head at the end of the "clean-up" operation this return is automatically effected as just described. As previously noted, this automatic return cannot begin until the FC-2 contacts are closed and these contacts cannot be closed until after the "clean-up" period has elapsed. This results from the fact that the TR-1 contact, which controls the FC relay, is operated by the TR relay and the latter is controlled by the CL-2 contacts operated by the CL relay, the CL relay in turn being controlled by the contact TA-1 of the adjustable timer.

*Conventional or "normal" hobbing—manual operation*

In initially setting up the machine it is frequently desirable to operate a hobbing unit without rotation of the turret. This may be readily effected in the present machine by depressing the start buttons 323 and 325 for energizing the cut motor 47 and the coolant pump motor 386 as previously described. The operator next momentarily depresses the stop button 351 thus energizing relay DR causing the latter to close its normally open contacts DR-1, DR-2 and DR-3. Closing of the contacts DR-1 provides a holding circuit for relay DR, while closing of the contacts DR-3 closes the circuit for energizing the AS relay. Energization of the AS relay causes the latter to close its contacts AS-1 and AS-2 thereby energizing the solenoid 296 operating the valve 295 for applying air pressure to the chuck and tail stock mechanisms in a direction for releasing the chuck and retracting the tail center. The operator then inserts a workpiece between the chuck and tail center and moves the toggle switch 352 to its "Man." (manual) position and also positions the coolant switch knob 349 to its "on" position. Operation of the toggle switch 352 moves the contacts 352a and 352b of the latter into circuit closing and circuit opening positions respectively. The circuit for the AS relay is now open at the contact 352b deenergizing this relay and thus causing the AS-1, AS-2 contacts to open with consequent deenergization of solenoid 296 and reversal of the position of the valve 295. Therefore, the chuck and tail center mechanisms are now operated by air pressure into work gripping positions.

The operator next presses the start button 350 for the hobbing unit. The switch 357, which is operated by rotation of the turret, is now by-passed by the contact 352a so that operation of the unit is initiated without rotation of the turret. That is to say, operation of the start switch 350 energizes the FR relay, as before, closing the contacts of the latter which now provide a circuit for relay ER from the wire 423 through the contacts FR-1, wire 427, contact 352a of the switch 352, wire 428 and through the coil of the relay ER to the wire 417. Energization of the relay ER initiates the rapid traverse movement of the work head to bring the workpiece into hobbing position as previously described under the heading of "Conventional or 'normal' hobbing—automatic operation." Likewise, the workpiece is hobbed and the work head is stopped at its uppermost position as previously described, the movement of the work head and the hobbing of the workpiece being under control of the FR relay, energization of which is terminated when the work head reaches its uppermost position by movement of the contact 373a of the work head actuated switch 373 to circuit opening position.

This actuation of switch 373 breaks the circuit for the FR relay causing the latter to open its contacts FR-1 thereby deenergizing the ER relay with consequent deenergization of the CL relay, which controls the clutch 63, as previously described. The workpiece is not, however, released when the work head has reached its uppermost position as before since the circuit for energizing the AS relay has been opened at the contact 352b of the switch 352. In order to release the workpiece it is now necessary to move the switch 352 back to its "Auto." (automatic) position thereby closing the circuit through the contact 352b to the AS relay, energizing the latter and causing release of the workpiece as previously described. The work head is then returned to its initial position by again operating the start button 350, the operation of the apparatus in this part of the cycle being the same as that described before.

The automatic "clean-up" feature may be employed with manual operation by setting the feed control switch 355 to its "on" position, "clean-up" operation then being the same as described above for automatic operation with "clean-up."

If the circuit has also been set for automatic return by moving the switch 354 to its "on" position and the operator has also set the switch 352 for manual operation, the work head will automatically return to its starting position after the hobbing has been completed, the workpiece being carried back through the hob since the circuit for operating the AS relay to effect release of the work is opened at the contact 352b.

"Climb" hobbing—automatic operation

The improved hobbing machine of this invention is also capable of being operated for hobbing in accordance with the "climb" method by setting the hob selector switch 353 to its "climb" position and by interposing an idler gear in the feed train comprising the gears 131, 132, 135 and 136 to change the direction of rotation of the worm 140, the worm wheel 141 and the feed nut 142. Setting of the hob selector switch 353 for "climb" hobbing moves the contacts 353a, 353b, 353c, 353d, 353e and 353f from their positions as shown in Figs. 19 and 19A and into engagement with the stationary contacts 442, 443, 444, 445, 446 and 447, respectively. Assuming that the operation is to be effected automatically and without "clean-up" or automatic return, the switch 352 is set to its "Auto." position and switches 354 and 355 are set to their "off" positions.

Operation of the hobbing machine is now started as before by depressing the start buttons 321, 323 and 325 thus energizing the rotation motor 25, cut motor 47 and the coolant pump motor 386. As the turret begins its rotation the operator also operates the coolant switch knob 349 to its "on" position and presses the hob unit start button 350. Operation of the start switch 350 now closes a circuit from the wire 415 through the contacts 375b, 418, 351a, wire 424, contact 359a, wire 442, wire 442′, contact 353b, contact 443, wire 448, contact 373a, contact 353c, contact 444, and through the FC-2 contacts and the coil of the DN relay to the wire 417. The DN relay is therefore energized closing its contacts DN-1, DN-3, DN-4 and DN-5 and opening its contacts DN-2. Closing of the contacts DN-1 provides a holding circuit for the DN relay about the start switch, while closing of the contacts DN-3, DN-4 and DN-5 energize the rapid traverse motor 148, the direction of the current thus supplied to the motor being reversed at the contacts 446, 353e and 447, 353f so that the motor is energized to rotate in a direction which moves the work head upwardly. Current is also supplied through the normally closed contacts BR-1, BR-2 to the solenoid for brake 155, releasing the latter.

The work head therefore rapid traverses to its uppermost position and during this motion the cam 365, carried by the work head, operates the switch 371 to move its lower contact 371b into circuit closing position and to open the circuit through the upper contact 371a. At the top of the travel of the work head the projection 368 thereon operates the switch 373 opening the circuit through the contact 373a and moving the contact 373b into circuit closing position. Opening of the circuit through the contact 373a deenergizes the DN relay with consequent stopping of the rapid traverse motor 148 and reapplication of the brake 155.

The operator now momentarily depresses the stop button 351 thereby closing a circuit through its contact 351b from the wire 419 to the wire 420 and through the wires 421 and 422 to energize the DR relay thus closing the contacts DR-1, DR-2 and DR-3 of the latter. Closing the contacts DR-1 provides a holding circuit for the DR relay while closing of the DR-3 contacts close a circuit for energizing the AS relay. Energization of the AS relay closes the contacts AS-1 and AS-2 energizing the solenoid 296 thus causing the valve 295 to supply air pressure to the chuck and tail stock mechanisms moving these mechanisms to disengaging positions. A workpiece is now inserted between the chuck and tail center and the start button 350 is again momentarily actuated. Actuation of the start button 350 now closes a circuit through its contact 350a, wire 425, contact 353a, contact 442, contact 373b, contact 353d, contact 445, wire 449 and wire 426 to and through the FR relay to the wire 417.

Hence, the FR relay is energized causing it to close its contacts FR–1, FR–2, FR–3 and open its contacts FR–4 and FR–5. Closing of the contacts FR–1 and FR–2 provide a holding circuit for the relay FR while opening of the contacts FR–4 opens the circuit to the relay AS. This opens the AS–1 and AS–2 contacts thereby opening the circuit to the solenoid 296 so that the air valve 295 is operated to supply air pressure to the tail stock and chuck mechanisms to effect gripping of the workpiece.

As the turret rotates, due to the operation of the motor 25, the stationary cam 360 at the top of the machine operates the switch 357 of the unit to momentarily close the contact 357a. This energizes the ER relay through the contacts FR–1, DR–2, 357a and wire 428. Energization of the ER relay closes its contacts ER–1, ER–2 and ER–3 and opens its contacts ER–4. Closing of the contacts ER–1 provides a holding circuit for the ER relay about the contact 357a so that when the switch 357 has moved past the stationary cam the opening of the contact 357a will not cause the relay ER to be deenergized. Since the switch 371 has been moved to bring its contact 371b into circuit closing position during the movement of the work head to its uppermost position, closing of the contacts ER–2 now provides a circuit from the wire 423 through contacts 224a, contacts ER–2, wire 429, contact TA–1, contact 371b, and wire 435 for energizing the CL relay. A parallel circuit is also provided through the contact 349a to energize the CS solenoid. Consequently, the clutch 63 is engaged and coolant is supplied to the hobbing unit in the same manner as previously described for "normal" hobbing. Energization of the CL relay has also opened the CL–2 contacts so that the FC relay is now energized through the contacts 224a, ER–2, ER–3, wire 440 and the TR–1 contact. Energization of the FC relay closes its contacts FC–1 and opens its contacts FC–2 and FC–3.

Hobbing continues as the work head moves downwardly until the cam 365 causes the switch 371 to move its contacts 371a and 371b back to the position shown in Figs. 19 and 19A. This deenergizes the CL relay with consequent disengagement of the clutch 63 and closing of the coolant supply valve 316. Deenergization of the CL relay, by movement of switch 371, has also closed the contacts CL–2 thereby energizing the TR relay, and hence the latter operates its TR–1 contact a short time thereafter to break the circuit to the FC relay. The TR–1 contact is held open by the continued energization of the TR relay through the contacts ER–2, ER–3 and CL–2 so that the circuit for the FC relay is held open. The deenergization of the FC relay opens its contacts FC–1 and closes its contacts FC–2 and FC–3. Closing of the FC–3 contacts does not, however, energize the AS relay since the FR–4 contacts are still held open by the continued energization of the FR relay. Consequently, the work is held by the chuck and tail center while the work head rapid traverses downwardly to its starting position. This latter operation is effected by closing of the circuit for the RU relay through the contacts 224a, ER–2, wire 429, contact TA–1, and contacts 371a of switch 371. Energization of the RU relay closes its contacts RU–1, RU–2 and RU–3 for supplying current to the motor 148 and the solenoid of brake 155, the direction of current supplied to the motor being reversed by the contacts 353e and 353f of the hobbing selector switch 353 so that the motor 148 is energized for rotation in the direction which moves the work head downwardly.

When the work head reaches its lowermost or initial position the projection 367 operates the switch 373 back to its position as shown in Figs. 19 and 19A thus opening the circuit through the contact 373b deenergizing the FR relay. The deenergization of the relay FR opens its contacts FR–1, FR–2, FR–3 and closes its contacts FR–4 and FR–5. The opening of the contacts FR–1 deenergizes the relay ER which in turn opens its contacts ER–1, ER–2 and ER–3 thereby deenergizing the relay RU. This opens the circuit to the rapid traverse motor 148 and to the brake 155, causing the latter to reengage the worm shaft 150. The deenergization of the relay FR completes a circuit for energizing the AS relay through the FR–4, FC–3, and DR–3 contacts. Therefore, the AS–1 and AS–2 contacts are opened, deenergizing the solenoid 296 and thereby effecting release of the chuck and tail stock mechanisms, as previously described, so that the workpiece may be removed.

The contacts FC–2, which are now closed, prepare the circuit for a new operation. Therefore, when the start button 350 is actuated to start the new cycle, the work head now moves upwardly with its chuck and tail center in released positions. After the work head reaches its upper position, a new workpiece is positioned and the start button again actuated. This causes the workpiece to be gripped and the work head to begin its feeding movement downwardly as previously described. As in the case of "normal" hobbing, it is necessary to actuate the stop button 351 to operate the chuck and tail center mechanisms only when initially starting the machine, since the relay DR remains energized throughout the normal operation of the machine.

As mentioned under "normal" hobbing, the switch 224 is controlled by the extremes of axial movement of the hob spindle 31 in order to indicate when the hob should be replaced or reground and also to prevent further use of the unit until the spindle has been retracted to its initial position after it has reached its extreme forward position. In the event the hob has advanced to its extreme forward position, thereby actuating the switch 224 to open the contacts 224a and to close the contacts 224b thereof, during a cycle of operation, the cycle is not interrupted but will continue to completion. This is due to the fact that the contacts FC–1 are closed while the CL relay is energized for effecting engagement of the clutch 63, and these contacts FC–1 provide a circuit from the wire 423 through the contacts ER–3 to the wire 429 thus bridging the contacts 224a. Since the hob is shifted only when the clutch is engaged, this means that opening of the contacts 224a after the hob has started upon a hobbing operation, will not interrupt this operation which will continue to completion. Moreover, if the hob be in operation when the switch 224 is operated, the ER–4 contacts will be open so that the light L will not be illuminated by closing of the contacts 224b. However, when the work head is returned to its initial or lower position, the ER relay is deenergized by operation of switch 373. This closes the ER–4 contacts and hence the light L will be illuminated if the contacts 224b have been closed by the shifting of the hob spindle to its extreme forward position. Nevertheless, the work head may be returned to its upper position by again actuating the start button 350 even though the switch 224 has been operated to open its contacts 224a and close its contacts 224b. A new hobbing operation cannot be started however, since the open condition of the contacts 224b will now prevent a new energization of the CL relay. Returning of the hob spindle to its extreme retracted position will again close the contacts 224a and open the contacts 224b thus preparing the unit for a new cycle of operation and extinguishing the light L.

*"Climb" hobbing with feed "clean-up"—automatic operation*

Automatic feed "clean-up" is not possible with a machine having a control circuit as illustrated in Figs. 19 and 19A when "climb" hobbing is used. This is due to the fact that when the hobbing has been completed by the work head moving to the point at which the switch 371 is operated back to its initial position illustrated in Figs. 19 and 19A, the circuit for the CL relay is opened by this switch. Hence, the timer 356, which includes the TA relay and the TA-1 contact, cannot maintain a circuit for the CL relay which controls the clutch 63.

*"Climb" hobbing with automatic return— automatic operation*

Assuming that the DR relay has been previously energized and that the hobbing selector switch 353 has been set for "climb" hobbing, an actuation of the automatic return switch 354 to its "on" portion immediately closes a circuit from the wire 419 through the contacts DR-1, wire 421, contact 354b, wire 442', contacts 353b and 443, wire 448, contact 373a, contacts 353c and 444, contacts FC-2 and through the DN relay to the wire 417. This energizes the DN relay closing its contacts DN-1, DN-3, DN-4 and DN-5. Closing the contacts DN-1 provides a holding circuit for the relay DN while closing of the contacts DN-3, DN-4 and DN-5 energizes the rapid traverse motor 148 in a direction to elevate the work head since the contacts 353e and 353f are in engagement with the contacts 446 and 447, respectively, the brake 155 being released by current supplied through the normally closed contacts BR-1, BR-2. The energization of the DN relay also opened its contacts DN-2 which have been placed in the circuit of the AS relay by the movement of the contact 354a to its "on" position when the switch 354 was initially positioned. Hence, the AS relay is not energized so that the chuck and tail center are in work engaging positions while the work head rapid traverses to its upper position.

When the work head reaches its uppermost position the projection 368 actuates the switch 373, breaking the circuit through the contact 373a and closing the circuit through the contact 373b. This deenergizes the relay DN which opens its contacts DN-1, DN-3, DN-4 and DN-5 thus stopping the rapid traverse motor and reapplying the brake. The deenergization of the DN relay also closes the DN-2 contacts thus completing the circuit therethrough to the AS relay since the DR-3 contacts are held closed by the DR relay. The resulting energization of the AS relay closes the contacts AS-1 and AS-2 thus energizing the relay 296 effecting release of the work gripping means as previously described. During the upward movement of the work head, the cam 365 thereon has reversed the position of the switch 371 moving its lower contact 371b into circuit closing position and opening the circuit through the contact 371a thus preparing circuits for effecting the hobbing operation.

The operator now inserts a workpiece between the chuck and tail center and presses the start button 350. This closes a circuit through the contact 350a of the start switch as above described under the heading of "'Climb' hobbing— automatic operation." Consequently, the FR relay is now energized, opening its contacts FR-4 and thereby deenergizing the AS relay and the solenoid 296 so that the chuck and tail center are actuated to work gripping positions. Also, the ER relay is energized, as before, so that the clutch 63 is engaged with the result that the work head is moved downwardly at a feeding rate with simultaneous rotation of the workpiece and hob. Hence, the work is hobbed, coolant or cutting fluid being supplied thereto during the hobbing.

When the work head has moved downwardly the predetermined distance for which the cam 365 is set, the latter actuates the switch 371 back to the position illustrated in Figs. 19 and 19A thus deenergizing the CL relay and thereby effecting disengagement of the clutch 63 so that the feed of the work head and rotation of the hob and workpiece are terminated. The supply of coolant is also terminated by opening of the circuit through the solenoid CS, all as above described. The actuation of switch 371 has also energized the RU relay so that the work head is now moved at the rapid traverse rate the remaining distance back to its original starting position where the projection 367 reverses the switch 373a. This results in deenergization of relays FR, ER and RU thus terminating the rapid traverse movement of the work head in the downward direction. The movement of the switch 373 at this time also causes the contact 373a to again close the circuit for the DN relay through the contact 354a of the automatic return switch so that the work head immediately is rapid traversed upwardly again, carrying with it the workpiece firmly gripped by the chuck and tail stock since the DN-2 contacts are opened substantially simultaneously with the closing of the FR-4 and FC-3 contacts so that the circuit to the AS relay is not completed at this time. However, when the work head again reaches its uppermost position and is stopped by the projection 368 moving the switch 373 to break the circuit to the DN relay, closing of the contacts DN-2 of the latter now close a circuit for energizing the AS relay with consequent release of the workpiece. Hence, the hobbed workpiece may be removed and a new workpiece inserted, the cycle being repeated by simply depressing the start button 350.

*"Climb" hobbing—manual operation*

When it is desired to employ the hobbing machine for "climb" hobbing but without rotation of the turret, the operation is effected by initially actuating the start buttons 323 and 325 thereby energizing the cut motor 47 and the motor 386 for the coolant pump. With the hobbing selector switch 353 set for "climb" and the switches 354 and 355 set to their "off" positions, the operator presses the start button 350. The operation will then be the same as that described for "climb" hobbing, automatic operation since the DN relay is energized through the start switch contact 350a thus causing the work head to rapid traverse to its uppermost position. Since the manual switch 352 has not yet been set to its manual position, a circuit is provided through the contacts DR-1, contact 352b, 354a, FR-4, FC-3 and DR-3 for energizing the AS relay. Therefore, the AS relay is energized so that its AS-1, AS-2 contacts are closed energizing the solenoid 296 and thereby operating the valve 295 to release the chuck and tail center. A workpiece is now inserted and the chuck and tail center are operated to work gripping positions by moving the switch 352 to its manual position. This breaks the energizing circuit for the AS relay at the contact 352b with the result that the valve 295 now drops back to the position in which air pressure is supplied to the chuck and tail stock mechanisms for gripping the work.

The operator then presses the start button 350. This completes a circuit through wires 425, contacts 353a, 442, 373b, 353d, 445, wire 449, wire 426 and the coil of the FR relay to the wire 417. Thus the FR relay is energized which in turn energizes the ER relay, the rotation controlled switch 357a being by-passed by the contact 352a of the manual switch. The energization of the ER relay closes the circuit through the switch 371 for the CL relay as has previously been described in detail. The work head therefore moves downwardly and a hobbing operation is performed upon the workpiece until the cam 365 actuates the switch 371 to deenergize the clutch relay CL and energize the RU relay thus disengaging the clutch and energizing the motor 148 to move the work head downwardly at rapid traverse rate. When the work head reaches its lowermost position, the projection 367 operates the switch 373 to the position as illustrated in Figs. 19 and 19A, thus deenergizing the circuits for the FR, ER and RU relays. Hence, the rapid traverse movement downwardly is terminated. The AS relay is not energized due to the closing of the FR-4 contacts, however, since the circuit is open at the contact 352b. Hence, in order to remove the workpiece at this time it is necessary to restore the switch 352 to its automatic position. The work head is returned to its uppermost position by again operating the stop button 350.

If the switch 354 be set for automatic return when the switch 352 has been set for manual operation the work head upon reaching its lowermost position will immediately be rapid traversed upwardly without the necessity of manually actuating the start button 350. The workpiece will be carried back up through the hob due to the fact that the circuit to the AS relay is open at the contact 352b of the switch 352. When the work head has returned to its uppermost position, the workpiece may be released by moving the switch 352 to its automatic position thus completing a circuit for energization of the AS relay with consequent release of the workpiece.

MODIFIED CONSTRUCTION

A hobbing machine constructed in accordance with this invention may be provided with electromagnetically operated clutches, instead of the fluid pressure operated clutches previously described. Thus, as shown in Fig. 20, which is similar to Fig. 3 but which illustrates the modified form of clutch and clutch operator, the shaft 56 and the shaft 62 for each unit are rotatably supported by the bearings 57, 58 and 93 respectively, in a one-piece housing 59' attached to the turret member 33 by means of bolts or the like, not shown.

The forward portion of this housing 59' is substantially the same as that of the housing 59 and likewise extends into the hollow interior of the head member 33. In the form of mechanism illustrated in Fig. 20 the clutch 63 has been replaced by a multiple plate friction clutch 450 for selectively connecting the shafts 56 and 62. This clutch is adapted to be actuated to operatively engage and disengage the shafts 56 and 62 by a solenoid means, generally designated 451, which is enclosed within a housing 452 secured to the lower side of the cap member 46 by means of a plate 453 and bolts 454. The solenoid means 451 includes two electromagnets or solenoids 455 and 456 (see Figs. 21 and 21A) adapted to longitudinally move a common armature 457 in opposite directions. The armature 457 is provided at its outer end with a substantially U-shaped bracket 458 to which is connected the upper end of an actuating lever 459 for the clutch 450. The lever 459 is pivoted to the housing 59' and the lower end of the lever, which extends through an opening in the housing, is bifurcated and straddles a circular groove 460 provided upon the driven member of the clutch 450. It will be apparent, therefore, that when one of the electromagnets of the solenoid means 451 is energized, the lever 459 is rocked in one direction to engage the clutch thus effecting rotation of the shaft 62 by means of the motor 47 through the gears 54, 55 and shaft 56. Conversely, energization of the other electromagnet of the solenoid means 451 rocks the lever 459 in the opposite direction thereby disengaging the clutch 450 and thus terminating the rotation of the shaft 62 and the mechanism driven thereby.

The outer end of the shaft 62 in this form of the machine is provided with bevel gears 91 and 95 for driving the bevel gears 101 and 104 connected with the shafts 102 and 105, respectively, in the same manner as in the previously described embodiment illustrated in Fig. 3. The gearing mechanisms driven by the shafts 102, 105 are the same as have been previously described with respect to the embodiment illustrated in Figs. 1 through 19 and hence are not again illustrated and described.

Since this modified form of machine does not employ a fluid actuated clutch, the valve 84 and its solenoid operator 89 are, of course, omitted, the fluid pressure supply line 291 and hose 292 of the unit being now connected directly to the valve 295 for the unit since the T 293 is no longer necessary. Also, in the instant embodiment the connection of the pipes 299 and 304 to the valve 295 are reversed from that employed in the embodiment illustrated in Figs. 1 to 19A so that energization of the solenoid operator 296 now operates the valve to supply fluid under pressure to the chuck and tail stock mechanisms in a manner to operate them into work gripping position, and deenergization of the solenoid 296 actuates the valve 295 in a manner such that the chuck and tail stock mechanisms are released from work engagement. The other mechanical features of this modified construction are otherwise the same as those described with respect to the preferred embodiment and hence are not illustrated and described again, the corresponding parts of the two forms being represented in the drawings and referred to in the subsequent description by the same reference numerals.

Figure 21:
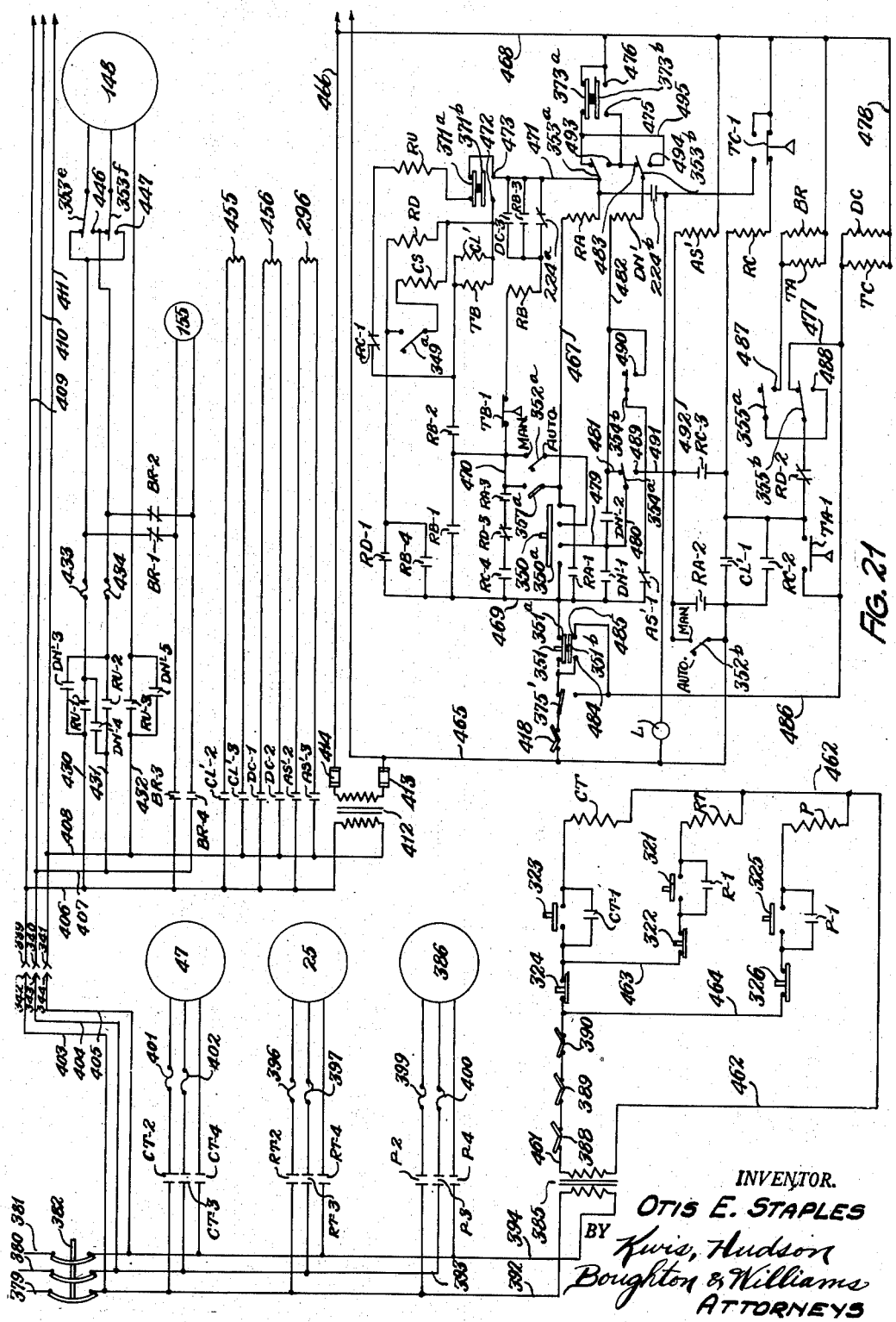
Fig. 21 is a simplified wiring diagram of a portion of the electrical circuit for a modified form of the machine of this invention utilizing the clutch and clutch actuating means illustrated in Fig. 20, the diagram being of the "cross-the-line" type employing the symbols conventionally utilized by the machine tool industry.
Figure 21A:
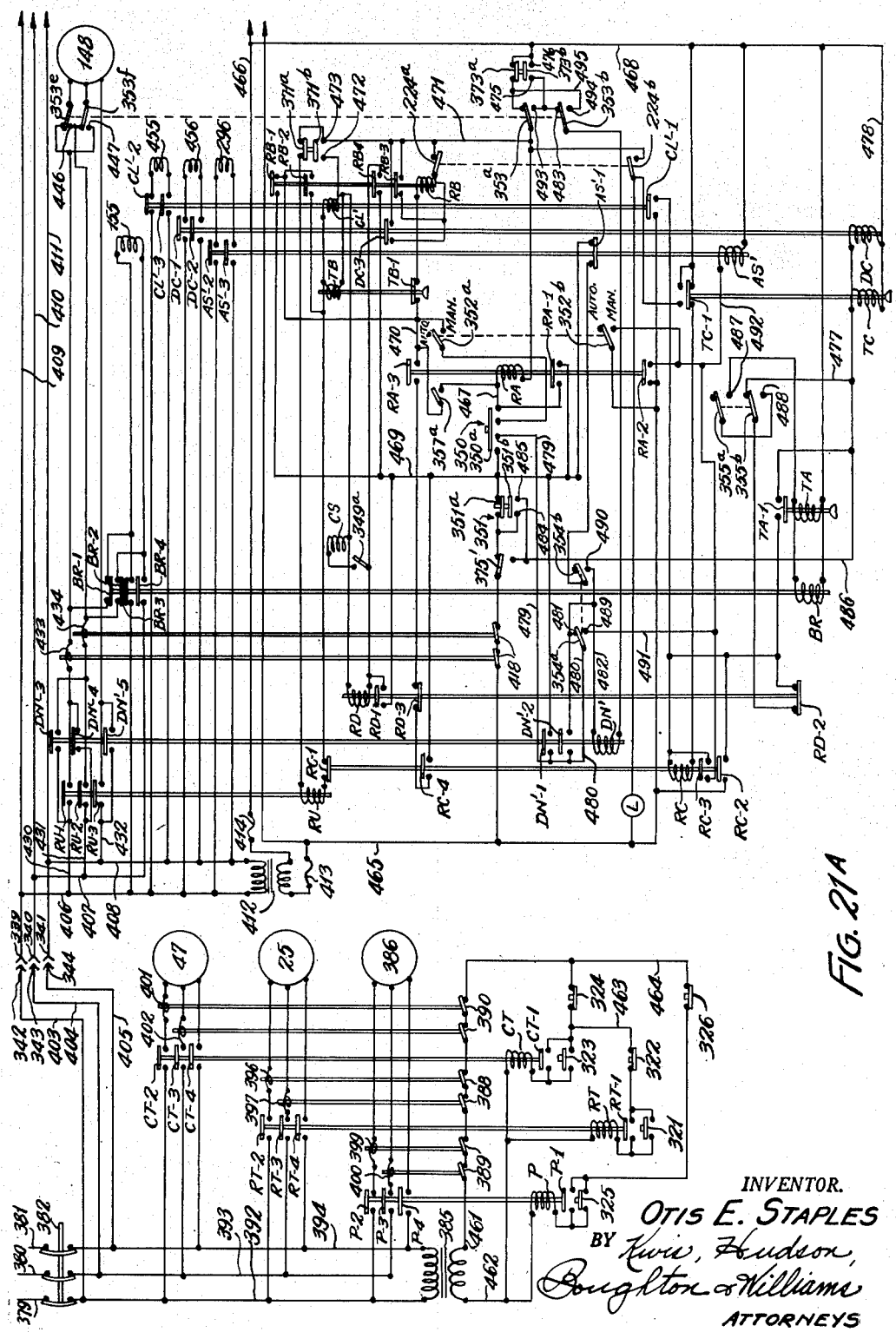
Fig. 21A is a schematic representation of the same electric circuit as illustrated in Fig. 21 but drawn in a different style.

The electrical circuit for this modified construction is, however, considerably different from that illustrated in Figs. 19 and 19A although it employs the same manually operable switches, work head and rotation operated switches and also many of the same relays, all of which are designated by the same numerals as in the preferred embodiment. This modified form of electrical circuit is illustrated in Figs. 21 and 21A in which it will be observed that the previously described air pressure operated switch 309, the safety switch 329 for the main control cabinet, the safety switches 338a to 338h, inclusive, for the control cabinets 336, the SR relay and its contacts SR-1 and the safety switch 347 for the cover plate of the collector rings 339, 340 and 341 have been omitted. The other changes in the circuit can best be understood from a consideration of the circuit illustrated in Figs. 21 and 21A and from the subsequent description of the mode of operation of the modified embodiment.

As shown in Figs. 21 and 21A, power is supplied to the hobbing machine from the main power supply lines 379, 380 and 381 through the circuit breaker 382 to the power lines 392, 393 and 394 connected to the machine side of the circuit breaker 382. The power supply lines 392 and 394, in this form of the machine are directly connected with the primary of the transformer 385, the secondary of which is connected with a circuit controlled by the previously mentioned start and stop buttons 321 to 326, inclusive, for controlling the operation of the rotation motor 25, cut motor 47 and coolant pump motor 386. Thus, one terminal of the secondary of transformer 385 is connected by a wire 461 to the current overload limit switches 388, 389 and 390 which are connected in series with each other and with one side of the stop switch controlled by the button 324, the other side of this switch being connected to one side of the cut motor starting switch controlled by the button 323, the other side of the latter being in turn connected with the cut motor relay CT. The other side of the cut motor relay CT is connected by a wire 462 leading to the other side of the secondary for the transformer 385. Therefore, when the start button 323 is operated the circuit will be closed through the CT relay energizing the latter and closing its contacts CT-1, CT-2, CT-3 and CT-4.

As before, the closing of contacts CT-1 provides a holding circuit around the start button 323 and closing of the contacts CT-2, CT-3, and CT-4 closes the circuit to the cut motor 47 energizing the latter. In two of the supply leads for the cut motor are provided the current overload relays 401 and 402 for opening the contacts 390 in the event of excessive current flow in the circuit for motor 47. Hence, the cut motor 47, when once started, will continue to operate until the stop button 324 is operated, until the overload relays 401 or 402 operate to open the contacts 390, or until the contacts of the overload limit switches 388 or 389 are opened. When the circuit to relay CT is opened, the holding contacts CT-1 will open as will the contacts CT-2, CT-3, and CT-4, thereby deenergizing the cut motor 47.

A wire 463 is connected between the start and stop switches for the cut motor relay and leads to one side of the stop switch for the rotation motor controlled by the button 322. The other side of this stop switch is connected to one side of the start switch controlled by the button 321, the other side of the latter being connected to one terminal of the relay RT for the rotation motor, the other terminal of the relay RT being connected with the wire 462 leading back to the transformer 385. Therefore, the relay RT is energized by operation of the start button 321 and, when energized, its contacts RT-1 close to provide a holding circuit about the start button 321 while its contacts RT-2, RT-3 and RT-4 close a circuit to the rotation motor 25 causing the latter to be energized and effect rotation of the turret B. In two of the supply wires for the rotation motor 25 are connected the current overload relays 396 and 397 for operating the contacts of the overload switch 388 in the control circuit so that excessive current flowing in the rotation motor circuit will open the control circuit deenergizing the latter and stopping operation of the cut, rotation and coolant pump motors. The rotation motor may also be stopped by operation of its stop button 322, or by operation of the stop button 324 in the circuit for the cut motor relay CT since operation of either of these stop buttons breaks the circuit for the relay RT causing its contacts to open thus deenergizing the rotation motor 25.

A wire 464 is connected in the control circuit between the current overload switch 390 and the stop switch for the cut motor. This wire 464 is also connected to one side of the stop switch controlled by the button 326 for the coolant pump motor 386. The other side of this stop switch is connected to one side of the start switch controlled by the button 325, the other side of the latter being connected to one terminal of the relay P, the other terminal of the relay P being connected to the wire 462 leading back to the transformer 385. Hence, the relay P is energized by operation of the start button 325 causing its contacts P-1 to close and provide a holding circuit for the relay P, energization of the relay also causing the contacts P-2, P-3 and P-4 to close completing the circuit for energizing the coolant pump motor 386. Two of the power leads for the coolant pump motor 386 are provided with the overload relays 399 and 400 connected for operation of the overload switch 389 so that excessive flow of current in the coolant pump motor circuit will break the control circuit for the CT, RT and P relays, thereby deenergizing the cut, rotation, and coolant pump motors. The coolant pump motor may also be stopped by operation of the stop button 326 which deenergizes the relay P causing the contacts P-1, P-2, P-3, and P-4 to open.

As previously mentioned, the safety switches 338a to 338h, and switches SR-1, 347, 329 and 309 are omitted in the modified form of the machine and hence the collector rings 330, 331 and brushes 333, 334 are not used and may be omitted. The collector rings 339, 340 and 341 are used, however, as before to supply power to the control circuit for each unit of the machine, the rings being connected by the stationary brushes 342, 343 and 344 and wires 403, 404, and 405 to the supply leads 392, 393 and 394 on the machine side of the circuit breaker 382. The control circuit for each unit of the hobbing machine is connected to the collector rings by the wires 406, 407 and 408. Only one of these control circuits is illustrated in detail in Figs. 21 and 21A since the others are identical and may be connected to the collector rings in parallel with the illustrated circuit by means of the wires 409, 410 and 411.

The relays for controlling each unit of this modified form of the hobbing machine are contained within control cabinets or boxes such as 336 and each unit is provided with switch operators 349, 350, and 351 for controlling the coolant valve, and the starting and stopping of the hobbing operations, respectively, as in the preferred embodiment. Likewise, each unit is provided with a switch 352 to condition the unit for either manual or automatic operation, a hobbing selector switch 353, an automatic return selector switch 354, a feed control selector switch 355, and an adjustable timer 356. Also, each unit has a switch 357 actuated by the stationary cam 360 when the turret rotates, and switches 371 and 373 actuated by vertical movements of the work head. These switches are identical with the switches designated by the same numerals in the preferred embodiment and operate in the same manner. Each unit of the modified construction is also provided with a work head over-travel limit switch 375', similar to the switch 375, and positioned like the latter to be actuated by projections such as 377 and 378 on the work head. The connections of these several switches, and of the relays and solenoids associated therewith in the modified circuit illustrated in Figs. 21 and 21A, will be apparent from the following detailed description of the operation of the modified form of the invention in which relays and solenoids and switches which are the same as those employed in the preferred embodiment are identified by the same reference characters.

OPERATION OF MODIFICATION

Conventional or "normal" hobbing—automatic operation

With the hobbing machine at rest, conventional or "normal" automatic hobbing is begun, as in the preferred embodiment, by first closing the circuit breaker 382 and then pressing the rotation start button 321, the cut motor start button 323, and the start button 325 for the coolant pump motor 386. This energizes the rotation motor 25, the cut motor 47 and the coolant pump motor 386 thus, respectively, causing the turret to rotate, driving the shaft 56 of each unit and pumping cutting fluid or coolant from the reservoir in the base of the machine to the trough reservoir 312. The coolant, however, cannot flow through the nozzles 315 at this time since the valves 316 are closed.

The circuits established by operation of the start buttons 321, 323 and 325 are normally not disturbed during the operation of the device but in the event that the motors 47, 25, or 386 draw excessive current their operations are terminated by opening of the overload switches 390, 389 or 388 in the motor control circuits by operation of the corresponding overload relays 401, 402, 400, 399, 396 and 397. If desired the rotation motor 25 and the coolant pump motor 386 may also be stopped independently of each other or of the cut motor 47 by operating the stop buttons 326 and 322, respectively. The cut motor and the rotation motor may be simultaneously stopped by actuation of the stop button 324.

As the turret rotates, the hobbing units are successively carried past the loading station adjacent the vertical standard 318. As each unit approaches this station the operator sets the hob selector switch 353 thereof for "normal" or conventional hobbing, the automatic return switch 354 to the "off" position, and the feed control switch 355 to the "off" position. He also moves the toggle switch 352 to its "off" position, and turns the coolant control knob 349 to its "on" position. The operator next positions a workpiece W between the chuck 232 and the tail center 265 and presses the start button 350.

The previously mentioned closing of the circuit breaker 382 has supplied current through the wires 403, 404 and 405 to the brushes 342, 343 and 344, and thence to the collector rings 339, 340 and 341 to which are connected the power supply lines such as 406, 407 and 408 for each unit. Hence, current is supplied through the lines 406 and 408 to the primary of the transformer 412 in the control circuit of the unit. The secondary of this transformer is connected through the fuses 413 and 414 to wires 465 and 466. Therefore, when the start button 350 is actuated, as previously mentioned, current flows from wire 465 through the movable contacts 418 of the current limit switch, controlled by the current overload relays 433, 434 in the circuit of the rapid traverse motor 148, and through the movable contact or blade of the overtravel limit switch 375', the normally closed contact 351a of the stop switch 351, the movable contact of 350a of the start switch 350, a wire 467, the coil of a relay RA, contact 353a of the hob selector switch, the upper contact 373a of the switch 373 and a wire 468 to the wire 466. The resulting energization of relay RA causes it to close its normally open contacts RA-1 providing a holding circuit around the movable blade 350a of the start switch so that only momentary actuation of the latter is necessary, the relay RA remaining energized after the start button 350 is released.

Operation of relay RA likewise closes its normally open contacts RA-2, closing the circuit from wire 465 through a relay AS' to the wire 466 thereby energizing the relay AS' which opens its normally closed contacts AS'-1 and closes its normally open contacts AS'-2 and AS'-3. Closing of the latter contacts completes a circuit through the solenoid 296 actuating the valve 295 to supply air under pressure to the cylinders 236 and 242 in a direction for operating the chuck to grip the workpiece W and for moving the tail center 265 into engagement with the upper end of the workpiece so that the latter is firmly gripped and supported for hobbing or other machining operations thereon, it being remembered that the valve 295 works in the opposite manner in this embodiment from its operation in the preferred embodiment.

As the turret continues to rotate, the unit which has just been provided with a workpiece, will move past the stationary cam 360 which engages the arm 358 of switch 357, moving its contact 357a to closed position. The contacts 418, 375' and 351a remain closed throughout the normal operation and hence current is supplied therethrough and through a wire 469, the now closed contacts RA-1, the contact 357a of the switch 357, a wire 470, the normally closed contact TB-1 on a time relay TB, the coil of relay RB, the normally closed contacts 224a of the hob shift actuated switch 224, a wire 471, the contact 353a of the hobbing selector switch 353, and through the upper contact 373a of switch 373 to the wire 468. Energization of relay RB closes its normally open contacts RB-1, RB-2, RB-3 and RB-4. Closing of contacts RB-1 provides a holding circuit from the wire 469 to the wire 470 so that, when the rotation of the turret releases the arm 358 of switch 357, the resulting opening of the switch contact or blade 357a will not de-energize the relay RB. The closing of the contact RB-2 completes a circuit therethrough and through the normally closed contacts RC-1 of the relay RC, the coil of the relay RU, the upper contact 371a of the switch 371, wire 471, contact 353a, and through the upper contact 373a of switch 373 to the wire 468.

Energization of the relay RU, operates as in the preferred embodiment, to close its normally open contacts RU–1, RU–2 and RU–3 in the leads 430, 431 and 432 for the rapid traverse motor 148, the circuit for the motor being completed through the contacts 353e and 353f which were positioned, as shown, by the initial setting of the hobbing selector switch 353 to its "normal" hobbing position. Simultaneously, current is supplied from the motor leads 430 and 431 through the normally closed contacts BR–1 and BR–2 to the solenoid of the brake 155 releasing the latter. Hence, the motor 148 is free to rotate and move the work head vertically upward at a rapid rate through gearing mechanism of the type disclosed for performing this operation in the preferred embodiment. When the work head has been elevated to bring the workpiece W closely adjacent the hob, mounted upon the hob spindle 31, the arm 372 of switch 371 moves off of the cam 365 so that the contacts of the switch 371 are moved from their position as shown in Figs. 21 and 21A to the other position thereof in which the lower contact 371b of the switch engages the stationary contacts 472 and 473. This movement of the switch 371 deenergizes the relay RU, opening the contacts RU–1, RU–2 and RU–3 thereby deenergizing the rapid traverse motor 148 and terminating the supply of current to the solenoid of the brake 155. Consequently, the brake is applied, immediately stopping the rotation of the motor 148, and thus terminating the relatively rapid movement of the work head.

The above mentioned actuation of the lower contact 371b of switch 371 into engagement with the contacts 472 and 473 closes a circuit from the line 469 through the now closed contacts RB–1 and RB–2, the parallel connected relay coils TB and CL', contact 371b, wire 471 and through contacts 353a and 373a to the wire 468 thus energizing the relays CL' and TB. Energization of the relay CL' closes its normally open contacts CL'–1, CL'–2, and CL'–3. Closing of the contacts CL'–2 and CL'–3 closes a circuit from the power supply lines 406 and 408 through the solenoid or electromagnet 455 forming a part of the solenoid means 451 for actuating the clutch 450, the solenoid 455 being adapted when energized, to move the armature 457, bracket 458 and lever 459 in a direction to effect clutch engagement. Since the driving portion of the clutch 450 is being rotated by the motor 47, the engagement of the clutch 450 causes the shaft 62 to be driven with consequent rotation of the vertical shaft 102 and of the shaft 105. The rotation of these shafts acts through gearing mechanism of the type previously described for the preferred embodiment to move the work head vertically at a relative slow feeding rate, to rotate the workpiece W and to rotate the hob or tool T. Therefore, the workpiece is hobbed as it is moved past the hob at the relatively slow rate.

Since the contact 349a was moved to circuit closing position by the initial setting of the coolant switch 349, the previously mentioned movement of the switch 371, bringing its lower contact 371b into engagement with the contacts 472 and 473, has also energized the relay RD and the solenoid CS through a circuit extending from wire 469 through the now closed contacts RB–4, solenoids CS and RD, contact 371b, wire 471, contacts 353a and 373a to the wire 468. The energization of the solenoid CS opens the valve 316 in the pipes 313 and 314 thus allowing coolant or cutting fluid to flow through the nozzle 315 onto the hob and the workpiece as the latter is being hobbed. The energization of the relay RD causes it to close its normally open contacts RD–1 and open its normally closed contacts RD–2 and RD–3. The closing of the contacts RD–1 provides a holding circuit for the relay RD and for the solenoid CS.

The relay TB, which is energized simultaneously with relays CL', RD and solenoid CS, is a time delay relay. Hence, a predetermined time after the energization of the relay TB, it moves its contact TB–1 thus opening the circuit through the relay RB, deenergizing the latter and consequently opening the contacts RB–1, RB–2, RB–3, and RB–4. This deenergizes the relays TB and CL'. The deenergization of the relay CL' opens its contacts CL'–2 and CL'–3 deenergizing the clutch solenoid 455. The clutch 450 will, however, remain in its engaged position even though the solenoid 455 has been deenergized, since it must be positively actuated to effect engagement and disengagement. The opening of the contacts RB–1, RB–2 and RB–4, when relay RB is deenergized, will not interrupt the supply of cutting fluid to the hob since the above-mentioned contacts RD–1 have provided a holding circuit for solenoid CS and relay RD.

The previously mentioned energization of the CL' relay, closing its CL'–1 contacts, effected energization of the relay RC through a circuit extending from wire 465 through the CL'–1 contacts, the coil of the RC relay, and the movable contact TC–1 of a time delay relay TC to the wire 468. This energization of the RC relay causes the latter to open its normally closed contacts RC–1 in the circuit for the RU relay thus preventing inadvertent operation of the rapid traverse motor. Energization of the RC relay also closes its normally open contacts RC–2, RC–3 and RC–4. The closing of the contacts RC–2 provides a holding circuit for the RC relay around the CL'–1 contacts so that, when the latter are opened by the deenergization of the CL' relay, the RC relay will remain energized. The closing of the RC–3 contacts provides a holding circuit for the AS' relay about the RA–2 contacts.

The vertical feeding movement and rotation of the workpiece, and the rotation of the hob continue until the work head D has moved upwardly its predetermined distance as determined by the adjusted position of the projection 368. The arm 374 of the switch 373 is then engaged by the projection 368 moving the contacts of the switch from the position shown in Figs. 21 and 21A to bring the lower contact 373b thereof into engagement with the stationary contacts 475 and 476. This breaks the circuit for the relay RA deenergizing it and thus opening the contacts RA–1, RA–2, and RA–3. The opening of the contacts RA–2 does not, however, release the chuck and tail stock mechanisms since it will be remembered that the contacts RC–2 and RC–3 provide a holding circuit for the relay AS' which controls the operation of the chuck and tail stock mechanisms. The actuation of the switch 373 also breaks the circuit for the relay RD and the coolant solenoid CS. The deenergization of the coolant solenoid causes the valve 316 to close terminating the flow of coolant or cutting fluid. Deenergization of relay RD opens its contacts RD–1 and closes its contacts RD–2 and RD–3. Closing of the contacts RD–2 completes a circuit from the line 465 through the closed contacts RC-2, RD-2, contact 355b of the automatic feed selector switch 355, wire 477, the coils of relays TC and DC in parallel, and wire 478 to wire 468, thus simultaneously energizing the relays DC and TC.

The relay TC is provided with a movable contact TC-1 which is adapted to be operated a predetermined time after the TC relay has been energized. Energization of the DC relay closes its normally open contacts DC-1 and DC-2 connecting the supply leads 406 and 408 to the declutch solenoid or electromagnet 456 forming a part of the solenoid means 451 for operating the clutch 450. Energization of the solenoid 456 moves the armature 457, the U-shaped bracket 458 and the lever 459 in a direction to disengage the clutch 450, thereby terminating rotation of the work and hob and also terminating vertical feeding of the work head. A predetermined time thereafter, the TC relay operates its TC-1 contact to open the circuit for the RC relay thus opening the contacts RC-2, RC-3 and RC-4 and closing the contact RC-1. Opening of the contacts RC-2 and RC-3 opens the circuit of the relay AS' deenergizing the latter and thereby opening the contacts AS'-2, AS'-3 and closing contacts AS'-1. The opening of the contacts AS'-2 and AS'-3 deenergizes the solenoid 296 for operating the air valve 295. Consequently, the valve 295 will now move to a position for supplying air under pressure to the cylinders 242 and 236 in a direction for raising the tail center from engagement with the work and to release the chuck 232 so that the workpiece W may now be readily removed from the chuck. This delay of the release of the workpiece after the disengagement of the clutch, which is interposed by the relay TC and its contact TC-1, prevents the chuck and tail center from releasing the work before the hobbing or cutting is terminated.

Opening of the contacts RC-2 also deenergizes the relay DC thereby opening the contacts DC-1 and DC-2 and deenergizing the declutch solenoid or electromagnet 456. This does not shift the clutch 450 to engaged position but prevents excess heating of the solenoid 456 and prepares the circuit for the next operation. The previously mentioned movement of the contacts TC-1, when the relay TC is energized, closes a circuit from the line 465 through the light L on the station switch unit 348, and through the contact TC-1 to the wire 468. This gives a flash of light indicating to the operator that the work may be removed from the machine. The above-mentioned opening of the contacts RC-2 also deenergizes the relay TC allowing its movable contact TC-1 to return to its initial position thereby extinguishing the light L.

The operation of the apparatus is so timed that each hobbing unit is returned to the starting or loading station by the time its hobbing operation is completed and its chuck and tail center are released. As each unit passes the starting or loading station, the operator removes the work and again presses the start button 350, moving the contact 350a into circuit closing position. A circuit is therefore closed from the wire 469 through the contact 350a, the wires 479 and 480, the movable contact 354a of the automatic return switch 354, the stationary contact 481, a wire 482, the coil of a relay DN', the movable contact or blade 353b of the hobbing selector switch, through the stationary contact 483 and to the wire 468 through the lower contact 373b of the switch 373, which was previously moved into engagement with the contacts 475 and 476 by the projection 368 when the work head reached its uppermost position. Relay DN' is thus energized closing its normally open contacts DN'-1, DN'-2, DN'-3, DN'-4, and DN'-5. Closing of the contacts DN'-1 provides a holding circuit for the relay DN' maintaining the latter energized after the start button 350 is released. Closing of the contacts DN'-3 and DN'-4 and DN'-5 supplies current to the rapid traverse motor 148 in a direction to cause the latter to rotate in the opposite direction from that in which it rotated when energized through the RU-1, RU-2, and RU-3 contacts, the connections for the motor 148 being the same as in the circuit illustrated in Figs. 19 and 19A. Current is also supplied through the normally closed contacts BR-1, BR-2 energizing the solenoid of the brake 155 releasing the latter. Consequently, the work head is now moved downwardly at a rapid rate, and during this downward movement the cam 365 engages the arm 372 effecting resetting of the switch 371 to the position illustrated in Figs. 21 and 21A.

When the work head D has reached its lower position the projection 367 engages the arm 374, moving the contacts of the switch 373 back to their initial positions as illustrated in Figs. 21 and 21A, thus opening the circuit through the contacts 475 and 476. This breaks the circuit for relay DN', deenergizing the latter and opening its contacts DN'-1, DN'-2, DN'-3, DN'-4, and DN'-5, thereby deenergizing the rapid traverse motor 148 and the solenoid for the brake 155 so that the motor is stopped and the brake applied terminating the movement of the work head. The cycle is repeated by inserting a new workpiece and momentarily depressing the start button 350, and this operation is performed for each work head as it moves past the loading station so that the operator has simply to press a single button for each unit and load and unload the work during the normal operation of the machine.

In the event it is desired to stop the operation of a unit, the stop button 351 is actuated thus moving the contacts 351a and 351b thereof from the position shown in Figs. 21 and 21A, opening the circuit through the contact 351a and bringing the contact 351b into engagement with the stationary contacts 484 and 485. This closes a circuit through wire 486 to energize the relays TC and DC. The operation of push button 351 also breaks the circuit for the CS solenoid and the CL', RA, DN', and RU relays deenergizing the rapid traverse motor and the solenoid of the brake 155, if these were energized, and also closing the coolant valve and deenergizing the clutch solenoid 455 if the unit has started to hob a workpiece. The energization of the relay DC closes the DC-1 and DC-2 contacts to energize the declutch solenoid 456; effecting disengagement of the clutch, thus stopping the rotation of the hob and workpiece and the feeding movement of the work head if hobbing has begun. The energization of relay TC also causes the latter to open its contact TC-1, deenergizing the relay RC thereby deenergizing the relay AS' with consequent release of the air operated chuck and tail center. Hence, operation of the unit is completely terminated at any point in its cycle.

In the event the work head travels either above or below its predetermined limits the corresponding projection 378 or 377 will operate the arm of switch 375', corresponding to the switch 375 in the preferred embodiment, moving the contact of this switch to open the circuit through the start switch and close the circuit through the wire 486 thereby acting as in the case of actuation of the stop button to stop the unit.

As in the circuit illustrated in Figs. 19 and 19A, the supply leads 430 and 431 for the rapid traverse motor 148 are provided with overload relays 433 and 434, respectively, connected for operating the movable contacts 418 in the circuit leading to the start switch 350. Hence, in the event of an excessive flow of current through either of the leads 430 or 431, the circuit through the start switch will be broken thus breaking the circuit for the DU and DN' relays. This will deenergize the motor 148 and apply the brake 155. Since an overload in the rapid traverse circuit can only occur when the motor 148 is in operation, the clutch will not be engaged at that time and hence it is not necessary to energize the DC and TC relays.

During the normal operation of the modified form of the hobbing machine, the hob is slowly advanced in an axial direction, by mechanism such as that illustrated in Figs. 7 and 8, to uniformly distribute the wear on the hob along its entire length and therefore the same type of switch 224 and switch operating means are employed for actuation by the shifting of the hob spindle. Hence, when the hob has reached its extreme forward position, corresponding to the time when the hob should be replaced or reground, the contacts 224a of the switch 224 are opened and the contacts 224b are closed. Closing of the contacts 224b lights the lamp L if the unit is in the process of hobbing. If the unit be rapid traversing in a downward direction, the light L is not lighted until the unit has reached its starting position. Opening of the contacts 224a, opens the circuit for relay RB thus preventing the starting of a new cycle, by actuation of the start button 350, until the hob shifting mechanism has been returned to its initial position to again close the contacts 224a and open the contacts 224b. However, if a cycle of operation has started prior to actuation of the switch 224, so that the relay RB was initially energized through the normally closed contacts 224a, this cycle will not be interrupted until completed since the energization of the relay RB has closed the contacts RB-3 providing a holding circuit around the contacts 224a. The operation of the cycle will therefore continue to completion, the return of the work head to its initial position by the second actuation of the start button not being affected by the condition of switch 224. However, as previously mentioned, a new cycle may not be initiated until the hob shifting mechanism has been completely returned to its starting position, this being indicated by the extinguishing of the light L as a result of opening the contacts 224b.

*Conventional or "normal" hobbing with "clean-up"—automatic operation*

In certain instances it is desirable to maintain the work and hob in rotation but without feeding of the work at the end of the hobbing or cutting operation to provide for "clean-up." This is readily effected in the instant embodiment of the machine by setting the feed control switch 355 on the cabinet 336 of the unit to the "on" position, the setting of the other switches being the same as previously described. This setting of the feed control switch moves the contact 355a thereof into engagement with a contact 487, and the contact 355b into engagement with a contact 488, the circuit being otherwise the same as illustrated in Figs. 21 and 21A. The hobbing unit is then placed in operation and functions as above described until the work head has reached its uppermost position where the projection 468 engages the arm 374 of switch 373 moving the latter to place its lower movable contact 373b in engagement with the contacts 475 and 476. The clutch 450 is not immediately disengaged, as before, since the circuit through the relay DC, controlling the declutch solenoid 456, cannot be completed as in the previously described operation because the setting of the switch 355 has moved its contact 355b from engagement with the contact connected with the wire 477. Instead, a circuit is now completed from the wire 465 through the closed contacts RC-2, the closed contacts RD-2, which were closed by deenergization of the relay RD when the switch 371 was actuated, and through contacts 355b, 488, 355a, 487, the parallel connected relays BR and TA to the wire 468.

Energization of the relay BR opens the contacts BR-1 and BR-2 and closes the contacts BR-3 and BR-4, the latter supplying current to the solenoid of the brake 155 on the shaft of the rapid traverse motor thus releasing the brake so that the feed screw or shaft 143 is free to rotate. The clutch 450 has remained in engagement, however, since the declutch solenoid 456 has not yet been energized. The continued rotation of the worm 140 and the nut 142 by the shaft 102 will no longer cause feeding movement of the work head D because the feed screw 143 is now free to turn so that the nut 142 cannot move relative thereto. Consequently, the work head stands still while the work continues to rotate, being driven by the worm 129 and worm wheel 130 operated by the shaft 102. Likewise, the hob will remain in continuous rotation since the drive thereto has not been interrupted at the clutch 450.

The relay TA is a part of the timer 356 which has been set to provide a predetermined "dwell" period before the relay TA is effective to operate its movable contact TA-1. After this "dwell" period has elapsed the contact TA-1 will be moved, closing a circuit from the wire 465 through the closed contacts RC-2, contact TA-1, the relays TC and DC, and the wire 478 to the wire 468 thus energizing relays DC and TC. Energization of relay DC closes its contacts DC-1 and DC-2 thus energizing the declutch solenoid 456 which operates, as above described, to disengage the clutch 450 thereby stopping rotation of the work and of the hob. Energization of the time delay relay TC causes its contact TC-1 to move a short time thereafter breaking the circuit of relay RC and also momentarily closing the circuit for the light L. This flashing of the light indicates that the "clean-up" period is now completed and that the work is ready for removal since the opening of the circuit of relay RC will also have opened its contacts RC-2 and RC-3 thereby deenergizing relay AS' with consequent deenergization of the solenoid 296, by opening of the contacts AS'-2 and AS'-3, the deenergization of the solenoid 296 moving the valve 295 to supply air pressure for releasing the chuck and tail stock.

The deenergization of relay RC, with the consequent opening of its contacts RC-2, also deenergizes the relays DC, TC, TA and BR thus restoring the contacts DC-1, DC-2, TC-1, TA-1, BR-1, BR-2, BR-3, and BR-4 to their initial positions. Opening of the contacts BR-3 and BR-4, and closing of the contacts BR-1 and BR-2 deenergizes the solenoid for the brake 155 so that the brake is again engaged. Hence, when the start button 350 is again actuated, the brake 155 is under the control of the normally closed contacts BR-1 and BR-2 as in the operation when no "clean-up" is provided. Therefore, the work head is rapid traversed back to its initial starting position by actuating the start button 350, the operation then being the same as previously described for "normal" operation without "clean-up."

*Conventional or "normal" hobbying with automatic return—automatic operation*

When it is desired to have the work head return to its initial or starting position after termination of the hobbing operation without again actuating the start button 350, the automatic return switch 354 on the cabinet 336 of the unit is set at its "on" position. This moves the movable contact or blade 354a of the switch from engagement with the stationary contact 481 and into engagement with the stationary contact 489, and moves the movable contact or blade 354b into engagement with a contact 490, the circuit otherwise remaining as illustrated in Figs. 21 and 21A. The operation of the unit is started as before by depressing the start button 350 and by placing a workpiece in position, the workpiece then being gripped, rapid traversed, and hobbed or machined as above described until the switch 373 is moved to engage its lower movable contact 373b with the contacts 475 and 476. This movement of switch 373, as previously mentioned, closes circuits operating the declutch solenoid 456 and deenergizing the relay AS'.

The deenergization of relay AS' also closes its contacts AS'-1 thus closing a circuit from the wire 469 through contacts AS'-1, 354b, 490, wire 482, the coil of relay DN', contacts 353b, 483, 475, 373b, and 476 to the wire 468. This energizes the relay DN' causing the latter to close its contacts DN'-1, DN'-2, DN'-3, DN'-4, and DN'-5. The contacts DN'-1 and DN'-2 close a holding circuit for the relay DN' about the contacts AS'-1 which are almost immediately reopened by the reenergization of the relay AS' through a circuit from the wire 469, contacts DN'-1, wire 480, contacts 354a, 489, wire 491, wire 492 and the coil of the relay AS' to the wire 468. Energization of the relay AS' again closes its contacts AS'-2 and AS'-3 reenergizing the solenoid 296. The deenergization of relay AS' and reenergization thereof occur within such a short time that the chuck and tail stock cannot operate to release the work before again being actuated into gripping relationship and hence the work is continuously gripped as though the relay AS' had not been deenergized. The closing of the contacts DN'-3, DN'-4 and DN'-5 close the circuit to the motor 148 energizing the latter for rotation in a direction which moves the work head downwardly, current also being supplied through the normally closed contacts BR-1 and BR-2 to the solenoid of the brake 155 releasing the latter so that the rotation of the motor 148 is effected to move the work head in rapid traverse to its lower position.

The provision of the normally closed contacts AS'-1 in the circuit of relay DN' is an important feature of this embodiment because it insures that the rapid traverse downwardly of the work head cannot occur until after the DC relay has been operated to effect energization of the declutch solenoid 456 with consequent disengagement of the clutch 450. This is due to the fact that the DN' relay cannot be energized until the AS'-1 contacts have momentarily opened by the momentary deenergization of relay AS', and the latter cannot be deenergized until the relays DC and TC have been energized, since the TC-1 contact controls the circuit for relay RC and the RC-2 and RC-3 contacts of the latter control the relay AS'.

As the work head moves downwardly in rapid traverse the work is retained in clutched relationship and is carried back through the hob. When the work head reaches its lowermost position, the switch 373 is reversed by the actuation of its arm 374 which is engaged by the projection 367 thus breaking the circuit of the DN' relay and opening its contacts DN'-1, DN'-2, DN'-3, DN'-4, and DN'-5. The rapid traverse motor 148 is therefore deenergized, as is also the solenoid for the brake 155, thus stopping further movement of the work head. As in the other operations, the switch 371 is returned to its initial position by the cam 365 while the work head moves downwardly.

*Conventional or "normal" hobbing with "clean-up" and automatic return—automatic operation*

A "dwell" may be provided in the work head movement at the end of the cutting operation to effect "clean-up" in conjunction with automatic return by setting both the automatic return switch 354 and the feed selector switch 355 to their "on" positions prior to starting of the cycle. The operation is then the same as described for "normal" automatic operation with "clean-up," except that instead of operating the start button 350 to return the work head at the end of the "clean-up" operation, as indicated by flashing of the light L, this return is automatically effected as just described.

*Conventional or "normal" hobbing—manual operation*

In initially setting up the machine, it is frequently desirable to operate a hobbing unit without rotation of the turret. This may be readily effected in the present machine by depressing the start buttons 323 and 325 for energizing the cut motor 47 and the coolant pump motor 386, as previously described. The operator next positions a workpiece between the chuck and tail center, operates the toggle switch 352 to its "on" or "manual" position, and also turns the coolant switch knob 349 to its "on" position. Operation of the toggle switch 352 moves the contacts 352a and 352b of the latter into circuit closing position. Hence, the AS' relay is immediately energized through a circuit extending from the wire 465 through contact 352b, wire 492, and the coil of the relay AS' to the wire 468. The energization of the AS' relay opens its contacts AS'-1 and closes its contacts AS'-2 and AS'-3. Closing of the contacts AS'-2 and AS'-3 energizes the solenoid 296 thereby operating the valve 295 to supply fluid pressure to the chuck and tail stock mechanisms in a manner to cause these mechanisms to grip the workpiece.

When the operator now presses the start button 350 for the hobbing unit, the switch 357, which is operated by the cam 360 due to rotation of the turret, is now by-passed by the contact 352a of the switch 352 so that operation of the unit is initiated without rotation of the turret. The relay RB is now energized by a circuit extending through the movable contact 350a of the start switch, contact 352a, contact TB-1, the coil of relay RB, contacts 224a, wire 471, the contact 353a of the hobbing selector switch and contact 373a of switch 373 to the wire 468.

The workpiece is therefore gripped, rapid traversed into hobbing position, hobbed and its vertical movement stopped as above described for the automatic operation. The workpiece is not, however, released since the contact 352b holds the AS' relay energized. The momentary flash of the light L, effected by the operation of TC-1 contact after the clutch 450 has been disengaged, now signifies that the operation is complete and that the workpiece may be removed by opening the contact 352b by moving the toggle switch 352 to its "off" or "automatic" position. The work head may then be returned to its initial position by again operating the start button 350, the operation of the apparatus being the same as that described above for automatic operation.

The "clean-up" feature may be employed with manual operation by setting the feed selector switch 355 to its "on" position, the "clean-up" operation then being the same as described above for "automatic" operation with "clean-up."

If the circuit has also been set for automatic return, by moving the switch 354 to its "on" position, and the operator has set the toggle switch 352 for manual operation, automatic return does not occur until the toggle switch is operated to its "off" position to deenergize the AS' relay, since the latter will hold its AS'-1 contacts open thus preventing energization of the DN' relay controlling the rapid traverse down.

"Climb" hobbing—automatic operation

The modified form of hobbing machine of this invention is also capable of being operated for hobbing in accordance with the "climb" method by setting the hob selector switch 353 to its "climb" position and by interposing an idler gear in the feed train comprising the gears 131, 132, 135 and 136 to change the direction of rotation of worm wheel 141 and feed nut 142. Assuming that the operation is to be effected automatically and without "clean-up" or automatic return, the switch 352 is set to its "off" or "automatic" position, and switches 354 and 355 are set to their "off" positions. The circuit thus established is the same as that illustrated in Figs. 21 and 21A except that the contacts 353a, 353b, 353e and 353f of the hobbing selector switch have been moved from their indicated positions into engagement with the contacts 493, 494, 446 and 447, respectively. Operation of the hobbing machine is now started as before by depressing the start buttons 321, 323 and 325 thus energizing the rotation motor 25, cut motor 47 and the coolant pump motor 386. As the turret begins its rotation the operator also actuates the coolant switch knob 349 to its "on" position and presses the hob unit start button 350.

A circuit will now be completed from the wire 465 through the contacts 418, 375', 351a, 350a, wire 479, wire 480, contacts 354a, 481, wire 482, the coil of relay DN', contacts 353b, 494, wire 495 and the upper contact 373a of switch 373 to the wire 468. The relay DN' will thus be energized, closing its contacts DN'-1, DN'-2, DN'-3, DN'-4, and DN'-5. The contacts DN'-1 and DN'-2 provide a holding circuit for the relay DN' so that the latter remains energized after the start button 350 is released. Closing of the contacts DN'-3, DN'-4 and DN'-5 supply current to the rapid traverse motor 148, the direction of the current thus supplied being reversed at the contacts 353e, 446 and 353f, 447 so that the motor 148 operates in a direction to move the work head upwardly. Current is also supplied through the normally closed contacts BR-1, BR-2 to the solenoid of the brake 155 releasing the latter.

The work head therefore rapid traverses to its top position and during this movement the cam 365 operates the switch 371 to move its lower contacts 371b into engagement with the stationary contacts 472 and 473. At the top of its travel the projection 368 on the work head operates the switch 373 moving its lower contact 373b into engagement with the stationary contacts 475 and 476 thus deenergizing relay DN' with consequent stopping of the rapid traverse motor 148 and re-application of the brake 155.

A workpiece is now placed in position between the chuck and tail center and the start button 350 is again operated. The RA relay is now energized since the contact 353a is in engagement with contact 493 and the lower movable contact 373b of switch 373 is in engagement with the contacts 475 and 476. Energization of the relay RA closes its contacts RA-1, RA-2, and RA-3. Closing the contacts RA-1 provides a holding circuit for the relay RA about the start button. Closing of contacts RA-2 energizes relay AS' closing its contacts AS'-2 and AS'-3 to energize the solenoid 296 thus operating the air control valve 295 to supply air pressure for causing the chuck and tail center to firmly grip the workpiece.

Since the turret is in rotation, the switch 357 will be operated when the turret has rotated sufficiently for the arm 358 of the switch to engage the cam 360 thus closing the contact 357a of the switch. This energizes the relay RB since the contact 353a is in engagement with contact 493 and the switch 373 has bridged the contacts 475 and 476. Energization of the relay RB closes its contacts RB-1, RB-2, RB-3 and RB-4. Closing of the contacts RB-1 and RB-2 energizes the relays CL' and TB since the switch 371 has been actuated to bridge the contacts 472 and 473, contact 353a is in engagement with contact 493, and switch 373 has bridged the contacts 475 and 476. The CL' relay therefore closes its contacts CL'-1, CL'-2 and CL'-3. Closing of the contacts CL'-2 and CL'-3 energizes the clutch solenoid 455 effecting engagement of the clutch 450 so that the workpiece is now rotated and fed vertically downwardly past the hob, which is also in rotation, thereby machining or hobbing the work. The closing of the contacts CL'-1 energizes the relay RC causing the latter to open its contacts RC-1 and close its contacts RC-2, RC3, and RC-4. Closing of the contacts RC-2 and RC-3 provide holding circuits around the contacts CL'-1 and RA-2, respectively.

Solenoid CS and relay RD are energized, simultaneously with the energization of relays CL' and TB, by a circuit through the now closed contacts RB-4, and the coils of the relay RD and the solenoid CS, it being remembered that the switch 349 has been moved to close its movable contact 349a. This circuit is completed through the contacts 472 and 473, which are bridged by the contact 371b of the switch 371, wire 471, contacts 353a, 493 and 475, 476, the latter being bridged by contact 373b of switch 373. Hence, coolant or cutting fluid is supplied to the hob while the latter is operating upon the workpiece. The energization of the relay RD closed its normally open contacts RD-1 providing a holding circuit for the relay RD and solenoid CS. The contacts RD-2 are opened and hence the closing of the contacts RC-2 has not completed a circuit through relays DC and TC.

The relay TB, being a time delay relay, operates to move its contact TB-1 to circuit opening position a predetermined time after the energization of the solenoid CS and the relays CL', TB, and RD. However, the contacts RD-1 having closed, the relay RD and the solenoid CS remain energized so that the supply of coolant to the hob is not interrupted. Deenergization of the relay CL' opens the circuit to the clutch engaging solenoid 455 by opening of the contacts CL'-2 and CL'-3 but the clutch does not disengage since, as previously mentioned, the clutch remains in the position to which it has been actuated until positively moved to a different position.

Cutting or hobbing, continues until the work head has moved downwardly to a position such that the cam 365 actuates the switch 371 back to its initial position as shown in Figs. 21 and 21A. This deenergizes the relay RD and the solenoid CS. Deenergization of the solenoid CS stops the supply of coolant or cutting fluid while the deenergization of relay RD opens it contacts RD-1 and allows its contacts RD-2 and RD-3 to again close. A circuit is therefore provided from the wire 465 through the closed contacts RC-2, RD-2, 355b, wire 477, relays TC and DC, and wire 478 to the wire 468 thus energizing the relays DC and TC. Energization of relay DC closes its contacts DC-1 and DC-2, thereby energizing the declutch solenoid or electromagnet 456 which disengages the clutch 450 thus stopping the feeding movement of the work head and rotation of the workpiece and hob. The chuck and tail center will, however, continue to hold the workpiece since the relay AS' remains energized through contacts RC-2 and RC-3.

The closing of the contacts RD-3 completed a circuit from wire 469 through contacts RC-4, RD-3, RA-3, wire 470, contact TB-1, relay RB, contacts 224a, wire 471, contacts 353a, 493, and contacts 475, 476 to the wire 468, it being remembered that the relays RC and RA are still energized and that the contact 373b of switch 373 is in engagement with the contacts 475 and 476. The energization of relay RB immediately closes its contacts RB-1 and RB-2, the contacts RB-1 providing a holding circuit for the relay RB about the contacts RC-4, RD-3, and RA-3. Hence, when the time delay relay TC moves its contact TC-1 to circuit opening position, deenergizing relay RC, the circuit for RB is not deenergized. Deenergization of relay RC will, however, open its contacts RC-2 and RC-3 and close its contacts RC-1. Opening of contacts RC-2 deenergizes relays DC and TC allowing the contact TC-1 to return to its initial position.

Closing of the contacts RC-1 provides a circuit through contacts RB-1, RB-2, RC-1, the coil of relay RU, contact 371a of switch 371, wire 471, contacts 353a, 493 and contact 373b of switch 373 to wire 468. Energization of the RU relay closes its contacts RU-1, RU-2, and RU-3 thereby supplying current to the rapid traverse motor 148 through the contacts 353e, 446 and 353f, 447 so that the rapid traverse motor is now operated in the direction for moving the work head downwardly at a rapid rate. It will be noted that the provision of the contacts RC-1 in the circuit of the relay RU insures that the rapid traverse motor cannot start until after the RC relay has been deenergized thus preventing simultaneously operation of the feed screw by the rapid traverse motor and the rotation of the feed nut by the rotation motor 25. Current is also supplied to the solenoid of the brake 155, as before, through the normally closed contacts BR-1 and BR-2 so that the brake is released. The chuck and tail center continue to hold the workpiece under control of contacts RA-2, which are closed since the relay RA is energized through its holding circuit provided by its contacts RA-1, the contacts RA-2 holding the relay AS' energized.

When the work head reaches its starting or lower position the switch 373 is returned to its initial position, as illustrated in Figs. 21 and 21A, by engagement of the projection 367 on the work head with the switch operating lever 374. This operation of the switch 373 deenergizes the relay RU thus opening its contacts, thereby stopping the rapid traverse motor and applying the brake. The circuit through relay RA is also broken, thus opening the contacts RA-2 causing deenergizing of the relay AS' so that the contacts AS'-2 and AS'-3 open and deenergize the solenoid 296. Hence, the air valve 295 is actuated to supply air pressure to open the chuck and retract the tail center. The workpiece may now be removed, and the operation repeated by again pressing the start button 350.

As mentioned before, the switch 224 is controlled by the extremes of axial movement of the hob in order to indicate when the hob should be replaced or reground and also to prevent further use of the unit until the hob spindle has been retracted to effect this replacing of the hob. In the event the hob has advanced to its extreme forward position, thus actuating the switch 224 to open its contacts 224a and close its contacts 224b, during the cycle of operation, the cycle will not be interrupted but continues to completion. This is effected by providing the contacts DC-3 in parallel with the contacts 224a so that the relay RB may be reenergized at the completion of the cutting operation to effect the rapid traverse down of the work head back to its initial position even though the contacts 224a are open. In addition, the contacts RB-3, connected in parallel with the contacts 224a and DC-3, provide a holding circuit about the contacts 224a and DC-3 to maintain the circuit for relay RB closed after the DC relay is deenergized by operation of time delay contact TC-1.

*"Climb" hobbing with "clean-up"—automatic operation*

A "dwell" may be provided at the end of the hobbing operation to provide for "clean-up" of the work when the modified form of the machine is used for climb hobbing, as above described. This is effected by initially setting the feed control switch 355 to its "on" position thereby moving contact 355a into engagement with contact 487, and 355b into engagement with contact 488. The operation is started, as before, by pressing the start button 350 and continues as described above for "climb" hobbing until the downward feeding movement of the work head has operated the switch 371 back to the initial position shown in Figs. 21 and 21A. The relays BR and TA are then energized by the circuits described above for the "clean-up" operation in connection with "normal" hobbing, thus providing for rotation of the work and hob without advance or feeding of the work head. After the predetermined time for which the timer 356 has been set has elapsed, the contact TA-1 is operated by the relay TA of the timer 356 to its circuit closing position thereby energizing the TC and DC relays, through contacts RC-2 and TA-1 effecting declutching of the clutch 450, as previously described. The operations then continue, as before, to return the work head at the rapid traverse rate to its initial starting position, it being remembered that this rapid traverse cannot be started until the termination of the "clean-up" period because contacts RC-1 are not closed until after relay RC has been deenergized by an operation of the time delay contacts TA-1 and TC-1.

*"Climb" hobbing with automatic return—automatic operation*

With the hobbing selector switch 353 set for "climb" hobbing, an actuation of the automatic return switch 354 to its "on" position immediately closes a circuit from the wire 465 through contacts 418, 375', 351a, wire 469, contacts AS'-1, 354b, 490, wire 482, the coil of relay DN', contacts 353b, 494, wire 495, and through contact 373a of switch 373 to the wire 468. This energizes the DN' relay closing its contacts DN'-1, DN'-2, DN'-3, DN'-4 and DN'-5. Closing the contacts DN'-1 and DN'-2 provide a holding circuit for the relay DN'. Closing of the contacts DN'-3, DN'-4, DN'-5 energizes the rapid traverse motor 148 in a direction to elevate the work head since the contacts 353e and 353f are in engagement with the contacts 446 and 447, respectively, the brake 155 being released by the current supplied through the normally closed contacts BR-1 and BR-2.

When the work head reaches its uppermost position the projection 368 actuates the switch 373 bringing its contact 373b into engagement with the contacts 475 and 476. This breaks the circuit through relay DN' thus stopping the rapid traverse motor and re-applying the brake 155. During its upward movement, the cam 365 on the work head has reversed the switch 371 moving its lower movable contact 371b into engagement with the contacts 472 and 473. The operator now inserts a workpiece between the chuck and tail stock, presses the start button 350 and the circuit then operates as above described for "climb" hobbing, automatic operation, to grip the work and engage the clutch 450, thereby moving the work head downwardly at a feeding rate with simultaneously rotation of the workpiece and hob so that the work is hobbed, coolant or cutting fluid being supplied thereto during the hobbing.

When the work head has moved downwardly the predetermined distance for which the cam 365 is set, the latter actuates the switch 371 back to the initial position, shown in Figs. 21 and 21A, thus disengaging the clutch 450 terminating the feed of the work head and rotation of the hob and workpiece, the supply of the coolant also being terminated by opening of the circuit for the solenoid CS, all as above described. Likewise, the work head is now moved at the rapid traverse rate the remaining distance back to its original starting position where the projection 367 reverses the switch 373 terminating the rapid traverse movement of the work head. Relay RA will also be deenergized, opening the contacts RA-2 and thereby deenergizing the relay AS' which would normally effect release of the chuck and tail center. However, the movement of the switch 373 has again energized the relay DN' through the contacts AS-1, which closed when the AS' relay was deenergized, the circuit being completed through the contacts 354b, 490, wire 482, the coil of relay DN', contacts 353b, 494, wire 495 and contact 373a to the wire 468. Energization of relay DN' closes its normally open contacts DN'-1, DN'-2, DN'-3, DN'-4 and DN'-5. Closing of the contacts DN'-1 and DN'-2 provides a holding circuit for the relay DN' and the closing of the contacts DN'-1 also provide a circuit therethrough and through the wire 480, contacts 354a, 489, wire 491, wire 492 and the coil of relay AS' to the wire 468 thus reenergizing relay AS' and closing its contacts AS'-2 and AS'-3. This reenergizes the solenoid 296 for operating the valve 295 controlling the application of air pressure to the chuck and tail stock. The opening and reclosing of the contacts AS'-2 and AS'-3 occur so rapidly that the chuck and tail center do not have time to release the workpiece before they are again actuated into gripping relationship and hence the workpiece continues to be firmly held. Therefore, as soon as the work head has returned to its initial position, it immediately starts to move upwardly again at the rapid traverse rate by virtue of the closing of the circuit to the motor 148 through the contacts DN'-3, DN'-4, DN'-5.

When the work head has again reached its uppermost position, the projection 367 again actuates the switch 373 into engagement with the contacts 475 and 476 thus breaking the circuit through the DN' relay, opening its contacts DN'-1, DN'-2, DN'-3, DN'-4, and DN'-5. Opening of the contacts DN'-1 breaks the circuit to the relay AS' thus opening the contacts AS'-2 and AS'-3 and thereby deenergizing the solenoid 296 with the result that the valve 295 now supplies air pressure to the chuck and tail stock mechanisms in the direction which releases the workpiece so that the latter may be unloaded. The opening of the contacts DN'-3, DN'-4, and DN'-5 has meanwhile stopped the motor 148 and caused the brake 155 to be applied. A new cycle may be initiated by placing a new workpiece in position and pressing the start button 350.

*"Climb" hobbing with "clean-up" and automatic return—automatic operation*

The "clean-up" operation may be employed with the automatic return in the cycle of "climb" hobbing to provide a "dwell" at the end of the hobbing or cutting operation and before the work head moves downwardly at the rapid traverse rate. The apparatus is set for this operation by turning the automatic return switch 354 and the feed selector switch 355 to their "on" positions, the apparatus then operating as above described for "climb" hobbing with automatic return, until the cam 365 has actuated the switch 371 to terminate the movement of the work head downwardly at the feed rate. Now, however, the clutch 450 remains engaged for rotation of the hob and workpiece but without feeding of the work head until the predetermined time or "dwell" interval has elapsed at which time the relay TA causes the contacts TA-1 to close thereby completing a circuit for energizing the declutch solenoid 456 as described above for "climb" hobbing with "clean-up." It will be observed that the movement of the work head downwardly at the rapid traverse rate cannot be initiated until this "dwell" period has terminated with consequent energization of relay TC and opening of its contact TC-1 to deenergize the relay RC, thereby closing the contact RC-1 in the circuit for the RU relay which now controls the rapid traverse motor for its downward movement.

*"Climb" hobbing—manual operation*

It is occasionally desirable to employ the hobbing machine for "climb" hobbing but without rotation of the turret. This is effected by initially operating the start buttons 323 and 325, thereby energizing the cut motor 47 and the motor 386 for the coolant pump. With the hobbing selector switch set at "climb" and the switches 354 and 355 set at their "off" positions, the operator presses the start button 350. The work head then moves to its uppermost position and stops, this operation being the same as previously described for "climb" hobbing, automatic operation. The operator then places a workpiece in position between the chuck and tail center and sets the switch 352 to its "on" or "manual" position. This setting of switch 352 moves its contacts 352a and 352b to circuit closing or "Man." position. The relay AS' is energized through the contact 352b thus energizing the solenoid 296 by closing the contacts AS'-2 and AS'-3. Hence, the valve 295 is operated to supply air pressure to the chuck and tail stock mechanisms so that the work is gripped. The operator then presses the start button 350 again and the work head moves downwardly at the feeding rate with rotation of the work and hob as previously described for "climb" hobbing, automatic operation except that the turret does not rotate to close the contact 357a of the switch 357, the circuit for the relay RB being completed through the contact 352a of switch 352. After the hobbing is completed the work head rapidly traverses downwardly to its initial position as previously described, the work being unloaded by returning the manual switch 352 to its "off" or "automatic" position.

The "clean-up" operation may also be employed with this manual operation by initially setting the switch 355 to its "on" position, the circuit then operating, as above described, to provide a "dwell" in the movement of the work head at the end of the hobbing operation and before the work head is returned to its initial position at the rapid traverse rate.

If the circuit be set for manual operation and the switch 354 also be set for automatic return, this automatic return does not occur until the toggle switch 352 has been opened to deenergize the relay AS' and allow the contacts AS'-1 to close so that the DN' relay may be energized for closing the circuit to the rapid traverse motor.

SUMMARY

From the foregoing description of the preferred embodiment and one modification of the invention, it will be evident that a new and improved hobbing machine has been provided which can be operated to hob in the "normal" or conventional manner or, according to the principles of "climb" hobbing. In addition, a hobbing machine constructed in accordance with this invention may be operated either with or without automatic return of the work head to its original position, with or without a "clean-up" or "dwell" period, and either manually or automatically. Furthermore, the machine is provided with hob shifting mechanism which continuously provides a new surface of the hob to the workpiece and utilizes the entire effective length of the hob, the machine being so constructed that when the hob has been used once throughout its entire length, it must be returned to its original position before it can be again utilized, this condition being indicated by the lighting of a signal light and the prevention of the starting of a new cycle for the hobbing unit so effected.

In addition, the machine is so constructed that a plurality of individual hobbing units may be continuously operated by a single operator and one or more of the units may be left out of operation without affecting the others. Furthermore, the controls of the machine are so constructed and arranged that the operator is required only to load and unload the work and press a relatively few buttons in the normal operation of the device thus rendering the machine more fully automatic and requiring less experienced operators than prior machines while retaining a great deal of flexibility in the mode of operation.

Although the invention has been described as embodied in machines for performing hobbing operations it will be apparent that the invention is not limited thereto but may be embodied in machine tools for performing other machining operations by the substitution of suitable tools and actuating mechanisms for the hobs and hob shifting mechanisms illustrated and described. Therefore, while the preferred embodiment and one modification of the invention have been described in considerable detail, it is to be understood that various modifications may be made in the construction and mode of operation by those skilled in the art and hence the invention is not confined to the particular constructions illustrated and described but is limited only as required by the spirit and scope of the appended claims.

Having thus described the invention, I claim:

1. A machine tool of the character described comprising a base, a turret supported by said base for rotation about a vertical axis, a plurality of operational units supported by said turret at circumferentially spaced points thereabout, means for rotating said turret whereby said units are moved in sequence through a loading station, each of said units including a rotatable tool spindle, a rotatable work spindle and means for producing movement of one of said spindles relative to the other in a vertical direction so that a tool mounted on the tool spindle engages and machines a workpiece mounted on the work spindle, a single power source for rotating the spindles of all of said units, a clutch for each unit interposed between the said power source and the spindles of that unit, separate electrical means for each unit adapted to effect operation of the clutch of the unit, and means on each of said units automatically actuating the said electrical means of that unit in response to the said vertical movement between the tool and work spindles of that unit.

2. A machine tool of the type defined in claim 1 and further comprising a chuck carried by the work spindle of each unit for gripping and supporting a workpiece, separate fluid pressure operated means for actuating each chuck, and means actuated by the said vertical movement between the tool and work spindles of each unit for controlling the actuation of the chuck thereof.

3. A machine tool of the type defined in claim 1 and further comprising a chuck carried by the work spindle of each unit for supporting one end of a workpiece, separate fluid pressure operated means for actuating each chuck, a tail stock mechanism for each unit including a rotatable tail center mounted in spaced alignment with the work spindle of the unit and adapted to be actuated axially to and from engagement with the other end of said workpiece by fluid pressure, and means actuated by the said vertical movement between the tool and work spindles of each unit for controlling the actuation of the chuck and tail center of the unit.

4. A machine tool of the character defined in claim 1 and in which the said electrical means for each unit for effecting operation of the clutch thereof includes a pair of solenoids having a common armature connected with the clutch of the unit and the means actuated by the said vertical movement between the tool and work spindles of each unit includes switch means connected with the solenoids of that unit to selectively effect energization thereof.

5. A machine tool of the character described comprising a base, a turret supported by said base for rotation about a vertical axis, a plurality of operational units supported by said turret at circumferentially spaced points thereabout, means for rotating said turret whereby said units are moved in sequence through a loading station, each of said units including a rotatable tool spindle, a rotatable work spindle and means for producing movement of one of said spindles relative to the other in a vertical direction so that a tool mounted on the tool spindle engages and machines a workpiece mounted on the work spindle, a single power source for rotating the spindles of all of said units, a clutch for each unit interposed between the said power source and the spindles of that unit, and separate fluid pressure actuated means for each unit operatively connected to the clutch of the unit for actuation thereof in response to the said vertical movement between the tool and work spindles of that unit.

6. A machine tool of the type defined in claim 5 and further comprising separate electrical means for each unit actuated by the said vertical movement between the tool and work spindles of the unit and operatively connected with the said fluid pressure means for that unit to control the operation thereof.

7. A machine tool of the character defined in claim 5 and in which the said separate fluid pressure actuated means for each unit each includes a cylinder, a piston in said cylinder operatively connected with the clutch for the unit, a valve for controlling the flow of fluid pressure to and from said cylinder, and electrical means operated in response to the vertical movement between the tool and work spindles of the unit for actuating the said valve.

8. A machine tool of the type defined in claim 5 and further comprising a chuck carried by the work spindle of each unit for gripping and supporting a workpiece, separate fluid pressure operated means for actuating each chuck, and means actuated by the said vertical movement between the tool and work spindles of each unit for controlling the actuation of the chuck thereof.

9. A machine tool of the type defined in claim 5 and further comprising a chuck carried by the work spindle of each unit for supporting one end of the workpiece, separate fluid pressure operated means for actuating each chuck, a tail stock mechanism for each unit including a rotatable tail center mounted in spaced alignment with the work spindle of the unit and adapted to be actuated axially to and from engagement of the other end of said workpiece by fluid pressure, and means actuated by the said vertical movement between the tool and work spindles of each unit for controlling the actuation of the chuck and tail center of the unit.

10. A machine tool of the character described comprising a frame, a rotatable tool spindle and a rotatable work spindle supported upon said frame in a manner to permit movement of one of said spindles relative to the other in a vertical direction, the axis of the tool spindle extending transversely of the axis of the work spindle and on one side thereof so that a tool mounted on the former will tangentially engage a workpiece supported on the latter when vertical movement is effected therebetween, a chuck carried by said work spindle and adapted to support one end of a workpiece, fluid pressure operated means for selectively actuating said chuck, a tail stock mechanism including a rotatable tail center mounted in spaced alignment with the work spindle and adapted to be actuated axially to and from engagement with the other end of said workpiece by fluid pressure, means for rotating said spindles in timed relation to each other, means comprising two cooperating relatively rotatable elements for moving one of said spindles vertically, means cooperating with one of said rotatable elements and selectively connectible with said spindle rotating means for producing relative rotation between said elements at a relatively slow speed, independent means cooperating with said other rotative element for producing relative rotation between said elements at a relatively fast speed, and means actuated by the vertical movement of said one of the spindles for controlling the supply of fluid under pressure to the means for actuating said chuck and to the tail stock mechanism, and for sequentially actuating said independent means and effecting connection of said means for rotating one of said rotative elements to said spindle rotating means.

11. A machine tool of the type defined in claim 10 and in which the means for rotating said spindles includes a single power source, a clutch interposed between said power source and said spindles and fluid pressure actuated means for effecting operation of said clutch in response to the vertical movement of said one of the spindles.

12. A machine tool of the character described comprising a base, a turret supported by said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, the number and spacing of said work heads and work spindles corresponding to the number and spacings of said tool spindles to form a plurality of operational units with the axis of each tool spindle extending transversely of the axis of the corresponding work spindle and on one side thereof so that a tool mounted on the former will tangentially engage a workpiece supported on the latter, a chuck carried by each work spindle and adapted to support one end of a workpiece, separate fluid pressure operated means supported upon each work head for selectively actuating said chucks, a tail stock mechanism carried by each work head and including a rotatable tail center adapted to be actuated axially by fluid pressure to and from engagement with the other end of the workpiece supported in the corresponding chuck, means for rotating the spindles of each unit in timed relationship to each other, means comprising two cooperating relatively rotatable elements for each unit adapted to move the work head thereof vertically, means cooperating with one of said rotative elements in each unit and selectively connectible with the spindle rotating means for producing relative rotation between said elements at a relatively slow speed, independent means for each unit cooperating with the other of said rotative element of the unit for producing relative rotation between said elements at a relatively fast speed, means to rotate said turret, means automatically actuated by rotation of said turret to effect sequential operation of said units, and means automatically actuated in timed relation to the movement of the work head of each unit for controlling the supply of fluid pressure to said chuck actuating means and to said tail stock mechanism of the unit and for effecting sequential operation of said independent means for rotating said other rotative element of the unit and the means for rotating said one rotative element, whereby the work head of each unit is moved at a relatively slow rate while a tool mounted upon the tool spindle engages a workpiece supported by the fluid pressure operated chuck and tail center, and is moved at a relatively rapid rate prior to and subsequent to the period during which said workpiece and tool are in engagement.

13. A machine tool of the type defined in claim 12 and in which the means for rotating the spindles of each unit includes a single power source for all of said units, a clutch for each unit interposed between said power source and the spindles of the unit, and separate fluid pressure actuated means for each unit adapted to effect operation of the clutch of each unit in response to the movement of the work head thereof.

14. A machine tool of the character described comprising a base, a turret supported by said base for rotation about a vertical axis, a plurality of operational units supported upon said turret at circumferentially spaced points thereabout, means for rotating said turret whereby said units are moved in sequence through a loading station, each of said units including a rotatable tool spindle, a rotatable work spindle, means carried by each of said work spindles for gripping and supporting a workpiece, selectively operative means in each unit for rotating the spindles thereof in timed relationship to each other and for moving one of the spindles thereof relative to the other in a vertical direction at a relatively slow rate in timed relationship to the rotation of said spindles, selectively operative means in each unit for moving the said one of the spindles at a relatively rapid rate, and electrical means connected in separate circuits for each unit for controlling the operation of each unit independently of the operation of the other units; the said electrical means for each unit comprising a manually operable start switch, a manually settable selector switch, switch means operated by rotation of said turret past a stationary member fixed to said base, and a plurality of switch means operated by the vertical movement of said one spindle at different predetermined vertical positions thereof; the several switches being so interconnected in the circuit for each unit that setting of the selector switch at one position, actuation of the start button, and actuation of the turret operated switch of the unit automatically causes a workpiece to be sequentially supported, machined while the said one spindle is moving vertically in one direction and thereafter released, and setting of the selector switch at a second position thereof, actuation of the start switch, and actuation of the turret operated switch automatically causes a workpiece to be sequentially supported, machined while the said one spindle is moving vertically in the opposite direction and thereafter released, the machining operation effected in accordance with either setting of the selector switch occurring while the turret is making a single revolution whereby the workpieces are applied to and removed from each unit at a single station.

15. The combination as defined in claim 14 and further comprising means for moving each tool spindle axially at a relatively slow rate when the spindles are rotated, switch means in the circuit for each unit automatically operated when the corresponding tool spindle has reached one extreme axial position to prevent the vertically movable spindle of that unit from moving from its initial position, the last-mentioned switch means being automatically operated when the tool spindle has reached its other extreme position to again permit the said vertically movable spindle of that unit to move from its initial position when said manually operated start switch is again actuated.

16. The combination as defined in claim 14 and further comprising means for moving each tool spindle axially at a relatively slow rate when the spindles are rotated, switch means in the circuit for each unit automatically operated when the corresponding tool spindle has reached one extreme axial position to prevent the vertically movable spindle of that unit from moving from its initial position, and means in each circuit permitting the unit to complete the machine operation on a workpiece even though the last-mentioned switch has been operated by the tool spindle reaching its said one extreme position during the operation of the unit, said last-mentioned switch means preventing that unit from starting a new machining operation on a different workpiece until its tool spindle has been axially moved to its other extreme position.

17. The combination as defined in claim 14 and further comprising an additional manually operable switch in the said circuit for each unit adapted when closed to bridge said turret operated switch and to control the operation of the work gripping means, whereby each unit may be operated to perform machining operations while the turret remains stationary and with manual control of the gripping and release of a workpiece.

18. The combination as defined in claim 14 and in which the said work gripping means for each unit comprises a fluid operated chuck, and each unit is provided with a tail stock mechanism having an axially movable tail center operated by fluid under pressure to engage a workpiece gripped by said chuck, valve means for controlling supply of fluid under pressure to the chuck and tail stock mechanism, and electrical means for operating said valve, the said electrical means being connected in the said circuit for the unit.

19. A machine tool of the character described comprising a base, a turret supported upon said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units, selectively operative means in each unit for rotating the spindles thereof in timed relationship to each other and for moving the work head thereof vertically at a relatively slow rate in timed relationship to the rotation of said spindles, selectively operative means in each unit for moving the work head thereof at a relatively fast rate, means to rotate said turret, and electrical means connected in separate circuits for each unit for controlling the operation of each unit independently of the operation of the other units, said electrical means for each unit comprising a manually operable start switch, switch means operated by rotation of said turret past a stationary member fixed to said base, and a plurality of switch means operated by the work head at different predetermined vertical positions of the latter, the several switches being so interconnected in the circuit for the unit that actuation of the start switch effects operation of the work gripping means to gripping position and prepares the circuit so that when the turret has rotated past said stationary member the said switch actuated thereby effects operation of the means for causing movement of the work head at the relatively rapid rate, the movement of said work head sequentially actuating said work head operated switches to first terminate the relative rapid movement of the work head when the latter has moved the workpiece to a point adjacent the tool spindle and to simultaneously render operative the said means for moving the work head at a relatively slow rate and for rotating the spindles, and to thereafter terminate the movement of the work head and the rotation of the spindles when the work head has moved the workpiece past the tool spindle, to automatically release the work gripping means, and to prepare the circuit for the unit in a manner such that a second actuation of the said start switch effects operation of the means for causing movement of the work head at the relative rapid rate in a direction to move the work head back to its initial position.

20. The combination as defined in claim 19 and further comprising means for moving each tool spindle axially at a relatively slow rate when the spindles are rotated, switch means in the circuit for each unit automatically operated when the corresponding tool spindle has reached one extreme axial position to prevent the work head of that unit from moving from its initial position when the start switch is actuated, the last-mentioned switch means being automatically operated when the tool spindle has reached its other extreme position to again permit the work head of that unit to move from its initial position when said manually operated start switch is actuated.

21. The combination as defined in claim 19 and further comprising means for moving each tool spindle axially at a relatively slow rate when the spindles are rotated, switch means in the circuit for each unit automatically operated when the corresponding tool spindle has reached one extreme axial position to prevent the work head of that unit from moving from its initial position, and means in each circuit permitting the unit to continue its operation when once started until the work head has returned to its initial position even though the last-mentioned switch has been operated by the tool spindle reaching its said one extreme position during the operation of the unit, said last-mentioned switch means preventing the work head of that unit from again moving from its initial position when the start switch is actuated until its tool spindle has been axially moved to its other extreme position.

22. The combination as defined in claim 19 and further comprising an additional manually operable switch in the said circuit for each unit adapted when closed to bridge said turret operated switch and to control the operation of the work gripping means, whereby each unit may be operated while the turret remains stationary and with manual control of the gripping and release of a workpiece.

23. The combination as defined in claim 19 and further comprising an additional manually settable switch in said circuit of each unit adapted when set in one position to effect automatic operation of the means for causing movement of the work head at the relatively rapid rate for returning the work head to its initial position after termination of the rotation of said spindles, so that a complete cycle of operation for each unit can be effected by a single actuation of its start switch; said additional switch when set in another position allowing the movement of the work head of the unit back to its initial position to remain under control of said start switch.

24. The combination as defined in claim 19 and further comprising an additional manually settable switch in said circuit of each unit adapted when set in one position to actuate means for permitting said spindles to continue in rotation for a predetermined period of time and without movement of the work head of the unit after movement of the latter at the relatively slow rate has been terminated to provide for clean-up of the work; said additional switch when set in another position allowing rotation of the spindles to be terminated substantially simultaneously with the termination of the movement of the work head at the relatively slow rate.

25. The combination as defined in claim 19 and further comprising an additional manually settable switch and an adjustable timing means in said circuit for each unit adapted, when said additional switch is set in one position to actuate means to permit said spindles to continue in rotation for a predetermined period of time and without movement of the work head after movement of the latter at the relatively slow rate has been terminated, the said timing means thereafter operating to terminate the rotation of the spindles, effect automatic release of the work gripping means, and to restore the circuit to control by the start switch and the work head operated switches; said additional switch when set in another position allowing rotation of the spindles to be terminated substantially simultaneously with the termination of the movement of the work head at the relatively slow rate.

26. The combination as defined in claim 19 and further comprising a manually settable feed selector switch and a manually settable automatic return switch in said circuit for each unit, said feed selector switch being adapted when set in one position to actuate means for permitting said spindles to continue in rotation for a predetermined period of time and without movement of the work head of the unit after movement of the latter at the relatively slow rate has been terminated, and said automatic return switch being adapted when set in one position to automatically effect operation of the means for causing movement of the work head of the unit at the relatively rapid rate for returning the work head to its initial position after rotation of said spindles has terminated; said feed selector and automatic return switches being adapted when each is set to a second position to respectively allow the rotation of the spindles to be terminated simultaneously with the termination of the movement of the work head at the relatively slow rate and to allow the movement of the work head back to its initial position to remain under control of said start switch.

27. The combination as defined in claim 19 and in which the said work gripping means for each unit comprises a fluid operated chuck, and the work head for each unit is provided with a tail stock mechanism having an axially movable tail center operated by fluid under pressure, valve means for controlling supply of fluid under pressure to the chuck and tail stock mechanism, and electrical means for operating said valve, the said electrical means being connected in the said circuit for the unit.

28. A machine tool of the character described comprising a base, a turret supported upon said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units, selectively operative means in each unit for rotating the spindles thereof in timed relationship to each other and for moving the work head thereof vertically at a relatively slow rate in timed relationship to the rotation of said spindles, selectively operative means in each unit for moving the work head thereof at a relatively fast rate, means to rotate said turret, and electrical means connected in separate circuits for each unit for controlling the operation of each unit independently of the operation of the other units; said electrical means for each unit comprising a manually operable start switch, a manually settable selector switch, switch means operated by rotation of said turret past a stationary member fixed to said base, and a plurality of switch means operated by the work head at different predetermined vertical positions of the latter; the several switches being so interconnected in the circuit for each unit that setting of the said selector switch at one position thereof and operation of the said start switch effects operation of the said means for moving the work head at the relatively rapid rate, the movement of the work head sequentially actuating said work head operated switches to terminate the movement of the work head and to prepare the circuit of the unit so that when said start switch is again actuated the work gripping means is operated to work gripping position and the circuit is so prepared that as the turret rotates past said stationary member the said switch actuated thereby effects operation of the said means for moving the work head at a relatively slow rate and for rotating the spindles, the work head now moving in the opposite direction back towards its initial position, the movement of the work head again sequentially actuating said work head operated switches to terminate operation of the means for moving the work head at the relatively slow rate and the rotation of said spindles after the work head has moved a predetermined distance at the slow rate, to effect operation of the means for moving the work head at the relatively rapid rate in a direction to return the work head to its initial position, and to terminate operation of said means for moving the work head at a relatively rapid rate and to actuate said work gripping means to work releasing relationship when said head has returned to its initial position.

29. The combination as defined in claim 28 and further comprising means for moving each tool spindle axially at a relatively slow rate when the spindles are rotated, switch means in the circuit for each unit automatically operated when the corresponding tool spindle has reached one extreme axial position to prevent the work head of that unit from being moved at said relatively slow rate and to prevent rotation of the spindles of the unit when said start switch is again actuated, the last-mentioned switch means being automatically operated when the tool spindle has reached its other extreme position to again permit the work head of that unit to move and the spindles to be rotated when said manually operated switch is again actuated.

30. The combination as defined in claim 28 and further comprising means for moving each tool spindle axially at a relatively slow rate when the spindles are rotated, switch means in the circuit for each unit automatically operated when the corresponding tool spindle has reached one extreme axial position to prevent the work head of that unit from being moved at said relatively slow rate and to prevent rotation of the spindles of the unit when said start switch is again actuated, and means in each circuit permitting the unit to continue its operation when once started even though the last-mentioned switch has been operated by the tool spindle reaching its said one extreme position during the operation of the unit, said last-mentioned switch means preventing said work head from again being moved at the said relatively slow rate and preventing the spindles of the unit from being again rotated until the tool spindle of the unit has been axially moved to its other extreme position.

31. The combination as defined in claim 28 and further comprising an additional manually operable switch in the said circuit for each unit adapted when closed to bridge said turret operated switch and to control the operation of the work gripping means, whereby each unit may be operated while the turret remains stationary and with manual control of the gripping and release of a workpiece.

32. The combination as defined in claim 28 and further comprising an additional manually settable switch in said circuit of each unit adapted when set in one position to automatically effect operation of the means for causing movement of the work head of the unit at the relatively rapid rate from the said initial position so that a complete cycle of operation for each unit can be effected by a single actuation of its start switch; said additional switch when set in another position allowing the movement of the work head from the said initial position to remain under control of said start switch.

33. The combination as defined in claim 28 and further comprising an additional manually settable switch in said circuit of each unit, said additional switch being adapted when set in one position to actuate means for permitting said spindles to continue in rotation for a predetermined period of time and without movement of the work head of the unit after movement of the latter at the relatively slow rate has been terminated to provide for clean-up of the work; said additional switch when set in another position allowing rotation of the spindles to be terminated simultaneously with the termination of the movement of the work head at the relatively slow rate.

34. The combination as defined in claim 28 and further comprising an additional manually settable switch and an adjustable timing means in said circuit for each unit adapted when said additional switch is set in one position to actuate means to permit said spindles to continue in rotation for a predetermined period of time and without movement of the work head after movement of the latter at the relatively slow rate has been terminated, the said timing means thereafter operating to terminate the rotation of the spindles and effect operation of the means for moving the work head at the relatively rapid rate back to its initial position; said additional switch when set in another position allowing rotation of the spindles to be terminated simultaneously with the termination of the movement of the work head at the relatively slow rate.

35. The combination as defined in claim 28 and further comprising a manually settable feed selector switch and a manually settable automatic return switch in said circuit for each unit, said feed selector switch being adapted when set in one position to actuate means for permitting said spindles to continue in rotation for a predetermined period of time and without movement of the work head of the unit after movement of the latter at the relatively slow rate has been terminated, and said automatic return switch being adapted when set in one position to automatically effect operation of the means for causing movement of the work head of the unit at the relatively rapid rate from said initial position; said feed selector and automatic return switches being adapted when each is set to a second position to respectively allow the rotation of the spindles to be terminated simultaneously with the termination of the movement of the work head at the relatively slow rate and to allow the movement of the work head from the said initial position to remain under control of said start switch.

36. The combination as defined in claim 28 and in which the said work gripping means for each unit comprises a fluid operated chuck, and in which the work head for each unit is provided with a tail stock mechanism having an axially movable tail center operated by fluid under pressure, valve means for controlling supply of fluid under pressure to the chuck and tail stock mechanisms, and electrical means for operating said valve, the said electrical means being connected in the said circuit for the unit.

37. A machine tool of the character described comprising a base, a turret supported upon said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units, selectively operative means in each unit for rotating the spindles thereof in timed relationship to each other and for moving the work head thereof vertically at a relatively slow rate in timed relationship to the rotation of said spindles, selectively operative means in each unit for moving the work head thereof at a relatively fast rate, electrically controlled means in each unit for supplying a cutting fluid to a workpiece supported therein, means to rotate said turret, and electrical means connected in separate circuits for each unit for controlling the operation of each unit independently of the operation of the other units; said electrical means for each unit comprising a manually operable start switch, a manually operable selector switch, switch means operated by rotation of said turret past a stationary member fixed to said base, and a plurality of switch means operated by the work head at different predetermined vertical positions of the latter; the several switches being so interconnected in the circuit for each unit that setting of the selector switch at one position, actuation of the start button, and actuation of the turret operated switch causes the unit to automatically support a workpiece, effect a machining operation thereon and supply a cutting fluid thereto while the work head of the unit is moving vertically in one direction, and subsequently automatically release the workpiece and terminate the supplying of cutting fluid; and setting of the selector switch at a second position thereof, actuation of the start switch, and actuation of the turret operated switch causes the unit to automatically support a workpiece, effect a machining operation thereon and supply a cutting fluid thereto while the work head of the unit is moving vertically in the other direction and subsequently automatically release the workpiece and terminate the supplying of cutting fluid; the machining operation effected in accordance with either setting of the selector switch occurring while the turret is making one revolution whereby the workpieces are applied to and removed from each unit at a single station.

38. A machine tool of the character described comprising a base, a turret rotatably supported upon said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units, selectively operative means in each unit for rotating the spindles thereof in timed relationship to each other and for moving the work head thereof vertically at a relatively slow rate in timed relationship to the rotation of said spindles, selectively operative means in each unit for moving the work heads thereof at a relatively fast rate, electrically controlled means in each unit for supplying a cutting fluid to a workpiece supported therein, means to rotate said turret, and electrical means connected in separate circuits for each unit for controlling the operation of each unit independently of the operation of the other units; said electrical means for each unit comprising a manually operable start switch, switch means operated by rotation of said turret past a stationary member fixed to said base, and a plurality of switch means operated by the work head at different predetermined vertical positions of the latter; the several switches being so interconnected in the circuit for the unit that actuation of the start switch effects operation of the work gripping means to gripping position and prepares the circuit so that when the turret has rotated past said stationary member the said switch actuated thereby effects operation of the means for causing movement of the work head at the relatively rapid rate; the movement of said work head to a point where the workpiece is adjacent the tool spindle actuating one of said work head operated switches to terminat the relative rapid movement of the work head and to simultaneously render operative the said means for moving the work head at a relatively slow rate, the means for supplying the cutting fluid and the means for rotating the spindles; the movement of the work head to a point corresponding to the completion of the machining operation upon the workpiece actuating another of said work head operated switches to terminate the movement of the work head, the supplying of the cutting fluid, and the rotation of the spindles, and to automatically release the work gripping means and prepare the circuit for the unit in a manner such that a second actuation of the said start switch effects operation of the means for causing movement of the work head at the relatively rapid rate in a direction to move the work head back to its initial position.

39. A machine tool of the character described comprising a base, a turret supported upon said base for rotation about a vertical axis, a plurality of tool spindles mounted upon said turret at circumferentially spaced points thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units, selectively operative means in each unit for rotating the spindles thereof in timed relationship to each other and for moving the work head thereof vertically at a relatively slow rate in timed relationship to the rotation of said spindles, selectively operative means in each unit for moving the work head thereof at a relatively fast rate, electrically controlled means in each unit for supplying a cutting fluid to a workpiece supported therein, means to rotate said turret, and electrical means connected in separate circuits for each unit for controlling the operation of each unit independently of the operation of the other units; said electrical means for each unit comprising a manually operable start switch, a manually settable selector switch, switch means operated by rotation of said turret past a stationary member fixed to said base, and a plurality of switch means operated by the work head at different predetermined vertical positions of the latter; the several switches being so interconnected in the circuit for each unit that setting of the said selector switch at one position thereof and operation of the said start switch effects operation of the said means for moving the work head at the relatively rapid rate, the movement of said work head sequentially actuating said work head operated switches to first terminate the movement of the work head at a predetermined point and to prepare the circuit of the unit so that when said start switch is again actuated the work gripping means is operated to work gripping position and the circuit is so prepared that when the turret has rotated past said stationary member the said switch actuated thereby effects operation of the said means for moving the work head at a relatively slow rate, the means for supplying the cutting fluid and the means for rotating the spindles, the work head now moving in the opposite direction back towards its initial position; movement of the work head a predetermined distance towards it initial position again actuating one of said work head operated switches to terminate operation of the means for moving the work head at the relatively slow rate, the supplying of the cutting fluid and the rotation of said spindles, and effecting operation of the means for moving the work head at the relatively fast rate in the direction to return the work head to its initial position; another of said work head operated switches acting to terminate operation of said means for moving the work head at a relatively rapid rate and to actuate said work gripping means to work releasing relationship when said head has returned to its initial position.

40. A machine tool of the character described comprising a base, a turret supported upon said base for rotation about a vertical axis, a plurality of tool spindles rotatably mounted upon said turret at circumferentially spaced points thereabout, a plurality of work heads supported by said turret for vertical movements, a work spindle rotatably supported in each of said work heads for vertical movement therewith, the number and spacing of said work heads and work spindles corresponding to the number and spacing of said tool spindles to form a plurality of operational units, means carried by each of said work spindles for gripping and supporting a workpiece, separate electrically controlled means for operating each of said work gripping means, gearing means interconnecting the spindles of each unit for rotation in a predetermined timed relationship, means comprising a lead screw and cooperating nut for each unit to vertically move the work head thereof, means interconnecting the nut of each unit with said gearing means to produce a relative rotation between the nut and lead screw at a relatively slow rate when the spindles of the unit are rotated thereby providing a feeding movement of a workpiece past the tool spindle, a common driving means for the said gearing means of the units, an electrically controlled clutch connected between the said gearing means of each unit and said common driving means, there being one clutch for each unit so that the rotation of the spindles and the feeding movement of each unit may be effected independently of the operations of the other units, a reversible electric motor for each unit, operative connections between the shaft of said motor and the said lead screw of the unit to produce a relative rotation between the nut and lead screw at a relatively fast rate when the said motor of the unit is energized for rotation in either direction thereby providing a relatively rapid movement of the work head of the unit in either vertical direction, a separate electrically actuated means for each unit for controlling the supply of a cutting fluid to a workpiece supported in the unit, means to rotate said turret, and a separate electrical circuit for each unit; each of said circuits including a manually actuated start switch, switch means operated by rotation of said turret past a stationary member fixed to said base, and a plurality of switch means operated by the work head of the unit at different predetermined positions of the latter for controlling the operation of the work gripping means, the clutch, the reversible motor and the means for controlling the supply of cutting fluid for each unit; whereby actuation of the start switch of each unit, positioning of the workpiece therein and rotation of the turret causes the units to automatically and sequentially perform machining operations on said workpieces.

41. A machine tool of the type defined in claim 40 and in which the electrically controlled clutch for each unit includes normally engaged driving and driven members, fluid pressure actuated means for disengaging said clutch driven member from said driving member, a valve for controlling the application of fluid pressure to said last-mentioned means, and solenoid means for operating said valve, the said solenoid means being connected in the electrical circuit for said unit to be automatically controlled thereby.

42. A machine tool of the character described comprising a frame, a rotatable tool spindle and a rotatable work spindle supported upon said frame in a manner to permit movement of one of said spindles relative to the other in a vertical direction with the axis of the tool spindle extending transversely of the axis of the work spindle and on one side thereof so that a tool mounted on the former will tangentially engage and machine work supported on the latter, a chuck carried by said work spindle for supporting one end of a workpiece, fluid pressure operated means for actuating the chuck to and from work gripping position, a tail stock mechanism including a rotatable tail center mounted in spaced alignment with the work spindle and adapted to be moved axially to and from engagement with the other end of said workpiece, fluid pressure operated means connected to said tail center to axially move the latter, means for rotating said spindles in timed relation to each other, means for producing vertical feeding movement between said spindles so that a workpiece on the work spindle is engaged by a tool on the tool spindle during the feeding movement, and means actuated in response to the said vertical movement between the tool and work spindles for controlling the application of fluid pressure to the fluid pressure operated means for actuating the chuck and tail center.

43. A machine tool of the character described comprising a base, a turret supported by said base for rotation about a vertical axis, a plurality of tool spindles rotatably mounted upon said turret at circumferentially spaced locations thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units with the axis of each tool spindle extending transversely of the axis of the corresponding work spindle and at one side thereof so that a tool mounted on the former will tangentially engage a workpiece supported on the latter when the work head of the unit is moved vertically, means for vertically moving said work heads, means for rotating said turret, means actuated by the rotation of said turret to sequentially control the actuation of the means for moving said work heads, means for rotating the spindles of each unit in timed relationship to each other including a single power source for rotating the spindles of all of said units, a clutch for each unit interposed between said power source and the spindles of the unit, a gear on the work spindle of each unit, interconnected gears and shafts in each unit operatively connecting the clutch thereof to the said gear on the work spindle at a location on said gear which is on the other side of the axis of the work spindle so that the radial thrust imparted to said work spindle by the engagement of a tool on the tool spindle with the workpiece on the work spindle is substantially balanced, and separate electrical means for each unit operated in response to movement of the work head thereof and operatively connected to the clutch of that unit to control operation of said clutch.

44. A machine tool of the character defined in claim 43 and in which said separate electrical means for each unit operated in response to movement of the work head thereof comprises an electrical switch means actuated by vertical movement of said work head and an electrically controlled clutch actuator operatively connected to said clutch and controlled by said switch.

45. A machine tool of the character defined in claim 44 wherein the clutch actuator for each unit comprises a fluid pressure actuated means connected to the clutch, and separate electrically operated valve means for each unit operatively connected with said switch means for controlling the application of fluid under pressure to the fluid pressure actuated means in response to the vertical movement of the work head of the unit.

46. A machine tool of the character defined in claim 45 and in which the means carried by each work spindle for gripping and supporting the workpiece includes a chuck, separate fluid pressure operated means for actuating each chuck, and means actuated by the work head of each unit for controlling the actuation of the chuck thereof.

47. A machine tool of the character described comprising a base, a turret supported by said base for rotation about a vertical axis, a plurality of tool spindles rotatably mounted on said turret at circumferentially spaced locations thereabout, a plurality of work heads supported by said turret for vertical movements, a work spindle rotatably supported in each of said work heads for vertical movement therewith, means carried by each of said work spindles for gripping and supporting a workpiece, the number and spacing of said work heads and work spindles corresponding to the number and spacing of said tool spindles to form a plurality of operational units with the axis of each tool spindle extending transversely of the axis of the corresponding work spindle and on one side thereof so that a tool mounted on the former will tangentially engage a workpiece supported on the latter, means for rotating the spindles of each unit in timed relationship to each other including a single power source for rotating the spindles of all of said units, an electrically controlled clutch for each unit interposed between said power source and the spindles of that unit, a gear on the work spindle of each unit, interconnected gears and shafts in each unit operatively connecting the clutch thereof to the said gear on the work spindle at a location on said gear which is on the other side of the axis of the work spindle, means comprising two cooperating relatively rotatable elements for each unit adapted to move the work head thereof vertically, means cooperating with one of said rotative elements in each unit and selectively connectible with the spindle rotating means for producing relative rotation between said elements at a relatively slow speed, electrically controlled independent means for each unit cooperating with said other rotative element of the unit for producing relative rotation between said elements at a relatively fast speed, means to rotate said turret, means automatically actuated by rotation of said turret to initiate sequential operation of said units, and electrical switch means automatically actuated in timed relation to the movement of the work head of each unit for effecting operation of said independent means for rotating said other rotative element of the unit and for simultaneously disconnecting the said clutch thereby preventing rotation of said one rotatable element, and other switch means responsive to movement of the work head of each unit to thereafter terminate operation of said independent means and simultaneously effect engagement of said clutch to cause rotation of said one rotative element of the unit and rotation of the spindles thereof, whereby the work head of each unit is moved at a relatively rapid rate prior to and subsequent to the period during which the workpiece and tool are in engagement and is moved at a relatively slow rate while the tool engages the workpiece.

48. The combination as defined in claim 47 and further comprising electrical switch means for each unit operable to prevent the operation of one or more of the units without preventing the operation of the remaining units.

49. A machine tool of the character described comprising a frame, a tool spindle rotatably supported by said frame, a work spindle rotatably supported by said frame, means for rotating said spindles in timed relationship to each other and for moving one of said spindles relative to the other at a feeding rate and in a direction coincident with the direction of the axis of said work spindle, means connected with said spindle rotating means for moving said tool spindle axially while the said spindles are rotated with the axial movement of said tool spindle being at a slower rate than the said feeding movement, electrical means controlling said feeding movement, electrical switch means operated by said tool spindle when the latter has reached one extreme axial position thereof, and an electrical circuit operatively connecting said switch means to said electrical means so that operation of said switch means prevents initiation of the said feeding movement, the said circuit including means bridging said switch means during said feeding movement thereby permitting the said feeding movement to continue to completion when the tool spindle actuates the said switch means during the feeding movement.

50. The combination as defined in claim 49 and further comprising means actuated by axial movement of said tool spindle to another axial position thereof for operating said switch means to a position conditioning said circuit for initiation of the feeding movement of said one spindle.

51. The combination as described in claim 49 and in which the means for moving one of said spindles at a feeding rate includes a clutch and the said electrical means controlling the feeding movement is an electrically controlled clutch actuating device.

OTIS E. STAPLES.

REFERENCES CITED

The following references are of record in the file of this patent:

UNITED STATES PATENTS

| Number | Name | Date |
|---|---|---|
| 1,988,424 | Schurr et al. | Jan. 15, 1935 |
| 1,995,328 | Simmons | Mar. 26, 1935 |
| 2,032,646 | Adams | Mar. 3, 1936 |
| 2,075,489 | Warner et al. | Mar. 30, 1937 |
| 2,202,766 | Trosch | May 28, 1940 |
| 2,260,935 | Drummond | Oct. 28, 1941 |
| 2,271,677 | Bradner | Feb. 3, 1942 |
| 2,292,260 | Adams et al. | Aug. 4, 1942 |
| 2,481,974 | Bradner | Sept. 13, 1949 |